(12) United States Patent
Fink et al.

(10) Patent No.: US 11,779,015 B2
(45) Date of Patent: Oct. 10, 2023

(54) PESTICIDE COMPOSITIONS

(71) Applicant: FUNDACIÓ CENTRE DE REGULACIÓ GENÒMICA, Barcelona (ES)

(72) Inventors: Elie Marina-Lora Fink, Barcelona (ES); Matthieu Robert Paul Julien Cecile Guy Louis, Barcelona (ES)

(73) Assignee: FUNDACIÓ CENTRE DE REGULACIÓ GENÓMICA, Barcelona (ES)

( * ) Notice: Subject to any disclaimer, the term of this patent is extended or adjusted under 35 U.S.C. 154(b) by 0 days.

(21) Appl. No.: 16/765,975

(22) PCT Filed: Nov. 22, 2018

(86) PCT No.: PCT/EP2018/082278
§ 371 (c)(1),
(2) Date: May 21, 2020

(87) PCT Pub. No.: WO2019/101890
PCT Pub. Date: May 31, 2019

(65) Prior Publication Data
US 2020/0359621 A1  Nov. 19, 2020

(30) Foreign Application Priority Data

Nov. 22, 2017 (EP) ..................... 17382788

(51) Int. Cl.
| | | |
|---|---|---|
| A01N 31/04 | (2006.01) | |
| A01N 25/18 | (2006.01) | |
| A01N 35/04 | (2006.01) | |
| A01N 37/02 | (2006.01) | |
| A01N 35/02 | (2006.01) | |
| A01N 31/06 | (2006.01) | |
| A01N 31/08 | (2006.01) | |
| A01N 37/06 | (2006.01) | |

(52) U.S. Cl.
CPC ............ *A01N 31/04* (2013.01); *A01N 25/18* (2013.01)

(58) Field of Classification Search
None
See application file for complete search history.

(56) References Cited

U.S. PATENT DOCUMENTS

| | | |
|---|---|---|
| 2006/0089263 A1 | 4/2006 | Rodriguez-Kabana et al. |
| 2010/0303940 A1* | 12/2010 | Enan ............... A01N 37/02 514/464 |
| 2014/0086878 A1 | 3/2014 | Strobel et al. |
| 2017/0094963 A1 | 4/2017 | Enan |

FOREIGN PATENT DOCUMENTS

WO  WO-2013156492 A2 *  10/2013  ............ A01N 31/02

OTHER PUBLICATIONS

Inamdar et al.( Neurotoxicity of Fungal Volatile Organic Compounds in *Drosophila melanogaster*, Toxicological Sciences (2010), 117(2), 418-426) (Year: 2010).*

Jang et al., Biological activity of Mytaceae plant essential oils and their major components against *Drosophila suzukii*(Diptera: Drosophilidae, Pest Management Science, vol. 73, issue 2, pp. 404-409. (Year: 2016).*

T. R. Hamilton-Kemp et al, Antimicrobial Propertys of Natural Volatile Compounds; chapter in "Synthesis and Chemistry of Agrochemicals IV"; May 1995, American Chemical Society; ISBN: 978-0-8412-1509-2; pp. 449-462.

Chengyu Chen et al, Biological Activity of Trans-2-Hexenal against Bradysia Odoriphaga (Diptera: Sciaridae) at Different Developmental Stages; Journal of Insect Science, vol. 15, No. 1, Jan. 1, 2015, p. iev075.

Yunhe Zhao et al, Effects of the plant volatile trans-2-hexenal on the dispersal ability, nutrient metabolism and enzymatic activities of Bursaphelenchus xylophilus; Pesticide Biochemistry and Physiology, vol. 143, Nov. 1, 2017, pp. 147-153.

M. J. Cho et al, Copyright q, International Association of Food Protection Inactivation of Pathogenic Bacteria by Cucumber Volatiles (E,Z)-2,6-Nonadienal and (E)-2-Nonenal; Journal of Food Protection, Jan. 1, 2004, pp. 1014-1016.

(Continued)

*Primary Examiner* — Alton N Pryor
(74) *Attorney, Agent, or Firm* — DINSMORE & SHOHL LLP

(57) ABSTRACT

Disclosed herein are novel pesticide compounds and compositions. In particular, pesticide compositions comprising one or more pesticide volatile organic compounds (VOCs) are disclosed, wherein the pesticide is for *Drosophila* spp. and the one or more pesticide VOCs have the molecular formula $C_aH_bO_c$ wherein: a is between 4 and 13; b is 6, 8, 10, 12, 14, 16, 18, 20, 22 or 24; c is 1 or 2. The VOCs are linear, branched or cyclic alkanes or alkenes, and comprise a single ketone, aldehyde, alcohol or ester functionality, and wherein any cyclic alkane or alkene is selected from the group consisting of cyclohexane, cyclopentane, cyclopentene and cyclopentadiene. Also disclosed are *Drosophila* spp. pesticide compositions comprising one or more pesticide VOCs with the molecular formula of (formula I) wherein $R_1$ is OH or absent, and $R_2$ is an aldehyde functional group or a linear or branched alkane or alkene with 1 to 5 carbons and a single ester functional group. Uses of the pesticide compositions according to the invention to prevent, reduce or eliminate a *Drosophila* spp. Infestation, and in particular a *D. suzukii* infestation, are also disclosed.

24 Claims, 16 Drawing Sheets
Specification includes a Sequence Listing.

(56) References Cited

OTHER PUBLICATIONS

European Office Action dated Oct. 10, 2022 regarding application No. 18822269.9.
Zhang et al. "Fumigant toxicity of monoterpenes against fruitfly, *Drosophila melanogaster*". Industrial Crops and Products. 2015.
Scharf et al. "Evaluation of volatile low molecular weight insecticides using *Drosophila melanogaster* as a model". Pest Management Science. 2006.

\* cited by examiner

| Compound | 0.3% | | 0.5% | | 1% | | 2% | | 3% | | 4% | | 5% | | 10% | | MEC (%) |
|---|---|---|---|---|---|---|---|---|---|---|---|---|---|---|---|---|---|
| | F | M | F | M | F | M | F | M | F | M | F | M | F | M | F | M | |
| allyl 1-cyclopentene-1-carboxylate | 73 | 93 | 96 | 100 | 100 | 100 | 100 | 100 | 100 | 100 | NaN | NaN | NaN | NaN | NaN | NaN | 0.5 |
| E,E-2,4-nonadienal | NaN | NaN | NaN | NaN | 0 | 13,3 | 100 | 100 | 100 | 100 | NaN | NaN | NaN | NaN | NaN | NaN | 2 |
| E-2-nonenal | NaN | NaN | NaN | NaN | 0 | 0 | 93 | 100 | 100 | 100 | NaN | NaN | NaN | NaN | NaN | NaN | 2 |
| E-2-octenal | NaN | NaN | NaN | NaN | 0 | 0 | 87 | 100 | 100 | 100 | NaN | NaN | NaN | NaN | NaN | NaN | 2 |
| E-2-decenal | NaN | NaN | NaN | NaN | 0 | 0 | 85 | 100 | 100 | 100 | NaN | NaN | NaN | NaN | NaN | NaN | 3 |
| butyl cyclopentane carboxylate | NaN | NaN | NaN | NaN | NaN | NaN | 73,3 | 60 | 100 | 100 | NaN | NaN | NaN | NaN | NaN | NaN | 3 |
| 4-hexen-3-one | NaN | NaN | NaN | NaN | 0 | 0 | 46,7 | 80 | 100 | 100 | NaN | NaN | NaN | NaN | NaN | NaN | 3 |
| E-2,Z,-6-nonadienal | NaN | NaN | NaN | NaN | NaN | NaN | 26,7 | 67 | 93,3 | 87 | NaN | NaN | NaN | NaN | NaN | NaN | 3 |
| E-2-heptenal | NaN | NaN | NaN | NaN | 0 | 0 | 0 | 67 | 100 | 100 | NaN | NaN | NaN | NaN | NaN | NaN | 3 |
| pentyl cyclopentanecarboxylate | NaN | NaN | NaN | NaN | NaN | NaN | 46,7 | 73 | 93,3 | 100 | NaN | NaN | 100 | 100 | NaN | NaN | 3 |
| nonanal | NaN | NaN | NaN | NaN | NaN | NaN | 6,67 | 33 | 93,3 | 100 | NaN | NaN | 100 | 100 | 100 | 100 | 3 |
| E-2-undecenal | NaN | NaN | NaN | NaN | NaN | NaN | 0 | 0 | 60 | 100 | 87 | 100 | 100 | 100 | NaN | NaN | 4 |
| E-2-hexenal | NaN | NaN | NaN | NaN | 0 | 0 | 0 | 40 | 46,7 | 87 | 93 | 100 | 93 | 100 | NaN | NaN | 4 |
| benzaldehyde | NaN | NaN | NaN | NaN | NaN | NaN | NaN | NaN | 20 | 100 | 87 | 100 | NaN | NaN | NaN | NaN | 4 |
| ethyl phenyl acetate | NaN | NaN | NaN | NaN | NaN | NaN | NaN | NaN | 33,3 | 100 | 73 | 87 | 100 | 100 | 100 | 100 | 5 |
| methyl benzoate | NaN | NaN | NaN | NaN | NaN | NaN | NaN | NaN | 26,7 | 80 | 80 | 100 | 87 | 100 | NaN | NaN | 5 |
| E-2-pentenal | NaN | NaN | NaN | NaN | NaN | NaN | NaN | NaN | 26,7 | 33 | 33 | 87 | 100 | 100 | NaN | NaN | 5 |
| Methyl cyclopentanecarboxylate | NaN | NaN | NaN | NaN | 0 | 0 | NaN | NaN | 13,3 | 20 | 0 | 73 | 60 | 100 | 100 | 100 | 5 |
| ethyl benzoate | NaN | NaN | NaN | NaN | NaN | NaN | NaN | NaN | NaN | NaN | 47 | 100 | 70 | 100 | 100 | 100 | 10 |

Figure 3E

| Compound | 0.3% | | 0.5% | | 1% | | 2% | | 3% | | 4% | | 5% | | 10% | | MEC (%) |
|---|---|---|---|---|---|---|---|---|---|---|---|---|---|---|---|---|---|
| | F | M | F | M | F | M | F | M | F | M | F | M | F | M | F | M | |
| 2-methyl-2-pentenal | NaN | NaN | NaN | NaN | 0 | 0 | NaN | NaN | 0 | 40 | 0 | 13 | 67 | 93 | 100 | 100 | 10 |
| methyl salicylate | NaN | NaN | NaN | NaN | NaN | NaN | NaN | NaN | NaN | NaN | NaN | NaN | 40 | 100 | 93,3 | 100 | 10 |
| propyl benzoate | NaN | NaN | NaN | NaN | NaN | NaN | NaN | NaN | NaN | NaN | NaN | NaN | 80 | 73 | 100 | 100 | 10 |
| acetophenone | NaN | NaN | NaN | NaN | NaN | NaN | NaN | NaN | NaN | NaN | NaN | NaN | 47 | 85 | 100 | 100 | 10 |
| isopropyl cyclopentane carboxylate | NaN | NaN | NaN | NaN | NaN | NaN | NaN | NaN | 0 | 60 | NaN | NaN | 53 | 80 | 100 | 100 | 10 |
| E-2-dodecenal | NaN | NaN | NaN | NaN | NaN | NaN | NaN | NaN | 0 | 60 | NaN | NaN | 40 | 60 | 100 | 95 | 10 |
| benzyl acetate | NaN | NaN | NaN | NaN | NaN | NaN | NaN | NaN | NaN | NaN | NaN | NaN | 27 | 87 | 93,3 | 100 | 10 |
| methyl cyclohexanoate | NaN | NaN | NaN | NaN | NaN | NaN | NaN | NaN | 0 | 0 | NaN | NaN | 13 | 80 | 100 | 100 | 10 |
| heptanal | NaN | NaN | NaN | NaN | NaN | NaN | NaN | NaN | 0 | 0 | NaN | NaN | 20 | 6,7 | 100 | 100 | 10 |
| E-2-hexen-ol | NaN | NaN | NaN | NaN | NaN | NaN | NaN | NaN | 0 | 0 | NaN | NaN | 6,7 | 20 | 73,3 | 87 | >10 |
| 1-hexanol | NaN | NaN | NaN | NaN | NaN | NaN | NaN | NaN | 0 | 0 | NaN | NaN | 0 | 0 | 80 | 90 | >10 |
| E-3-hexenol | NaN | NaN | NaN | NaN | NaN | NaN | NaN | NaN | NaN | NaN | NaN | NaN | 0 | 0 | 86,7 | 80 | >10 |
| hexanal | NaN | NaN | NaN | NaN | NaN | NaN | NaN | NaN | 0 | 0 | NaN | NaN | 0 | 0 | 36 | 64 | >10 |
| E-2-tridecenal | NaN | NaN | NaN | NaN | NaN | NaN | NaN | NaN | 0 | 60 | NaN | NaN | 0 | 0 | 33,3 | 47 | >10 |
| octanal | NaN | NaN | NaN | NaN | NaN | NaN | NaN | NaN | 0 | 0 | NaN | NaN | 0 | 0 | 12 | 44 | >10 |
| pentanal | NaN | NaN | NaN | NaN | NaN | NaN | NaN | NaN | 0 | 0 | NaN | NaN | 0 | 0 | 5 | 26 | >10 |
| 4,5-Dimethyl-3-hydroxy-2,5-dihydrofuran-2-one | NaN | NaN | NaN | NaN | NaN | NaN | NaN | NaN | 0 | 0 | NaN | NaN | 0 | 0 | 0 | 6,7 | >10 |
| 2-heptanone | NaN | NaN | NaN | NaN | 0 | 0 | NaN | NaN | 20 | 20 | NaN | NaN | 0 | 0 | 0 | 0 | >10 |
| methyl-2-methyl butyrate | NaN | NaN | NaN | NaN | NaN | NaN | NaN | NaN | 0 | 0 | NaN | NaN | 0 | 0 | 0 | 0 | >10 |
| benzyl benzoate | NaN | NaN | NaN | NaN | NaN | NaN | NaN | NaN | NaN | NaN | NaN | NaN | NaN | NaN | 0 | 0 | N/A |
| benzyl salicylate | NaN | NaN | NaN | NaN | NaN | NaN | NaN | NaN | NaN | NaN | NaN | NaN | NaN | NaN | 0 | 0 | N/A |
| linalyl benzoate | NaN | NaN | NaN | NaN | NaN | NaN | NaN | NaN | NaN | NaN | NaN | NaN | NaN | NaN | 0 | 0 | N/A |

Figure 3E (continued)

PESTICIDE COMPOSITIONS

CROSS-REFERENCE TO RELATED APPLICATIONS

This application is a § 371 National Stage Entry of International Application No. PCT/EP2018/082278, filed Nov. 22, 2019, which claims priority to EP 17382788.2, filed Nov. 22, 2017.

FIELD OF THE INVENTION

This invention relates to novel pesticide compounds and compositions, in particular to pesticide compositions for *Drosophila* spp. comprising volatile organic compounds. The invention also relates to uses of pesticide compositions comprising volatile organic compounds to control or prevent *Drosophila* spp. infestations.

BACKGROUND OF THE INVENTION

The control of pestiferous species of insect in crop management is a familiar problem to the industry, and some pests can have devastating impact on harvest. For example, the Spotted Wing *Drosophila, Drosophila suzukii*, is currently one of the most important, invasive pestiferous species, globally affecting parts of Asia, Europe, the Americas, as well as regions in the Middle East. It targets a range of wild to cultivated ripening, soft-skinned fruits, thereby inflicting great economic losses (O'Grady et al. 2002, Walsh et al. 2011, Hauser 2011, Parchami-Araghi 2015).

On the other hand, when implementing a pest management strategy, environmental factors as well as possible development of resistance must be taken into account. Possible pest control strategies against *D. suzukii* include chemical, biological and cultural control. Biological measures, based on the conservation of natural predators or the introduction of specialised larval parasitoids, are subject of ongoing research. Cultural control tactics, based on sanitation and nettings have provided good relief for some types of crops, but chemical control involving the use of insecticides, is currently the primary and most common strategy employed (Haye et al. 2016). Published knowledge regarding the levels and range of *D. suzukii* insecticide resistance is limited, nonetheless, suggested insecticides mostly include conventional broad-spectrum products such as pyrethroids, organophosphates and to a lesser extent neonicotinoids—all in spite of the fact that they are not always in line with integrated pest management programs and affect insect species indiscriminately.

Therefore, there is still a need for improved pesticides for *Drosophila* spp., for example in the management of *D. suzukii* pest. Further, it would be particularly advantageous if these pesticides could integrate as part of ecologically sustainable solutions for improving integrated pest management practices targeting *Drosophila* spp. such as *D. suzukii*. In particular, specificity to one or more *Drosophila* spp. and a low environmental impact would be highly desirable. For example, low toxicity on honeybees (*Apis Mellifera*) would be advantageous.

The present invention seeks to overcome or at least alleviate one or more of the problems associated with existing *Drosophila* pest management.

SUMMARY OF THE INVENTION

In general terms, the present invention provides new *Drosophila* ssp. pesticide compositions comprising pesticidal volatile organic compounds.

In one aspect, therefore, the invention provides a pesticide composition comprising one or more pesticide volatile organic compounds (VOCs), wherein the pesticide is for *Drosophila* spp. and the one or more pesticide VOCs have the molecular formula $C_aH_bO_c$ wherein:

a is between 4 and 13
b is 6, 8, 10, 12, 14, 16, 18, 20, 22 or 24
c is 1 or 2 and the VOCs are linear, branched or cyclic alkanes or alkenes, and comprise a single ketone, aldehyde, alcohol or ester functionality, and wherein any cyclic alkane or alkene is selected from the group consisting of cyclohexane, cyclopentane, cyclopentene and cyclopentadiene.

In embodiments, a is between 5 and 13 and b is 8, 10, 12, 14, 16, 18, 20, 22 or 24.

In embodiments, the VOCs are selected from: (E)-2-hexenal, 4-hexen-3-one, (E)-2-pentenal, pentanal-ol, hexanal, 2-heptanone, (E)-2-heptenal, heptanal, 2-methyl-2-pentenal, octanal, 1-hexanol, (E)-2-hexen-ol, (E)-3-hexenol, (E,E)-2,4-nonadienal, (E)-2,(Z)-6-nonadienal, methyl 2-methylbutyrate, methyl cyclohexanoate, 2-butenal, 3-butenal, (Z)-1,3-butadienol, (E)-1,3-butadienol, E-2-nonenal, nonanal, E-2-octenal, (2E)-2-Decenal, 2-E-undecenal, E-2-dodecenal, tridec-2-enal, methyl cyclopentane carboxylate, isopropyl cyclopentane carboxylate, butyl cyclopentanecarboxylate, allyl 1-cyclopentene-1-carboxylate (cyclopentene-1-carboxylicacid 2-propenylester or prop-2-en-1-yl cyclopent-1-ene-1 carboxylate), pentyl cyclopentane carboxylate, butyl cyclopentane carboxylate, isopropyl cyclopentane carboxylate, pentyl cyclopentane carboxylate and the pentadienes—methyl 2,4-cyclopentadiene-1-carboxylate, methyl 1,3-cyclopentadiene-1-carboxylate, and ethyl 1,3-cyclopentadiene-1-carboxylate.

In any of the embodiments of the invention, the pesticide composition may be toxic, for example lethal, to larval *Drosophila* spp. flies, to eggs of *Drosophila* spp. flies, to adults *Drosophila* spp. flies, or any combinations thereof.

In embodiments, a is between 4 and 10, and b is 6, 8, 10, 12, 14, 16 or 18. In some such embodiments, a is between 5 and 10; b is 8, 10, 12, 14, or 16; and any cyclic alkane is cyclohexane and any cyclic alkene is cyclopentene.

In embodiments, the pesticide VOCs are selected from: (E)-2-hexenal, 4-hexen-3-one, (E)-2-pentenal, hexanal, 2-heptanone, (E)-2-heptenal, 2-methyl-2-pentenal, octanal, 1-hexanol, (E)-2-hexen-ol, (E,E)-2,4-nonadienal, (E)-2,(Z)-6-nonadienal, methyl 2-methylbutyrate, methyl cyclohexanoate, (E)-2-nonenal, E-2-octenal, E-2-decenal, nonanal, heptanal, E-3-hexenol, and pentanal.

In embodiments, a is between 7 and 12; b is 12, 14 or 16 and any cyclic alkane is cyclohexane, cyclopentane or cyclopentene. In some such embodiments, the pesticide VOCs are selected from methyl cyclohexanoate, allyl 1-cyclopentene-1-carboxylate, butyl cyclopentane carboxylate, pentyl cyclopentane carboxylate, methyl cyclopentane carboxylate, and isopropylcyclopentane carboxylate.

In any of the embodiments of the invention, the pesticide composition may be repellent to larval *Drosophila* spp. flies, to adults *Drosophila* spp. flies, or both. In some such embodiments, the pesticide composition is an ovipositional repellent.

In any of the embodiments of the invention, the pesticide composition may be an attractant to larval *Drosophila* spp. flies, to adults *Drosophila* spp. flies, or both.

In some embodiments of the invention, the pesticide composition is adapted for release of the one or more pesticide VOCs in vapour or gas form. In embodiments, the pesticide composition is adapted for application as an aerosol.

In embodiments, each of the one or more pesticide VOCs is present in the composition at a concentration of at least 0.1%, at least 0.3%, at least 0.5%, at least 1%, at least 2%, at least 3%, or at least 5% by volume of the composition. In some embodiments, each of the one or more pesticide VOCs is present in the composition at a concentration of at least 2%, at least 3%, or at least 5% by volume of the composition. In embodiments, each of the one or more pesticide VOCs is present in the composition at a concentration of at most 50%, at most 40%, at most 30%, or at most 20% by volume of the composition. In embodiments, each of the one or more pesticide VOCs is present in the composition at a concentration of between about 0.1 and about 50% w/w, about 0.3 and about 45% w/w, about 0.5 and about 40% w/w, about 1 and about 30%, about 2 and 25%, about 3 and 20%, about 4 and 15% or about 5 and 10% by volume of the composition.

Suitably, the compositions of the invention may further comprise a solvent, a surfactant, a dye, a stabiliser, or any combinations thereof.

In embodiments, the pesticide composition is effective for *D. suzukii*. In embodiments, the pesticide composition is effective for *Drosophila* spp. with a higher level of para gene expression in comparison to *Drosophila melanogaster*. In embodiments, the pesticide composition is effective for *D. suzukii, D. simulans, D. schellia, D. erecta, D. yakuba* and/or *D. biarmipes*

In advantageous embodiments, the pesticide composition is not lethal to *Apis mellifera*.

Suitably, the pesticide compositions may be for use on fruit cultures.

The invention is also directed, in another aspect, to a pesticide composition comprising one or more pesticide volatile organic compounds (VOCs), wherein the pesticide is for *Drosophila* spp. and the one or more pesticide VOCs have the formula:

wherein $R_1$ is OH or absent, and $R_2$ is an aldehyde functional group or a linear or branched alkane or alkene with 1 to 5 carbons and a single ester or ketone functional group.

In embodiments of the second aspect, $R_2$ is an aldehyde functional group or a linear or branched alkane or alkene with 1 to 3 carbons and a single ester or ketone functional group. In some such embodiments, the one or more pesticide VOCs are selected from: benzaldehyde, methyl benzoate, methyl salicylate, ethyl benzoate, propyl benzoate, benzyl acetate, ethyl phenyl acetate and acetophenone.

Any of the features associated with embodiments of the first aspect of the invention may be present in embodiments of the second aspect of the invention, unless they are not compatible with the features of the second aspect of the invention.

The invention, in a third aspect, also encompasses use of a pesticide composition according to the first or the second aspect of the invention, to reduce, prevent or eliminate a *D. suzukii, D. simulans, D. erecta, D. yakuba and/or D. biarmipes* infestation. In embodiments, the use of a pesticide composition according to the first or second aspect of the invention is to reduce, prevent or eliminate a *D. suzukii* infestation. Preferably, the pesticide composition is effective for *D. suzukii*.

The invention, in a fourth aspect, encompasses use of a pesticide composition to prevent, reduce or eliminate a *D. suzukii, D. simulans, D. schellia, D. erecta, D. yakuba* and/or *D. biarmipes* infestation, wherein the composition comprises one or more pesticide volatile organic compounds (VOCs), selected from the group comprising:

(i) pesticide VOCs having the molecular formula $C_aH_bO_c$ wherein:
a is between 4 and 13
b is 6, 8, 10, 12, 14, 16, 18, 20, 22 or 24
c is 1 or 2
and the VOCs are linear, branched or cyclic alkanes or alkenes, and comprise a single ketone, aldehyde, alcohol or ester functionality, and wherein any cyclic alkane or alkene is selected from the group consisting of cyclohexane, cyclopentane, cyclopentene and cyclopentadiene; and (ii) pesticide VOCs having the formula:

(formula II)

wherein $R_1$ is OH or absent, and $R_2$ is an aldehyde functional group or a linear or branched alkane or alkene with 1 to 5 carbons and a single ester or ketone functional group.

In embodiments, the pesticide VOCs are selected from: allyl 1-cyclopentene-1-carboxylate, (E,E)-2,4-nonadienal, E-2-nonenal, E-2-octenal, E-2-decenal, butyl cyclopentane carboxylate, 4-hexen-3one, E)-2,(Z)-6-nonadienal, E-2-heptenal, pentyl cyclopentane carboxylate, nonanal, E-2-undecenal, E-2-hexenal, benzaldehyde, ethyl phenylacetate, methyl benzoate, E-2-pentenal, methyl cyclopentane carboxylate, ethyl benzoate, 2-methyl-2-pentenal, methyl salicylate, propyl benzoate, acetophenone, isopropyl cyclopentane carboxylate, E-2-dodecenal, benzyl acetate, methyl cyclohexanoate, and heptanal. In some such embodiments, the pesticide VOCs are each present at a concentration of between 0.3% vol and 10% vol.

In embodiments, the pesticide VOCs are selected from: allyl 1-cyclopentene-1-carboxylate, (E,E)-2,4-nonadienal, E-2-nonenal, E-2-octenal, E-2-decenal, butyl cyclopentane carboxylate, 4-hexen-3one, E)-2,(Z)-6-nonadienal, E-2-heptenal, pentyl cyclopentane carboxylate, nonanal, E-2-undecenal, E-2-hexenal, E-2-pentenal, methyl cyclopentane carboxylate, 2-methyl-2-pentenal, isopropyl cyclopentane carboxylate, E-2-dodecenal, methyl cyclohexanoate, and heptanal. In some such embodiments, the pesticide VOCs are each present at a concentration of between 0.3% vol and 10% vol.

In embodiments, the pesticide VOCs are selected from: benzaldehyde, ethyl phenylacetate, methyl benzoate, ethyl benzoate, methyl salicylate, propyl benzoate, acetophenone and benzyl acetate. In some such embodiments, the pesticide VOCs are each present at a concentration of between 0.3% vol and 10% vol.

In embodiments, the pesticide VOCs are selected from: allyl 1-cyclopentene-1-carboxylate, (E,E)-2,4-nonadienal, E-2-nonenal, E-2-octenal, E-2-decenal, butyl cyclopentane carboxylate, 4-hexen-3one, E)-2,(Z)-6-nonadienal, E-2-heptenal, pentyl cyclopentane carboxylate, nonanal, E-2-undecenal, E-2-hexenal, benzaldehyde, ethyl phenylacetate, methyl benzoate, E-2-pentenal, methyl cyclopentane carboxylate. In some such embodiments, the pesticide VOCs are each present at a concentration below 10% vol, below 9% vol, below 8% vol, below 7% vol or below 6% vol. In some such embodiments, the pesticide VOCs are each present at a concentration of between 0.3% vol and 5% vol.

In embodiments, the pesticide VOCs are selected from: allyl 1-cyclopentene-1-carboxylate, (E,E)-2,4-nonadienal, E-2-nonenal, E-2-octenal, E-2-decenal, butyl cyclopentane carboxylate, 4-hexen-3one, E)-2,(Z)-6-nonadienal, E-2-heptenal, pentyl cyclopentane carboxylate, nonanal, E-2-undecenal, E-2-hexenal, E-2-pentenal, and methyl cyclopentane carboxylate. In some such embodiments, the pesticide VOCs are each present at a concentration below 10% vol, below 9% vol, below 8% vol, below 7% vol or below 6% vol. In some such embodiments, the pesticide VOCs are each present at a concentration of between 0.3% vol and 5% vol.

In embodiments, the pesticide VOCs are selected from: benzaldehyde, ethyl phenylacetate, and methyl benzoate. In some such embodiments, the pesticide VOCs are each present at a concentration below 10% vol, below 9% vol, below 8% vol, below 7% vol or below 6% vol. In some such embodiments, the pesticide VOCs are each present at a concentration of between 0.3% vol and 5% vol.

In embodiments, the pesticide VOCs are selected from: allyl 1-cyclopentene-1-carboxylate, (E,E)-2,4-nonadienal, E-2-nonenal, E-2-octenal, E-2-decenal, butyl cyclopentane carboxylate, 4-hexen-3one, E)-2,(Z)-6-nonadienal, E-2-heptenal, pentyl cyclopentane carboxylate, nonanal, E-2-undecenal, E-2-hexenal, and benzaldehyde. In some such embodiments, the pesticide VOCs are each present at a concentration below 5% vol. In some such embodiments, the pesticide VOCs are each present at a concentration of between 0.3% vol and 4% vol.

In embodiments, the pesticide VOCs are selected from: allyl 1-cyclopentene-1-carboxylate, (E,E)-2,4-nonadienal, E-2-nonenal, E-2-octenal, E-2-decenal, butyl cyclopentane carboxylate, 4-hexen-3one, E)-2,(Z)-6-nonadienal, E-2-heptenal, pentyl cyclopentane carboxylate, nonanal, E-2-undecenal, and E-2-hexenal. In some such embodiments, the pesticide VOCs are each present at a concentration below 5% vol. In some such embodiments, the pesticide VOCs are each present at a concentration of between 0.3% vol and 4% vol.

In embodiments, the pesticide VOCs are selected from: benzaldehyde. In some such embodiments, the pesticide VOCs are each present at a concentration below 5% vol. In some such embodiments, the pesticide VOCs are each present at a concentration of between 0.3% vol and 4% vol.

In embodiments, the pesticide VOCs are selected from: allyl 1-cyclopentene-1-carboxylate, (E,E)-2,4-nonadienal, E-2-nonenal, E-2-octenal, E-2-decenal, butyl cyclopentane carboxylate, 4-hexen-3one, E)-2,(Z)-6-nonadienal, E-2-heptenal, pentyl cyclopentane carboxylate, nonanal. In some such embodiments, the pesticide VOCs are each present at a concentration below 4% vol. In some such embodiments, the pesticide VOCs are each present at a concentration of between 0.3% vol and 3% vol.

In embodiments, the pesticide VOCs are selected from: allyl 1-cyclopentene-1-carboxylate, (E,E)-2,4-nonadienal, E-2-nonenal, E-2-octenal. In some such embodiments, the pesticide VOCs are each present at a concentration below 3% vol. In some such embodiments, the pesticide VOCs are each present at a concentration of between 0.3% vol and 2% vol.

In embodiments, the pesticide VOCs is: allyl 1-cyclopentene-1-carboxylate. In some such embodiments, the pesticide VOCs are each present at a concentration below 2% vol. In some such embodiments, the pesticide VOCs are each present at a concentration of between 0.3% vol and 1% vol.

The invention, in a further aspect, encompasses the use of a volatile organic compound (VOC) to prevent, reduce or eliminate a D. suzukii, D. simulans, D. schellia, D. erecta, D. yakuba and/or D. biarmipes infestation, wherein the VOC has the molecular formula $C_aH_bO_c$ wherein:

a is between 4 and 13 b is 6, 8, 10, 12, 14, 16, 18, 20, 22 or 24 c is 1 or 2 and the VOC is a linear, branched or cyclic alkane or alkene, and comprises a single ketone, aldehyde, alcohol or ester functionality. Suitably, the cyclic alkane or alkene is selected from the group consisting of cyclohexane, cyclopentane, cyclopentene and cyclopentadiene. The use according to this aspect may encompass the use of any of the VOCs defined in relation to the first aspect.

The invention, in a further aspect, encompasses the use of a volatile organic compound (VOC) to prevent, reduce or eliminate a D. suzukii, D. simulans, D. schellia, D. erecta, D. yakuba and/or D. biarmipes infestation, wherein the VOC has the formula:

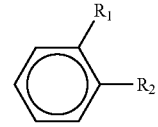

(formula II)

wherein $R_1$ is OH or absent, and $R_2$ is an aldehyde functional group or a linear or branched alkane or alkene with 1 to 5 carbons and a single ester or ketone functional group. The use according to this aspect may encompass the use of any of the VOCs defined in relation to the second aspect.

In embodiments of the uses described, the pesticide composition or compound is lethal to larval D. suzukii, D. simulans, D. schellia, D. erecta, D. yakuba and/or D. biarmipes flies; to eggs of D. suzukii, D. simulans, D. schellia, D. erecta, D. yakuba and/or D. biarmipes flies; to adult D. suzukii, D. simulans, D. schellia, D. erecta, D. yakuba and/or D. biarmipes flies; or any combination thereof.

In embodiments of the uses described, the pesticide composition or compound is repellent to D. suzukii, D. simulans, D. schellia, D. erecta, D. yakuba and/or D. biarmipes flies. In some embodiments, the pesticide composition or compound is repellent to the adult D. suzukii, D. simulans, D. schellia, D. erecta, D. yakuba and/or D. biarmipes flies. In some embodiments, the pesticide composition or compound is an ovipositional repellent. In embodiments, the pesticide composition or compound is an attractant to at least one Drosophila spp. selected from D. suzukii, D. simulans, D. schellia, D. erecta, D. yakuba and/or D. biarmipes. In some embodiments, the pesticide composition or compound is an attractant to the larvae of at least one *Drosophila* spp. selected from *D. suzukii, D. simulans, D. schellia, D. erecta, D. yakuba* and/or *D. biarmipes*.

In embodiments of the uses described, each of the one or more pesticide VOCs is used in a composition at a concentration of: (i) at least 0.1%, at least 0.3%, at least 0.5%, at least 1%, at least 2%, at least 3%, or at least 5% by volume of the composition; (ii) at most 50%, at most 30%, or at most 20% by volume of the composition; and/or (iii) between about 0.1 and about 50% w/w, about 0.3 and about 45%, about 0.5 and about 35%, about 1 and about 30%, about 2 and about 25%, about 3 and 20%, about 4 and 15% or about 5 and 10% by volume of the composition.

In embodiments of the uses described, the pesticide composition or compound is effective for *D. suzukii*. In embodiments, the use is of the invention is against *Drosophila* spp. with a higher level of para gene expression in comparison to *Drosophila melanogaster*.

In embodiments of the uses described, the pesticide composition or compound is not lethal to *Apis mellifera* (honey bee).

In embodiments of any of the uses described, the use is for a fruit culture or crop. In particular, the use may be for post harvest management (protection) of fruit or plants against *D. suzukii, D. simulans, D. schellia, D. erecta, D. yakuba* and/or *D. biarmipes* infestation.

In embodiments of any of the uses described, the use is for a fruit culture or crop.

In embodiments of any of the uses described, the use is to reduce, prevent or eliminate an infestation post harvest of the fruit culture or crop. In some such embodiments, the pesticide composition is effective against larvae and/or eggs of *Drosophila* spp. For example, the pesticide composition may be effective against larvae and/or eggs of *D. suzukii*.

In some embodiments of any of the uses described, the use comprises applying the pesticide composition in crop storage containers or chambers prior to filling the containers or chambers with the harvested fruit. In embodiments, the use comprises applying the pesticide composition around areas where air can enter crop storage containers or chambers, such as e.g. fans, aeration ducts or any other components of an air circulation system, doors or lid openings, etc.

In some embodiments of any of the uses described, the use comprises applying the pesticide composition onto the harvested fruit prior to or during storage.

Any of the uses described may comprise applying the pesticide composition in liquid or gas form, such as by spraying, vaporising or fumigating.

According to a further aspect, the invention encompasses a method of preventing, reducing or eliminating a *D. suzukii, D. simulans, D. schellia, D. erecta, D. yakuba* and/or *D. biarmipes* infestation, the method comprising applying a pesticide composition comprising one or more pesticide volatile organic compounds (VOCs) to a crop, a crop storage container or a crop storage chamber, wherein the one or more pesticide VOCs are selected from the group comprising:

(i) pesticide VOCs having the molecular formula $C_aH_bO_c$ wherein:
  a is between 4 and 13
  b is 6, 8, 10, 12, 14, 16, 18, 20, 22 or 24
  c is 1 or 2
  and the VOCs are linear, branched or cyclic alkanes or alkenes, and comprise a single ketone, aldehyde, alcohol or ester functionality, and wherein any cyclic alkane or alkene is selected from the group consisting of cyclohexane, cyclopentane, cyclopentene and cyclopentadiene; and (ii) pesticide VOCs having the formula:

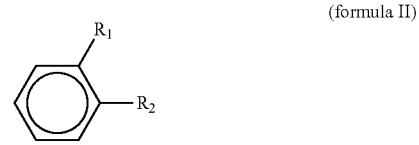

(formula II)

wherein $R_1$ is OH or absent, and $R_2$ is an aldehyde functional group or a linear or branched alkane or alkene with 1 to 5 carbons and a single ester or ketone functional group.

Any of the features provided in relation to the uses described anywhere herein are envisaged for combination with the features of the method according to this or any other aspect.

Indeed, throughout this application, it will be appreciated that any features of one aspect or embodiment of the invention may be combined with any combination of features in any other aspect or embodiment of the invention, unless otherwise stated, and such combinations fall within the scope of the claimed invention.

BRIEF DESCRIPTION OF THE DRAWINGS

The invention is further illustrated by the accompanying drawings in which:

FIG. 3E shows mortality rates for adult *D. suzukii* exposed to compositions comprising different dilutions of compounds according to the invention;

DETAILED DESCRIPTION OF THE INVENTION

Figure 1A:
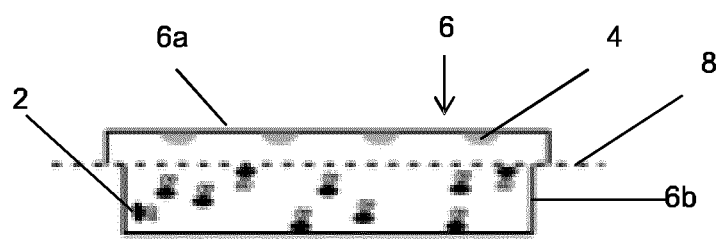
FIGS. 1A and 1B show schematically an experimental setup for assessing toxicity of pesticide compositions of the invention for *Drosophila* upon airborne exposure of adult flies to volatile organic compounds comprised in the composition (FIG. 1A) and an analysis of airborne toxicity in *D. suzukii* of pesticide compositions comprising volatile organic compounds according to the invention, as well as comparative examples (FIG. 1B), obtained with the assay of FIG. 1A.

All references cited herein are incorporated by reference in their entirety. Unless otherwise defined, all technical and scientific terms used herein have the same meaning as commonly understood by one of ordinary skill in the art to which this invention belongs.

Unless otherwise indicated, the practice of the present invention employs conventional techniques in chemistry and chemical methods, biochemistry, pharmaceutical formulation, and delivery regimes, which are within the capabilities of a person of ordinary skill in the art. Such techniques are also described in the literature cited herein, each of which is herein incorporated by reference.

Prior to setting forth the detailed description of the invention, a number of definitions are provided that will assist in the understanding of the invention.

In accordance with the invention, the term 'molecule' or 'molecules' is used interchangeably with the terms 'compound(s)', and sometimes a 'chemical structure'.

The term 'alkyl' refers to a monovalent, optionally substituted, saturated aliphatic hydrocarbon radical. Any number of carbon atoms may be present, unless indicated otherwise. Usefully, the number of carbon atoms is indicated, for example, a C1-12 alkyl (or $C_{1-12}$ alkyl) refers to any alkyl group containing 1 to 12 carbon atoms in the chain. An alkyl group may be a straight chain (i.e. linear), branched chain, or cyclic. 'Lower alkyl' refers to an alkyl of 1 to 6 carbon atoms in the chain, and may have from 1 to 4 carbon atoms, or 1 to 2 carbon atoms. Thus, representative examples of lower alkyl radicals include methyl, ethyl, n-propyl, n-butyl, n-pentyl, n-hexyl, isopropyl, isobutyl, isopentyl, amyl ($C_5H_{11}$), sec-butyl, tert-butyl, sec-amyl, tert-pentyl, 2-ethylbutyl, 2,3-dimethylbutyl, and the like. 'Higher alkyl' refers to alkyls of 7 carbons and above, including n-heptyl, n-octyl, n-nonyl, n-decyl, n-dodecyl, n-tetradecyl, n-hexadecyl, n-octadecyl, n-eicosyl, and the like, along with branched variations thereof. A linear carbon chain of say 4 to 6 carbons would refer to the chain length not including any carbons residing on a branch, whereas in a branched chain it would refer to the total number. Optional substituents for alkyl and other groups are described below.

The term 'substituted' means that one or more hydrogen atoms (attached to a carbon or heteroatom) is replaced with a selection from the indicated group of substituents, provided that the designated atom's normal valency under the existing circumstances is not exceeded. The group may be optionally substituted with particular substituents at positions that do not significantly interfere with the preparation of compounds falling within the scope of this invention and on the understanding that the substitution(s) does not significantly adversely affect the biological activity or structural stability of the compound. Combinations of substituents are permissible only if such combinations result in stable compounds. By 'stable compound' or 'stable structure', it is meant a compound that is sufficiently robust to survive isolation to a useful degree of purity from a reaction mixture and/or formulation into an efficacious pesticidal agent. By 'optionally substituted' it is meant that the group concerned is either unsubstituted, or at least one hydrogen atom is replaced with one of the specified substituent groups, radicals or moieties.

"Alkylene" or "alkylenyl" means a difunctional group obtained by removal of a hydrogen atom from an alkyl group as defined above. Non-limiting examples of alkylene include methylene, ethylene and propylene. 'Lower alkylene' means an alkylene having from 1 to 6 carbon atoms in the chain, and may be straight or branched. Alkylene groups are optionally substituted. For example, alkylene groups may be —$(CR_2)_n$— where n is from 1 to 6, and R is independently selected from H, F, Cl, $NH_2$ or wherein $R_2$ is =O. Preferably, n is 1, 2 or 3 and R is H. For example, alkylene groups may be —$(CH_2)_2$— and —$CH_2$—CO—.

The term 'alkenyl' refers to a monovalent, optionally substituted, unsaturated aliphatic hydrocarbon radical. Therefore, an alkenyl has at least one carbon-carbon double bond (C=C). The number of carbon atoms in the alkenyl group may be indicated, such as from 2 to about 20. For example, a C2-12 alkenyl (or $C_{2-12}$ alkenyl) refers to an alkenyl group containing 2 to 12 carbon atoms in the structure. Alkenyl groups may be straight (i.e. linear), branched chain, or cyclic. 'Lower alkenyl' refers to an alkenyl of 1 to 6 carbon atoms, and may have from 1 to 4 carbon atoms, or 1 to 2 carbon atoms. Representative examples of lower alkenyl radicals include ethenyl, 1-propenyl, 1-butenyl, 1-pentenyl, 1-hexenyl, isopropenyl, isobutenyl, and the like. Higher alkenyl refers to alkenyls of seven carbons and above, such as 1-heptenyl, 1-octenyl, 1-nonenyl, 1-decenyl, 1-dodecenyl, 1-tetradecenyl, 1-hexadecenyl, 1-octadecenyl, 1-eicosenyl, and the like, along with branched variations thereof. Optional substituents are described elsewhere.

'Alkenylene' means a difunctional group obtained by removal of a hydrogen from an alkenyl group that is defined above. Non-limiting examples of alkenylene include —CH=CH—, —C($CH_3$)=CH—, and —CH=CH$CH_2$—.

'Alkynyl' and 'lower alkynyl' is defined similarly to the term 'alkenyl', except that it includes at least one carbon-carbon triple bond.

The term 'alkoxy' refers to a monovalent radical of the formula RO—, where R is any alkyl, alkenyl or alkynyl as defined herein. Alkoxy groups may be optionally substituted by any of the optional substituents described herein. 'Lower alkoxy' has the formula RO—, where the R group is a lower alkyl, alkenyl or alkynyl. Representative alkoxy radicals include methoxy, ethoxy, n-propoxy, n-butoxy, n-pentyloxy, n-hexyloxy, isopropoxy, isobutoxy, isopentyloxy, amyloxy, sec-butoxy, tert-butoxy, tert-pentyloxy, and the like. Preferred alkoxy groups are methoxy and ethoxy.

The term 'aryl' as used herein refers to a substituted or unsubstituted aromatic carbocyclic radical containing from 5 to about 15 carbon atoms; and preferably 5 or 6 carbon atoms. An aryl group may have only one individual carbon ring, or may comprise one or more fused rings in which at least one ring is aromatic in nature. A 'phenyl' is a radical formed by removal of a hydrogen atom from a benzene ring, and may be substituted or unsubstituted. A 'phenoxy' group, therefore, is a radical of the formula RO—, wherein R is a phenyl radical. 'Benzyl' is a radical of the formula R—$CH_2$—, wherein R is phenyl; and 'benzyloxy' is a radical of the formula RO—, wherein R is benzyl. Non-limiting examples of aryl radicals include phenyl, naphthyl, benzyl, biphenyl, furanyl, pyridinyl, indanyl, anthraquinolyl, tetrahydronaphthyl, a benzoic acid radical, a furan-2-carboxylic acid radical, and the like.

The compounds of the invention generally contain asymmetric or chiral centers (such as asymmetric/chiral carbon atoms), and therefore, exist in different stereoisomeric forms. The chiral centres of the compounds of the present invention can have either the S or R configuration as defined by the IUPAC 1974 recommendations, unless specified otherwise. It is intended that all stereoisomeric forms of the compounds, salts etc. of the invention are encompassed within the scope of the invention, including mixtures, such as racemic mixtures of the stereoisomeric forms. Geometric isomers of the compounds of the invention are also incorporated: for example, where a compound has a double bond or a fused ring, the cis-(Z) and trans-(E) forms of the molecules, as well as mixtures thereof are included. If desired, diastereomeric mixtures of the compounds of the invention may be separated into their individual diastereomers on the basis of their physical chemical differences using methods known in the art. By way of example, chromatographic and/or fractional crystallisation procedures may be used. Enantiomers may be separated, if desired, by use of chiral HPLC column. Alternatively, enantiomeric mixtures may also be separated by converting the mixture into a diastereomeric mixture by reacting with an appropriate optically active compound (e.g. a chiral auxiliary agent, such as a chiral alcohol or Mosher's acid, MTPA or similar agents). The resultant diastereomers can then be separated and converted back to the corresponding pure enantiomers (e.g. by hydrolysis). Positional isomers, such as 4-pyridyl and 3-pyridyl are also considered to fall within the scope of the invention.

A 'pesticide composition' as used herein refers to a composition comprising at least one active compound which can be used to control, reduce, eliminate or prevent a pest invasion. The active compound (also referred to herein as 'pesticide compound') may be lethal to the pest, or may have another effect such as a paralytic, deterrent (also referred to herein as repellent) or sterilising effect. In embodiments, the active compound may have an effect on the pest in one or more particular stages of its life. In embodiments, an active compound may be an attractant for a pest in at least one of its stages of life. For example, this may be useful when the pesticide composition is to be used in traps. In embodiments, an active compound may be a repellent for a pest in a particular stage of life. In embodiments, an active compound may be an ovipositional repellent, i.e. an agent that discourages or reduces the likelihood of an adult pest laying eggs in the vicinity of the repellent. In embodiments, a single active compound may have more than one of the effects mentioned above. For example, a single active compound may be both toxic (such as paralytic, sterilising or lethal, at the extreme) to a pest, and attractant to the pest in at least one of its stages of life.

In embodiments, a pesticide composition may comprise more than one active compound. In embodiments, a pesticide composition may comprise two active compounds. Multiple active compounds in a composition may be effective against the same one or more species of pest, different species of pests, or partially overlapping sets of species of pests. Multiple active compounds (e.g. two, three or more) in a composition may have different or partially overlapping effects on the same pest. For example, a pesticide composition may comprise an active compound that is attractant, and another one that is lethal. As another example, a pesticide composition may comprise an active compound that has an effect on one or more particular stages of life of a pest, and another active compound that has an effect on one or more stages of life of the pest, at least one of which is different from the stage(s) of life on which the first active compound has an effect.

In embodiments, the concentration of an active compound in a pesticide composition may be 100%, i.e. an active compound may be used pure. In embodiments, a composition may comprise multiple active compounds, each of which are used pure, such that the concentration of each of multiple active compounds as a proportion of the total composition may depend on the amounts of active compounds present. For example, a composition may comprise active ingredient A1 in a proportion x1% and active ingredient A2 in a proportion x2=(100−x1)%.

In embodiments, the concentration of an active compound in a pesticide composition may be below 100%. In some such embodiments, the concentration of an active compound in a pesticide composition may be below 50%, below 30%, below 20% or below 10%.

In embodiments, the composition may comprise additional components to the one or more active compounds. Additional components may be selected from the group comprising solvents, surfactants (for example wetting agents, emulsifiers or dispersants), stabilisers, dyes, thickeners, compounds that in isolation or in synergy with the compounds of the invention enhance the pesticidal activity of the composition, and combinations thereof. In embodiments, the composition may comprise a hydrophobic solvent. In other embodiments, the composition may comprise an aqueous emulsion. In such embodiments, the composition may comprise an aqueous phase, as well as an emulsifier and a hydrophilic active ingredient. In embodiments, the composition may comprise a thickener, such as e.g. Arabic gum, hydroxyethylcellulose (HEC) etc. In some such embodiments, the composition comprises an aqueous emulsion, comprising water and an emulsifier, such as e.g. Tween 20.

Compositions according to the invention may additionally include compounds that increase the product shelf life by stabilising the composition and/or preventing degradation of one or more active ingredients (such as the pesticide compounds of the invention). For example, compositions according to the invention may include an antioxidant.

As used herein, the terms '*Drosophila* spp. pesticide' or 'pesticide for *Drosophila* spp.' refers to a pesticide compound or composition (as appropriate) which has a pesticide effect against one or more species of *Drosophila*. The pesticide effect may be in relation to the adult *Drosophila*, the larval *Drosophila, Drosophila* eggs, or a combination of the above. In embodiments, the pesticide compounds or compositions of the invention may be larval pesticides for *Drosophila* spp. In embodiments, the pesticide compounds or compositions of the inventions may be for *Drosophila* spp. at the egg stage. Such pesticide compounds or compositions may be lethal to the egg, prevent its development, and/or deter oviposition by the adult.

A 'gene', as used herein, is the segment of nucleic acid (typically DNA) that is involved in producing a polypeptide or ribonucleic acid gene product. As used herein, the level of expression of a gene may refer to the level of expression at the transcript, mature transcript, or protein level.

According to the invention, active compounds for *Drosophila* spp. pesticide compositions are volatile organic compounds (VOCs). Indeed, the present inventors have surprisingly discovered that some VOCs have a pesticide effect on

*Drosophila* spp. In particular, the present inventors have surprisingly discovered that some VOCs have pesticidal effects that are specific to one or more species of *Drosophila* spp., including *D. suzukii*.

A used herein, the term volatile organic compound (VOCs) refers to organic chemicals with a high vapour pressure at room temperature. VOCs can be naturally occurring or man-made. Many scents or odours are VOCs. The present invention focuses mostly, but not exclusively, on naturally occurring fragrant compounds such as those originating from fruits and plants, as well as closely related naturally occurring and man-made compounds. Many such naturally occurring VOCs are used as odorants in the flavour and fragrance industry.

VOCs with *Drosophila* spp. pesticide activity according to the invention comprise compounds with the molecular formula $C_aH_bO_c$ wherein: a is between 4 and 13; b is 6, 8, 10, 12, 14, 16, 18, 20, 22 or 24; c is 1 or 2; and the VOCs are linear, branched or cyclic alkanes or alkenes, and comprise a single ketone, aldehyde, alcohol or ester functionality, and wherein any cyclic alkane or alkene is selected from the group consisting of cyclohexane, cyclopentane, cyclopentene and cyclopentadiene. For example, the VOCs according to the invention may be selected from: (E)-2-hexenal (also referred to as trans-2-hexenal), 4-hexen-3-one, pentanal, E-2-pentenal, hexanal, 2-heptanone, heptanal, (E)-2-heptenal (also referred to as (E)-hept-2-enal), 2-methyl-2-pentenal, E-2-octenal, octanal, nonanal, E-2-nonenal, 1-hexanol, E-3-hexenol, (E)-2-hexen-ol, (E,E)-2,4-nonadienal, (E)-2,(Z)-6-nonadienal, methyl 2-methylbutyrate, methyl cyclohexanoate, 2-butenal, 3-butenal, (Z)-1,3-butadienol, (E)-1,3-butadienol, (2E)-2-Decenal, E-2-undecenal, (2E)-2-dodecenal, tridec-2-enal (E-2-tridecenal), methyl cyclopentane carboxylate, isopropyl cyclopentane carboxylate, butyl cyclopentanecarboxylate, allyl 1-cyclopentene-1-carboxylate, pentyl cyclopentane carboxylate, methyl 2,4-cyclopentadiene-1-carboxylate, methyl 1,3-cyclopentadiene-1-carboxylate, and ethyl 1,3-cyclopentadiene-1-carboxylate.

In embodiments, a is between 5 and 13, and b is 6, 8, 10, 12, 14, 16, 18, 20, 22 or 24.

In embodiments, the pesticide VOCs are selected from: allyl 1-cyclopentene-1-carboxylate, (E,E)-2,4-nonadienal, E-2-nonenal, E-2-octenal, E-2-decenal, butyl cyclopentane carboxylate, 4-hexen-3one, E)-2,(Z)-6-nonadienal, E-2-heptenal, pentyl cyclopentane carboxylate, nonanal, E-2-undecenal, E-2-hexenal, E-2-pentenal, methyl cyclopentane carboxylate, 2-methyl-2-pentenal, isopropyl cyclopentane carboxylate, E-2-dodecenal, methyl cyclohexanoate, and heptanal.

In embodiments, the pesticide VOCs are selected from: allyl 1-cyclopentene-1-carboxylate, (E,E)-2,4-nonadienal, E-2-nonenal, E-2-octenal, E-2-decenal, butyl cyclopentane carboxylate, 4-hexen-3one, E)-2,(Z)-6-nonadienal, E-2-heptenal, pentyl cyclopentane carboxylate, nonanal, E-2-undecenal, E-2-hexenal, E-2-pentenal, and methyl cyclopentane carboxylate.

In embodiments, the pesticide VOCs are selected from: allyl 1-cyclopentene-1-carboxylate, (E,E)-2,4-nonadienal, E-2-nonenal, E-2-octenal, E-2-decenal, butyl cyclopentane carboxylate, 4-hexen-3one, E)-2,(Z)-6-nonadienal, E-2-heptenal, pentyl cyclopentane carboxylate, nonanal, E-2-undecenal, and E-2-hexenal.

In embodiments, the pesticide VOCs are selected from: allyl 1-cyclopentene-1-carboxylate, (E,E)-2,4-nonadienal, E-2-nonenal, E-2-octenal, E-2-decenal, butyl cyclopentane carboxylate, 4-hexen-3one, E)-2,(Z)-6-nonadienal, E-2-heptenal, pentyl cyclopentane carboxylate, nonanal.

In embodiments, the pesticide VOCs are selected from: allyl 1-cyclopentene-1-carboxylate, (E,E)-2,4-nonadienal, E-2-nonenal, E-2-octenal.

In embodiments, the pesticide VOCs is: allyl 1-cyclopentene-1-carboxylate.

In embodiments, a is between 4 and 10, and b is 6, 8, 10, 12, 14, 16 or 18. For example, the VOCs according to the invention may be selected from: (E)-2-hexenal (also referred to as trans-2-hexenal), 4-hexen-3-one, pentanal, (E)-2-pentenal, hexanal, 2-heptanone, heptanal, (E)-2-heptenal (also referred to as (E)-hept-2-enal), 2-methyl-2-pentenal, octanal, E-2-octenal, 1-hexanol, (E)-2-hexen-ol, E-3-hexenol, hexanal, (E,E)-2,4-nonadienal, nonanal, E-2-nonenal, (E)-2,(Z)-6-nonadienal, (2E)-2-decenal, methyl 2-methylbutyrate, methyl cyclohexanoate, 2-butenal, 3-butenal, (Z)-1,3-butadienol, (E)-1,3-butadienol, methyl cyclopentane carboxylate, isopropyl cyclopentane carboxylate, butyl cyclopentanecarboxylate, allyl 1-cyclopentene-1-carboxylate, methyl 2,4-cyclopentadiene-1-carboxylate, methyl 1,3-cyclopentadiene-1-carboxylate, isopropyl cyclopentane carboxylate and ethyl 1,3-cyclopentadiene-1-carboxylate.

In embodiments, VOCs with *Drosophila* spp. pesticide activity according to the invention comprise compounds with the molecular formula $C_aH_bO_c$ wherein: a is between 5 and 10; b is 8, 10, 12, 14, 16 or 18; c is 1 or 2 and the VOCs are linear, branched or cyclic alkanes (any cyclic alkane being a cyclohexane or cyclopentane) or alkenes (any cyclic alkene being cyclopentene), and comprise a single ketone, aldehyde, alcohol or ester functionality. For example, the VOCs according to the invention may be selected from: (E)-2-hexenal (also referred to as trans-2-hexenal), 4-hexen-3-one, (E)-2-pentenal, pentanal, hexanal, 2-heptanone, (E)-2-heptenal (also referred to as (E)-hept-2-enal), 2-methyl-2-pentenal, octanal, 1-hexanol, (E)-2-hexen-ol, E-3-hexenol, (E,E)-2,4-nonadienal, (E)-2,(Z)-6-nonadienal, methyl 2-methylbutyrate, methyl cyclohexanoate, allyl 1-cyclopentene-1-carboxylate, isopropyl cyclopentane carboxylate, E-2-nonenal, E-2-octenal, E-2-decenal, butyl cyclopentanecarboxylate, methyl cyclopentane carboxylate, and nonanal.

In embodiments, the VOCs are linear or branched alkanes or alkenes. For example VOCs selected from (E)-2-hexenal (also referred to as trans-2-hexenal), 4-hexen-3-one, (E)-2-pentenal, hexanal, 2-heptanone, (E)-2-heptenal (also referred to as (E)-hept-2-enal), 2-methyl-2-pentenal, octanal, 1-hexanol, (E)-2-hexen-ol, (E,E)-2,4-nonadienal, (E)-2,(Z)-6-nonadienal, methyl 2-methylbutyrate, 2-butenal, 3-butenal, (Z)-1,3-butadienol, (E)-1,3-butadienol, (2E)-2-Decenal, E-2-undecenal, (2E)-2-dodecenal, pentanal, heptanal, nonanal, E-3-hexenol, E-2-octenal, E-2-nonenal and tridec-2-enal. In some such embodiments, the VOCs comprise a single ketone, aldehyde or ester functionality. For example, the VOCs may be selected from (E)-2-hexenal (also referred to as trans-2-hexenal), 4-hexen-3-one, (E)-2-pentenal, hexanal, 2-heptanone, (E)-2-heptenal (also referred to as (E)-hept-2-enal), 2-methyl-2-pentenal, octanal, (E,E)-2,4-nonadienal, (E)-2,(Z)-6-nonadienal, methyl 2-methylbutyrate, 2-butenal, 3-butenal, (2E)-2-decenal, E-2-undecenal, (2E)-2-dodecenal, pentanal, heptanal, nonanal, E-3-hexenol, E-2-octenal, E-2-nonenal, (2E)-2-decenal and tridec-2-enal.

In embodiments, a is between 4 and 7. For example, VOCs according to the invention may be selected from (E)-2-hexenal (also referred to as trans-2-hexenal), 4-hexen-3-one, (E)-2-pentenal, hexanal, 2-heptanone, (E)-2-heptenal (also referred to as (E)-hept-2-enal), 2-methyl-2-pentenal, 1-hexanol, (E)-2-hexen-ol, methyl 2-methylbutyrate, 2-butenal, 3-butenal, (Z)-1,3-butadienol, (E)-1,3-butadienol, pentanal, heptanal, E-3-hexenol, methyl 2,4-cyclopentadiene-1-carboxylate or methyl 1,3-cyclopentadiene-1-carboxylate. In some such embodiments, a is 4, 5 or 6, b is 6, 8 or 10, cis 1, and the VOC is a linear alkene with a single ketone or aldehyde function. For example, the VOCs may be selected from (E)-2-hexenal, 4-hexen-3-one, (E)-2-pentenal, 2-butenal and 3-butenal.

In embodiments, a is between 5 and 7. For example, VOCs according to the invention may be selected from (E)-2-hexenal (also referred to as trans-2-hexenal), 4-hexen-3-one, (E)-2-pentenal, hexanal, 2-heptanone, E-2-heptenal (also referred to as (E)-hept-2-enal), 2-methyl-2-pentenal, 1-hexanol, (E)-2-hexen-ol, methyl 2-methylbutyrate, pentanal, heptanal, E-3-hexenol, methyl 2,4-cyclopentadiene-1-carboxylate or methyl 1,3-cyclopentadiene-1-carboxylate. In some such embodiments, a is 5 or 6, b is 8 or 10, c is 1, and the VOC is a linear alkene with a single ketone or aldehyde function. For example, the VOCs may be selected from (E)-2-hexenal, 4-hexen-3-one, (E)-2-pentenal, pentanel and hexanal.

In embodiments, a is 6 and the VOCs are linear alkanes or alkenes with a single terminal alcohol function. For example, the VOCs may be selected from 1-hexanol, E-2-hexenol, 1-hexanol, and E-3-hexenol.

In embodiments, the VOCs are selected from the compound with the formula

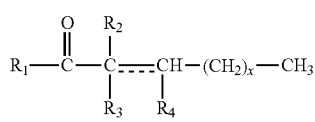

(formula I)

wherein:
$R_1$ is selected from H, $CH_3$ or $C_2H_5$;
$R_2$ is selected from H, $CH_3$ or $C_2H_5$;
$R_3$ is selected from H or $CH_3$, and $R_4$ is selected from H or $CH_3$, or $R_3$ and $R_4$ are both absent; and X is 0, 1, 2, 3, 4, 5, 6, 7, 8 or 9. For example, the VOCs according to the invention may be selected from: (E)-2-hexenal (also referred to as trans-2-hexenal and E-2-hexenal), 4-hexen-3-one, (E)-2-pentenal (also referred to as E-2-pentenal), pentanal, hexanal, 2-heptanone, (E)-2-heptenal (also referred to as (E)-hept-2-enal and E-2-heptenal), heptanal, 2-methyl-2-pentenal, octanal, (E,E)-2,4-nonadienal, 2-butenal, (E)-2,(Z)-6-nonadienal, E-2-nonenal, E-2-octenal, E-2-decenal, nonanal, E-2-undecenal, heptanal, E-2-dodecenal and E-2-tridecenal.

In embodiments, X is 0, 1, 2, 3 or 4. For example, the VOCs according to the invention may be chosen from: (E)-2-hexenal (also referred to as trans-2-hexenal and E-2-hexenal), 4-hexen-3-one, (E)-2-pentenal (also referred to as E-2-pentenal), pentanal, hexanal, heptanal, 2-heptanone, (E)-2-heptenal (also referred to as (E)-hept-2-enal and E-2-heptenal), 2-methyl-2-pentenal, octanal, E-2-octenal, (E,E)-2,4-nonadienal, 2-butenal, (E)-2,(Z)-6-nonadienal, and heptanal.

In embodiments where a double bond is present between $CR_2$ and $CHR_4$, the double bond is preferably in the trans configuration.

In embodiments, $R_2$ is H or $CH_3$; and $R_3$ and $R_4$ are both absent, or are both H. For example, the VOCs according to the invention may be chosen from: (E)-2-hexenal, 4-hexen-3-one, (E)-2-pentenal, hexanal, 2-heptanone, (E)-2-heptenal, 2-methyl-2-pentenal, octanal, (E,E)-2,4-nonadienal, and (E)-2,(Z)-6-nonadienal, E-2-nonenal, E-2-octenal, E-2-decenal, nonanal, E-2-undecenal, heptanal, E-2-dodecenal and E-2-tridecenal.

In embodiments, x is 0, 1 or 2. For example, the VOCs according to the invention may be selected from: (E)-2-hexenal, 4-hexen-3-one, (E)-2-pentenal, pentanal, hexanal, heptanal, 2-heptanone, and 2-methyl-2-pentenal.

In embodiments, $R_1$ is H. For example, the VOCs according to the invention may be selected from: (E)-2-hexenal, (E)-2-pentenal, pentanal, hexanal, (E)-2-heptenal, heptanal, 2-methyl-2-pentenal, octanal, (E,E)-2,4-nonadienal, (E)-2,(Z)-6-nonadienal, E-2-nonenal, E-2-octenal, E-2-decenal, nonanal, E-2-undecenal, heptanal, E-2-dodecenal and E-2-tridecenal.

In embodiments, $R_1$ is $C_2H_5$. For example, the VOCs according to the invention may be 4-hexen-3-one.

In embodiments, $R_2$ is H. For example, the VOCs according to the invention may be selected from: (E)-2-hexenal, 4-hexen-3=one, (E)-2-pentenal, hexanal, 2-heptanone, (E)-2-heptenal, octanal, (E,E)-2,4-nonadienal, (E)-2,(Z)-6-nonadienal, E-2-nonenal, E-2-octenal, E-2-decenal, nonanal, E-2-undecenal, heptanal, E-2-dodecenal and E-2-tridecenal.

In embodiments, the VOCs are selected from the compound with the formula

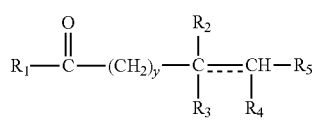

(formula III)

wherein:
$R_1$ is selected from H, $CH_3$ or $C_2H_5$;
$R_2$ is selected from H, $CH_3$ or $C_2H_5$;
$R_3$ is selected from H or $CH_3$, and $R_4$ is selected from H or $CH_3$, or $R_3$ and $R_4$ are both absent;
$R_5$ is selected from H, $CH_3$ or $(CH_2)_xCH_3$;
and
X+Y is 0, 1, 2, 3, 4, 5, 6, 7, 8 or 9. For example, the VOCs according to the invention may be selected from: (E)-2-hexenal (also referred to as trans-2-hexenal), 4-hexen-3-one, (E)-2-pentenal, hexanal, 2-heptanone, (E)-2-heptenal (also referred to as (E)-hept-2-enal), 2-methyl-2-pentenal, octanal, (E,E)-2,4-nonadienal, 2-butenal, 3-butenal, (E)-2,(Z)-6-nonadienal, E-2-nonenal, E-2-octenal, E-2-decenal, nonanal, E-2-undecenal, heptanal, E-2-dodecenal and E-2-tridecenal.

In embodiments where a double bond is present between $CR_2$ and $CHR_4$ in formula III, the double bond is preferably in the trans configuration.

In embodiments, in formula III, y is 0, $R_2$ is H or $CH_3$; and $R_3$ and $R_4$ are both absent, or are both H. For example, the VOCs according to the invention may be chosen from: (E)-2-hexenal, 4-hexen-3-one, (E)-2-pentenal, hexanal, 2-heptanone, (E)-2-heptenal, 2-methyl-2-pentenal, octanal, (E,E)-2,4-nonadienal, 2-butenal, (E)-2,(Z)-6-nonadienal, E-2-nonenal, E-2-octenal, E-2-decenal, nonanal, E-2-undecenal, heptanal, E-2-dodecenal and E-2-tridecenal. In embodiments, in formula III, x is 0, 1 or 2. For example, the VOCs according to the invention may be selected from:

(E)-2-hexenal, 4-hexen-3-one, (E)-2-pentenal, hexanal, heptanal, 2-heptanone, 2-butenal and 2-methyl-2-pentenal.

In embodiments of formula III, $R_1$ is H. For example, the VOCs according to the invention may be selected from: (E)-2-hexenal, (E)-2-pentenal, hexanal, heptanal, (E)-2-heptenal, 2-methyl-2-pentenal, octanal, (E,E)-2,4-nonadienal, 2-butenal, 3-butenal, (E)-2,(Z)-6-nonadienal, E-2-nonenal, E-2-octenal, E-2-decenal, nonanal, E-2-undecenal, E-2-dodecenal and E-2-tridecenal.

In embodiments of formula III, $R_1$ is $C_2H_5$. For example, the VOC according to the invention may be 4-hexen-3-one.

In embodiments of formula III, $R_2$ is H. For example, the VOCs according to the invention may be selected from: (E)-2-hexenal, 4-hexen-3-one, (E)-2-pentenal, hexanal, 2-heptanone, (E)-2-heptenal, octanal, (E,E)-2,4-nonadienal, (E)-2,(Z)-6-nonadienal, E-2-nonenal, E-2-octenal, E-2-decenal, nonanal, E-2-undecenal, heptanal, E-2-dodecenal and E-2-tridecenal.

In embodiments of formula III, y is 1. In some embodiments, y is 1 and x is 0. For example, the VOC according to the invention may be 3-butenal.

In some embodiments, the one or more pesticide VOCs have the formula:

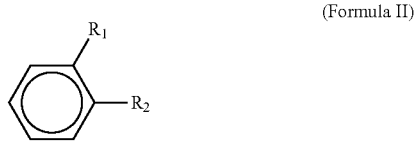

(Formula II)

wherein $R_1$ is OH or absent, and $R_2$ is an aldehyde functional group or a linear or branched alkane or alkene with 1 to 5 carbons and a single ester or ketone functional group. For example, the pesticide VOCs of the invention may be selected from: benzaldehyde, methyl benzoate, methyl salicylate, ethyl benzoate, propyl benzoate, benzyl acetate, ethyl phenyl acetate, butyl benzoate, pentyl benzoate or acetophenone. In embodiments, R2 is an aldehyde functional group or a linear or branched alkane or alkene with 1 to 5 carbons and a single ester functional group.

In embodiments, the pesticide VOCs are selected from: benzaldehyde, ethyl phenylacetate, methyl benzoate, ethyl benzoate, methyl salicylate, propyl benzoate, acetophenone and benzyl acetate.

In embodiments, the pesticide VOCs are selected from: benzaldehyde, ethyl phenylacetate, and methyl benzoate.

In embodiments, the pesticide VOCs are selected from: benzaldehyde.

In embodiments, $R_2$ is an aldehyde functional group or a linear or branched alkane or alkene with 1 to 3 carbons and a single ester or ketone functional group. For example, the pesticide VOCs of the invention may be selected from: benzaldehyde, methyl benzoate, methyl salicylate, ethyl benzoate, propyl benzoate, benzyl acetate, ethyl phenyl acetate and acetophenone.

In embodiments, the one or more pesticide VOCs are described by formula II wherein $R_1$ is OH or absent, and $R_2$ is an aldehyde functional group or a linear or branched alkane or alkene with 1 to 3 carbons and a single ester functional group, but $R_2$ is not COOCH3 if $R_1$ is absent.

In preferred embodiments, the one or more pesticide VOCs are described by formula II wherein $R_1$ is OH or absent, and $R_2$ an aldehyde functional group or a linear alkane with 1 to 3 carbons and a single ester or ketone functional group.

In embodiments, the one or more pesticide VOCs are described by formula II wherein $R_1$ is OH or absent, and $R_2$ is an aldehyde functional group or —$COOR_3$ where $R_3$ is a methyl, ethyl or propyl group.

For example, the one or more pesticide VOCs may be selected from: benzaldehyde, methyl benzoate, methyl salicylate, ethyl benzoate and propyl benzoate.

In embodiments, the one or more pesticide VOCs are described by formula II wherein $R_1$ is absent and $R_2$ is a linear alkane with 1 to 3 carbons and a single ketone functional group. For example, the one or more pesticide VOCs may be acetophenone.

VOCs according to the invention may be expected to have a level of toxicity to Drosophila spp., and in particular to D. suzukii, that negatively correlates with their molecular weight. In embodiments, the one or more VOCs in the compositions of the invention have a molecular weight below 180 g/mol. For example, compositions according to such embodiments may comprise one ore more VOCs selected from: butyl benzoate (178.23 g/mol), butyl cyclopentanecarboxylate (170.25 g/mol), E-2-undecenal (168.28 g/mol), propyl benzoate (164.20 g/mol), isopropyl cyclopentanecarboxylate (156.22 g/mol), (2E)-2-decenal (154.25 g/mol), ethyl phenyl acetate (150.17 g/mol), methyl salicylate (152.15 g/mol), ethyl benzoate (150.17 g/mol), benzyl acetate (150.18 g/mol), methyl cyclohexanoate (142.20 g/mol), allyl 1-cyclopentene-1-carboxylate (138.17 g/mol), methyl benzoate (136.15 g/mol), (E)-2,(Z)-6-nonadienal (138.21 g/mol), (E,E)-2,4-nonadienal (138.21 g/mol), ethyl 1,3-cyclopentadiene-1-carboxylate (138.17 g/mol), methyl cyclopentanecarboxylate (128.17 g/mol), methyl 2,4-cyclopentadiene-1-carboxylate (124.14 g/mol), methyl 1,3-cyclopentadiene-1-carboxylate (124.14 g/mol), 1-hexanol (102.18 g/mol), (E)-2-hexen-ol (100.16 g/mol), octanal (128.21 g/mol), methyl 2-methylbutyrate (116.16 g/mol), 2-heptanone (114.18 g/mol), (E)-2-heptenal (112.17 g/mol), benzaldehyde (106.12 g/mol), hexanal (100.16 g/mol), 2-methyl-2-pentenal (98.14 g/mol), (E)-2-hexenal (98.14), 4-hexen-3-one (98.14 g/mol) (E)-2-pentenal (84.12 g/mol), 2-butenal (70.10 g/mol), 3-butenal (70.10 g/mol), 2-butenal (70.10 g/mol), (Z)-1,3-butanediol (70.10 g/mol), (E)-1,3-Butanediol (70.10 g/mol), pentanal (86.13 g/mol), heptanal (114.18 g/mol), nonanal (142.24 g/mol), E-3-hexenol (100.16 g/mol), E-2-octenal (126.20 g/mol), E-2-nonenal (140.23 g/mol) and acetophenone (120.15 g/mol).

In embodiments, the VOCs in the compositions of the invention have a molecular weight below 140 g/mol. For example, compositions according to such embodiments may comprise one ore more VOCs selected from: allyl 1-cyclopentene-1-carboxylate (138.17 g/mol), methyl benzoate (136.15 g/mol), (E)-2,(Z)-6-nonadienal (138.21 g/mol), (E,E)-2,4-nonadienal (138.21 g/mol), ethyl 1,3-cyclopentadiene-1-carboxylate (138.17 g/mol), methyl cyclopentanecarboxylate (128.17 g/mol), methyl 2,4-cyclopentadiene-1-carboxylate (124.14 g/mol), methyl 1,3-cyclopentadiene-1-carboxylate (124.14 g/mol), 1-hexanol (102.18 g/mol), (E)-2-hexen-ol (100.16 g/mol), octanal (128.21 g/mol), methyl 2-methylbutyrate (116.16 g/mol), 2-heptanone (114.18 g/mol), (E)-2-heptenal (112.17 g/mol), benzaldehyde (106.12 g/mol), hexanal (100.16 g/mol), 2-methyl-2-pentenal (98.14 g/mol), E-2-hexenal (98.14), 4-hexen-3-one (98.14 g/mol) E-2-pentenal (84.12 g/mol), 2-butenal (70.10 g/mol), 3-butenal (70.10 g/mol), 2-butenal (70.10 g/mol), (Z)-1,3-butanediol (70.10 g/mol), (E)-1,3-Butanediol (70.10 g/mol), pentanal (86.13 g/mol), heptanal (114.18 g/mol), E-3-hexenol (100.16 g/mol), E-2-octenal (126.20 g/mol) and acetophenone (120.15 g/mol).

In embodiments, the VOCs in the compositions of the invention have a molecular weight below 120 g/mol. For example, compositions according to such embodiments may comprise one ore more VOCs selected from: 1-hexanol (102.18 g/mol), (E)-2-hexen-ol (100.16 g/mol), methyl 2-methylbutyrate (116.16 g/mol), 2-heptanone (114.18 g/mol), (E)-2-heptenal (112.17 g/mol), benzaldehyde (106.12 g/mol), hexanal (100.16 g/mol), 2-methyl-2-pentenal (98.14 g/mol), E-2-hexenal (98.14), 4-hexen-3-one (98.14 g/mol) (E)-2-pentenal (84.12 g/mol), 2-butenal (70.10 g/mol), 3-butenal (70.10 g/mol), 2-butenal (70.10 g/mol), (Z)-1,3-butanediol (70.10 g/mol), and (E)-1,3-Butanediol (70.10 g/mol), pentanal (86.13 g/mol), heptanal (114.18 g/mol), and E-3-hexenol (100.16 g/mol).

In embodiments, the VOCs in the compositions of the invention have a molecular weight below 110 g/mol. For example, compositions according to such embodiments may comprise one ore more VOCs selected from: 1-hexanol (102.18 g/mol), (E)-2-hexen-ol (100.16 g/mol), benzaldehyde (106.12 g/mol), hexanal (100.16 g/mol), 2-methyl-2-pentenal (98.14 g/mol), (E)-2-hexenal (98.14), 4-hexen-3-one (98.14 g/mol) (E)-2-pentenal (84.12 g/mol), 2-butenal (70.10 g/mol), 3-butenal (70.10 g/mol), 2-butenal (70.10 g/mol), (Z)-1,3-butanediol (70.10 g/mol), (E)-1,3-Butanediol (70.10 g/mol), pentanal (86.13 g/mol), and E-3-hexenol (100.16 g/mol).

In embodiments, the VOCs in the compositions of the invention have a molecular weight below 100 g/mol. For example, compositions according to such embodiments may comprise one ore more VOCs selected from: 2-methyl-2-pentenal (98.14 g/mol), (E)-2-hexenal (98.14), 4-hexen-3-one (98.14 g/mol) (E)-2-pentenal (84.12 g/mol), 2-butenal (70.10 g/mol), 3-butenal (70.10 g/mol), 2-butenal (70.10 g/mol), (Z)-1,3-butanediol (70.10 g/mol), (E)-1,3-Butanediol (70.10 g/mol), and pentanal (86.13 g/mol).

VOCs according to the invention may be expected to have a level of toxicity to *Drosophila* spp., and in particular to *D. suzukii*, that negatively correlates with their predicted hydrophobicity. In embodiments, the octanol-water partition coefficient of VOCs may be used as a measure of hydrophobicity. Compounds with high octanol-water partition coefficients are associated with increased accumulation in biolipids, possibly resulting in acute and chronic toxicity. Accordingly, advantageous embodiments of the invention comprise VOCs that have low octanol-water partition coefficients compared to existing commercial insecticides. In particular, embodiments of the invention may comprise VOCs that have an octanol-water partition coefficient lower than that of DDT.

Hydrophobicity LogPOW may be calculated using the method described in Chen et al., 2007, for example as implemented in the XLogP3 algorithm provided in the ALOGPS 2.1 (Tetko et al. 2005) program from VCC LAB (http://www.vcclab.org).

In embodiments, the one or more VOCs in the compositions of the invention have a predicted hydrophobicity (octanol-water partition coefficient) LogPOW below 3. For example, compositions according to such embodiments may comprise one ore more VOCs selected from (all values between brackets representing the predicted LogP:Octanol-Water of the compound as provided by the US Environmental Protection Agency: https://comptox.epa.gov/dashboard): propyl benzoate (2.99), ethyl phenyl acetate (2.39), methyl salicylate (2.34), benzyl acetate (1.95), methyl cyclohexanoate (2.44), methylbenzoate (2.5), (E)-2,(Z)-6-nonadienal (2.84), (E,E)-2,4-nonadienal (2.73), 1-hexanol (1.92), (E)-2-hexen-ol (1.53), methyl 2-methylbutyrate (1.7), benzaldehyde (1.46), 2-heptanone (1.95), (E)-2-heptenal (2.04), hexenal (1.87), 2-methyl-2 pentenal (1.08), (E)-2-hexenal (1.45), 4-hexen-3-one (1.01), (E)-2-pentenal (1.03), 2-butenal (0.59), 3-butenal (0.63), methyl cyclopentanecarboxylate (1.91), isopropyl cyclopentanecarboxylate (2.5), butyl cyclopentanecarboxylate (2.9), allyl 1-cyclopentene-1-carboxylate (2.1), methyl 2,4-cyclopentadiene-1-carboxylate (1.27), methyl 1,3-cyclopentadiene-1-carboxylate (1.75), ethyl 1,3-cyclopentadiene-1-carboxylate (1.8), (Z)-1,3-butadienol, (E)-1,3-butadienol, pentanal (1.36), heptanal (2.39), E-3-hexenol (1.46), E-2-octenal (2.88) and acetophenone (1.59).

In embodiments, the one or more VOCs in the compositions of the invention have a predicted hydrophobicity (octanol-water partition coefficient) LogPOW below 2. For example, compositions according to such embodiments may comprise one ore more VOCs selected from: benzyl acetate, 1-hexanol, (E)-2-hexen-ol, methyl 2-methylbutyrate, benzaldehyde, 2-heptanone, hexenal, 2-methyl-pentenal, (E)-2-hexenal, 4-hexen-3-one, (E)-2-pentenal, 2-butenal, 3-butenal, methyl cyclopentanecarboxylate, methyl 2,4-cyclopentadiene-1-carboxylate, methyl 1,3-cyclopentadiene-1-carboxylate, ethyl 1,3-cyclopentadiene-1-carboxylate, (Z)-1,3-butadienol, (E)-1,3-butadienol, pentanal (1.36), E-3-hexenol (1.46), and acetophenone (1.59).

In embodiments, the one or more VOCs in the compositions of the invention have a predicted hydrophobicity (octanol-water partition coefficient) LogPOW below 1.7. For example, compositions according to such embodiments may comprise one ore more VOCs selected from: (E)-2-hexen-ol, methyl 2-methylbutyrate, benzaldehyde, 2-methyl-2 pentenal, (E)-2-hexenal, 4-hexen-3-one, (E)-2-pentenal. 2-butenal (0.59), 3-butenal (0.63), methyl 2,4-cyclopentadiene-1-carboxylate (1.27), (Z)-1,3-butadienol, (E)-1,3-butadienol, pentanal (1.36), E-3-hexenol (1.46), and acetophenone (1.59).

In embodiments, the one or more VOCs in the compositions of the invention have a low hydrophobicity (i.e. predicted LogPOW below 3, below 2.5, below 2 or below 1.7) and a low molecular weight (i.e. below 180 g/mol, below 120 g/mol, below 110 g/mol or below 100 g/mol).

For example, VOCs according to the invention may have a predicted logPOW below 2.5 and a molecular weight below 120 g/mol. For example, compositions according to such embodiments may comprise one ore more VOCs selected from: 1-hexanol, (E)-2-hexen-ol, methyl 2-methylbutyrate, benzaldehyde, 2-heptanone, (E)-2-heptenal, hexenal 2-methyl-2-pentenal, (E)-2-hexenal, 4-hexen-3-one, (E)-2-pentenal, 2-butenal, 3-butenal, (Z)-1,3-butadienol, and (E)-1,3-butadienol.

Advantageously, the VOCs used in the pesticide compositions of the invention are toxic to *Drosophila* species by aerial exposure, i.e. the VOCs are toxic in vapour/gas form. Therefore, the pesticide compositions according to the invention may be adapted for release of the VOCs in vapour or gas form. For example, a solvent may be chosen to encourage or otherwise control the release of the VOCs in vapour or gas form.

In embodiments, a pesticide composition according to the invention may be prepared by mixing paraffin oil with one or more pesticide VOCs of the invention. In embodiments, a pesticide composition according to the invention may be prepared by mixing a solvent such as water with an emulsifier and one or more pesticide VOCs of the invention. Emulsifiers such as Tween 20 may be used. Any agriculturally acceptable emulsifier may be used.

In embodiments, the VOCs used in the pesticide compositions of the invention are attractant or repellent to *Drosophila* species by aerial exposure. In such embodiments, the pesticide compositions according to the invention may be adapted for release of the VOCs in vapour/gas form.

In embodiments, the VOCs used in the pesticide compositions of the invention are toxic to *Drosophila* species by direct contact, i.e. topical application. In such embodiments, the pesticide compositions according to the invention may be adapted for conditioning of the VOCs in liquid form. For example, the pesticide compositions according to the invention may be sprayed on crops and be toxic to pests that enter into contact with the crop.

In embodiments, the pesticide compositions according to the invention may be in gel or solid form. Such compositions may be adapted to release one or more of the pesticide VOCs according to the invention in vapour or gas form when a pesticide VOC is effective by aerial exposure, and/or they may be adapted to expose the VOC for direct contact with the pest when a pesticide VOC is effective by topical application.

In embodiments, the VOCs used in the pesticide compositions of the invention are toxic to *Drosophila* species by direct contact and by aerial exposure. In other embodiments, pesticide VOCs according to the invention may have a different effect on direct contact and on aerial exposure. For example, a pesticide VOC may be attractant to a pest on aerial exposure (for example when the concentration of the VOC in the air is lower than that in the composition itself), and toxic to the pest on direct contact.

The pesticide compositions according to the invention are advantageously efficient to kill or incapacitate *Drosophila* spp. insects at low concentrations. For example, the VOCs according to the invention may be present in a pesticide composition at a concentration of at least 0.1%, at least 0.5%, at least 1%, at least 2%, at least 3%, or at least 5% by volume of the composition. In embodiments, the VOCs according to the invention may be present in a pesticide composition at a concentration of at least 2%, at least 3%, or at least 5% by volume of the composition.

The amount of pesticide VOCs that are suitable for use in the compositions of the invention may be determined by routine screening procedures to evaluate pest controlling efficacy, as known in the art and as shown in the Examples below. The amount of pesticide VOCs used is preferably chosen such that any potential adverse effects on the environment, wildlife and users that may come into contact with the composition is minimised.

As the skilled person would understand, the exact VOC concentrations used may depend on the desired effect. For example, the same VOC may have a different effect at a lower concentration than at a higher one (e.g. a pesticide VOC may be repellent at low concentration and lethal at high concentration). Further, the exact concentrations used may depend on the desired specificity spectrum of the composition. For example, a pesticide VOC may have an effect on a set of pests (or other collateral targets such as *Apis Mellifera*) at a first concentration, and have an effect only on a subset of those pests (or collateral targets) at a second, lower concentration. The exact concentrations used may instead or in addition depend on any of: the formulation of the composition, the amount of composition that is used, the particular way in which the composition is applied, the frequency with which the composition is applied, etc. The skilled person would know to adjust the concentrations of pesticide VOCs to their particular use case.

In advantageous embodiments, the pesticide compounds of the invention are specific to one or more species of *Drosophila*. The reference to a pesticide compound being 'specific to one or more series species of *Drosophila*' as used herein refers to the compound being significantly more toxic to one or more species than to other species of *Drosophila*, at least in some concentrations. For example, a compound may be considered to be specific to *D. suzukii* if it can be included in a composition with at least one concentration at which the composition is more toxic to *D. suzukii* than to at least some other species of flies. In embodiments, a compound is considered to be significantly more toxic to a species than another at a given concentration if it is lethal to the first species and not lethal to the second species at the given concentration.

In embodiments, the pesticide compounds of the invention are specific to one or more species of *Drosophila* chosen from *D. suzukii, D. simulans, D. schellia, D. erecta, D. yakuba* or *D. biarmipes*. In advantageous embodiments, the pesticide compounds of the invention are more toxic to *D. suzukii, D. simulans, D. schellia, D. santomea, D. erecta, D. yakuba* or *D. biarmipes* than to *D. melanogaster*. In advantageous embodiments, the pesticide compounds of the invention are more toxic to *D. suzukii, D. simulans, D. schellia, D. erecta, D. yakuba* or *D. biarmipes* than to *D. melanogaster* or *D. santomea*.

In advantageous embodiments, the pesticide compounds of the invention are more toxic to *D. suzukii* than to any of *D. melanogaster, D. simulans, D. schellia, D. santomea, D. erecta, D. yakuba* and/or *D. biarmipes*. In advantageous embodiments, the pesticide compounds of the invention are more toxic to *D. suzukii* than to *D. melanogaster*.

In embodiments, the pesticide compounds of the invention are specific to species of *Drosophila* that have a significantly higher level of expression of the para gene (*D. melanogaster* FlyBase ID FBgn0285944, http://flybase.org/reports/FBgn0285944.html, and orthologs) compared to *Drosophila melanogaster*. Without wishing to be bound by theory, it is believed that the pesticide VOCs of the invention may act at least partially through modulation of the activity of voltage-gated sodium channels (VGSCs), encoded by the para gene. In embodiments, the difference in expression level between species is assessed using matched sex samples. In embodiments, the difference in expression level between species is assessed at the adult or at the larval stage. A difference in gene expression level may be assessed using experimental and data analysis methods known in the art. For example, qPCR or RNA sequencing may be used. Significance may be assessed as known in the art.

In advantageous embodiments, the pesticide compositions of the invention are not toxic to honeybees (*Apis mellifera*). In such embodiments, the pesticide VOCs are non-lethal to *Apis mellifera* at any concentration, or are present in the pesticide compositions at a concentration that is non-lethal to *Apis mellifera* while maintaining efficacy against one or more *Drosophila* spp. of interest. For example, the VOCs of the invention may be used at a maximum concentration of 20% to avoid or reduce potential toxicity to *Apis mellifera*. In embodiments, toxicity to honeybees may be assessed in relation to adult bees.

In embodiments of the invention, the pesticide VOCs may be used as attractants for the larvae of some *Drosophila* spp. In embodiments of the invention, the pesticide VOCs may be used as attractants for the adult of some *Drosophila* spp. In embodiments of the invention, the pesticide VOCs may be used as attractants for the larvae and the adult of some

*Drosophila* spp. In embodiments, the pesticide VOCs of the invention may be used as part of traps for a pest.

In embodiments, the pesticide VOCs according to the invention are repellent to *Drosophila* spp. In embodiments, the pesticide VOCs according to the invention are ovipositional repellents for *Drosophila* spp. In such embodiments, the pesticide VOCs according to the invention may reduce the likelihood of the adult of at least one species of *Drosophila* laying eggs in the vicinity of the pesticide VOCs. For example, pesticide compositions comprising one or more pesticide VOCs according to the invention may be used to reduce the likelihood of a pest, such as *D. suzukii*, laying eggs on a treated crop.

The pesticide compounds and compositions of the invention are particularly useful to prevent, reduce or eliminate a *Drosophila* spp. infestation, and in particular a *D. suzukii* infestation. As such, disclosed herein is the use of pesticide compounds and compositions as described herein in the prevention, reduction or elimination of *Drosophila* spp pest, and in particular *D. suzukii, D. simulans, D. schellia, D. santomea, D. erecta, D. yakuba* and/or *D. biarmipes* pest. In particular, there is disclosed the use of pesticide compounds and compositions as described herein in the prevention, reduction or elimination of *D. suzukii* pest. Methods of preventing, reducing or eliminating a *Drosophila* spp. infestation, in particular a *D. suzukii, D. simulans, D. schellia, D. erecta, D. yakuba* and/or *D. biarmipes* infestation comprising using the one or more pesticide compounds or compositions as described herein (for example by applying the compounds or compositions to a crop or crop storage container or chamber) are also provided. The pesticide compounds and compositions of the invention may be particularly useful in cultures such as fruit cultures, where *D. suzukii* pest is a significant problem.

Further, the pesticide compounds and compositions of the invention may be particularly useful in pest management for harvested crops, such as fruit crops. In particular, the use according to the invention may comprise use before, after or during storage of harvested crops, to prevent, reduce or eliminate a *Drosophila* spp. infestation, such as a *D. suzukii* infestation on said harvested crop.

The pesticide compounds and compositions of the invention are toxic to adult, egg and larvae *Drosphila* spp., and in particular *D. suzukii*, Therefore, the pesticide compositions according to the invention may be applied as residual pesticide composition and/or fumigant in empty containers or chambers prior to them being filled with harvested crop. For example, crop storage bins and containers, and quarantine and/or disinfection chambers, etc. may be treated. In embodiments, a composition that comprises one or more pesticide compounds of the invention, may be sprayed in and around the fan, aeration ducts, auger, door openings, and covers of the storage room before being filled at harvest; or vaporised/fumigated in gas form in a (storage) bin, container, quarantine and/or disinfection chamber, etc.; preferably with an air-circulation system (closed-loop fumigation), before filling of the container or chamber at harvest. This may protect the crop harvest from pest insects that have entered and/or will enter into the storage room before, during or after storing the harvest.

In addition, the pesticide compositions according to the invention may be applied as protectant pesticide composition onto the harvested crop, and may form a residual pesticide composition. As such, the pesticide compounds and compositions according to the invention may remain on the crop after it is sold as food. For example, a composition that comprises one or more compounds of the invention may be sprayed directly onto the crop harvest going into the storage. This may protect the crop harvest from damage by killing eggs and/or larvae in the already infested harvested fruit and/or by preventing infestation from adult pest insects. Similarly, the compounds and compositions of the invention may be sprayed on crop harvest already in storage, or vaporised/fumigated in gas form (preferably using closed-loop fumigation). This may be particularly advantageous when no other control method can control the insect infestation and/or when a pest control process is necessary from a regulatory perspective before transportation of the crop harvest (e.g. when quarantine and/or disinfection measures are required).

The invention will now be further illustrated by way of the following non-limiting examples.

EXAMPLES

Unless otherwise indicated, commercially available reagents and standard techniques in biology, chemistry and biochemistry were used.

Example 1

Toxicity of Selected Compounds According to the Invention as Well as Comparative Compounds in *D. suzukii*

A selection of compounds according to the invention were tested for airborne toxicity to *D. suzukii* by exposing a population of adult *D. suzukii* flies to the vapours of the compound using an experimental set up as shown on FIG. 1A.

In particular, adult flies 2 were exposed to compositions 4 comprising one or more of a selection of VOCs according to the invention or a comparative example, in a petri dish 6. The compositions 4 were loaded onto the lid 6a of the petri dish 6 and the flies were placed into the base 6b of the dish, which was then covered by a sheet of plastic mesh netting 8 to avoid direct contact of the flies 2 with the compositions 4, before replacing the lid 6a. The onset of paralysis/loss of locomotion control, ultimately resulting in death of the flies 2, was monitored over a period of 1 hour or until all flies 2 were dead, determined when fly wings were vertical (similar to the protocol described in Legal et al. 1992 and 1994).

Each composition 4 that was tested comprised VOC at a concentration of 10 M, in paraffin oil. Four drops of 50 microlitres were dispensed into reinforcement rings (not shown) fixed on the inner surface of the petri dish lid 6a. The petri dish 6 used in this example has a diameter of 9 cm and 5 to 10 adult flies of mixed sex were placed in each dish.

The following VOCs were used, all diluted as indicated in paraffin oil: methyl benzoate; ethyl benzoate; propyl benzoate; methyl salicylate; methyl cyclohexanoate, linalyl benzoate; benzaldehyde; ethyl phenylacetate; benzyl acetate; methyl 2-methyl butyrate; benzyl benzoate; benzyl salicylate; (E)-2-hexenal; (E)-2-heptenal; (E)-2-pentenal; 2-methyl-2-pentenal; (E)-2-hexen-1-ol; hexanal; 1-hexanol; 2-heptanone; (E,Z)-2,6-nonadienal (also referred to herein as (E)-2,(Z)-6-nonadienal); (E,E)-2,4-nonadienal; (E)-3-hexenoic acid, 4-hexen-3-one, octanal, E-3-hexenol, E-2-octenal, E-2-nonenal, E-2-decenal, E-2-undecenal, E-2-dodecenal, E-2-tridecenal, pentyl benzoate, methyl cyclopentane carboxylate, isopropyl cyclopentane carboxylate, butyl cyclopentane carboxylate, allyl 1-cyclopentane-1-carboxylate, pentyl cyclopentane carboxylate, pentanal, heptanal, nonanal, acetophenone, and 4,5-dimethyl-3-hydroxy-2,5-dihydrofuran-2-one.

Figure 1B:
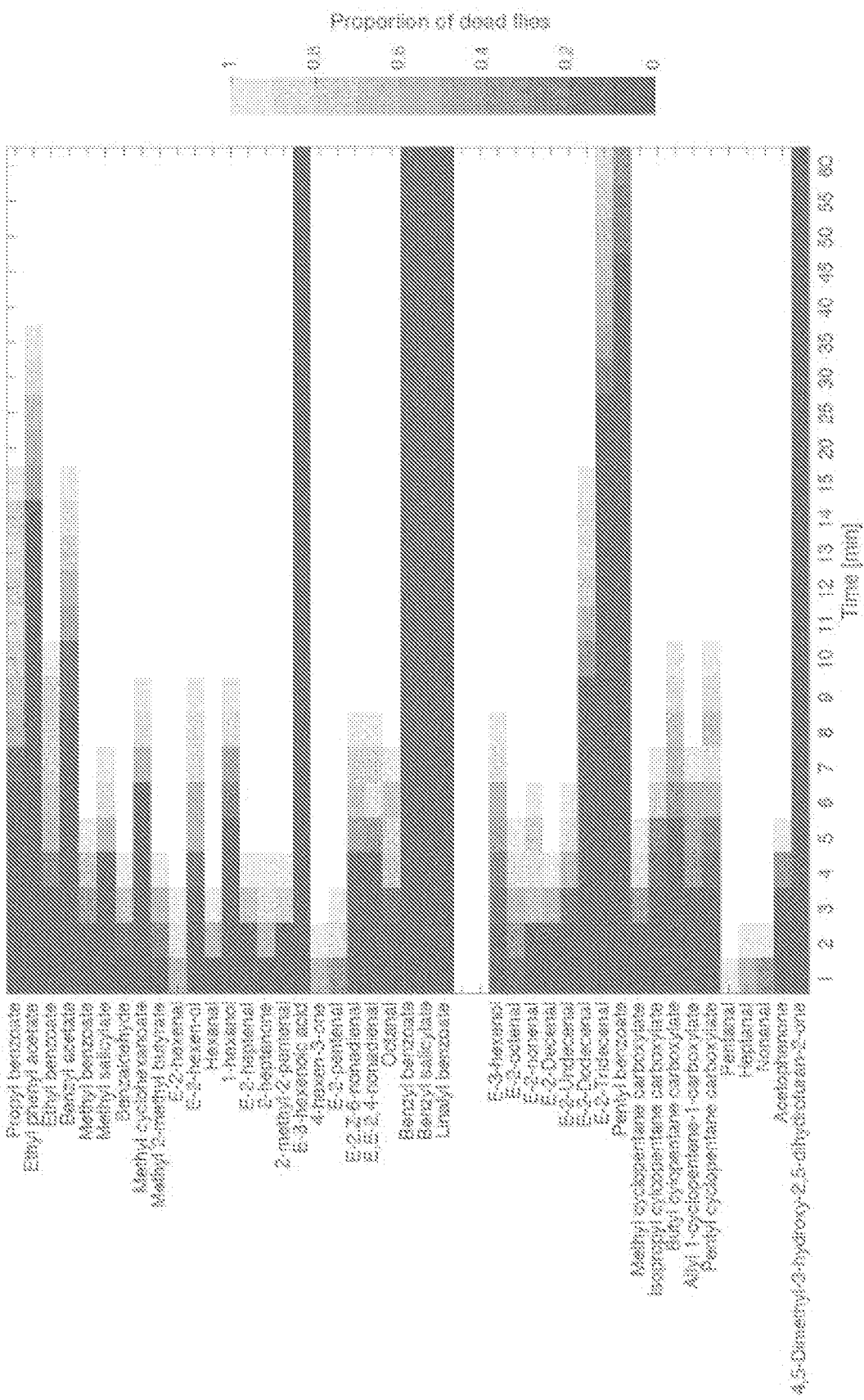

The results of this analysis can be seen in FIG. 1B, where the proportion of dead flies as a function of time is plotted for each of the compositions according to the invention (i.e. compositions comprising a compound selected from: propyl benzoate, ethyl phenyl acetate, ethyl benzoate, benzyl acetate, methyl benzoate, methyl salicylate, benzaldehyde, methyl cyclohexanoate, methyl 2-methyl butyrate, (E)-2-hexenal, (E)-2-hexen-1-ol, hexanal, 1-hexanol, (E)-2-heptenal, 2-heptanone, 2-methyl-2-pentenal, 4-hexen-3-one, (E)-2-pentenal, (E,E)-2,4-nonadienal, (E,Z)-2,6-nonadienal, octanal), E-3-hexenol, E-2-octenal, E-2-nonenal, E-2-decenal, E-2-undecenal, E-2-dodecenal, E-2-tridecenal, pentyl benzoate, methyl cyclopentane carboxylate, isopropyl cyclopentane carboxylate, butyl cyclopentane carboxylate, allyl 1-cyclopentane-1-carboxylate, pentyl cyclopentane carboxylate, pentanal, heptanal, nonanal, acetophenone, as well as comparative compositions (i.e. compositions comprising (E)-3-hexenoic acid, benzyl benzoate, benzyl salicylate, linalyl benzoate and 4,5-dimethyl-3-hydroxy-2,5-dihydrofuran-2-one).

As can be seen on FIG. 1B, all but two of the compositions (i.e. E-2-tridecenal, pentyl benzoate) according to the invention resulted in 100% dead flies in under an hour, and all but three of the compositions according to the invention resulted in 100% dead flies within half an hour (i.e. with the further exception of ethyl phenyl acetate). However, the compositions in the comparative examples did not show any sign of lethality even after an hour.

Physico-chemical properties of the compositions tested were investigated to determine whether the toxicity at high concentration of the compounds of the invention could be correlated with specific physico-chemical properties. The results of these investigations in relation to molecular weight and hydrophobicity are shown in FIGS. 2A (molecular weight) and 2B (hydrophobicity).

Figure 2:
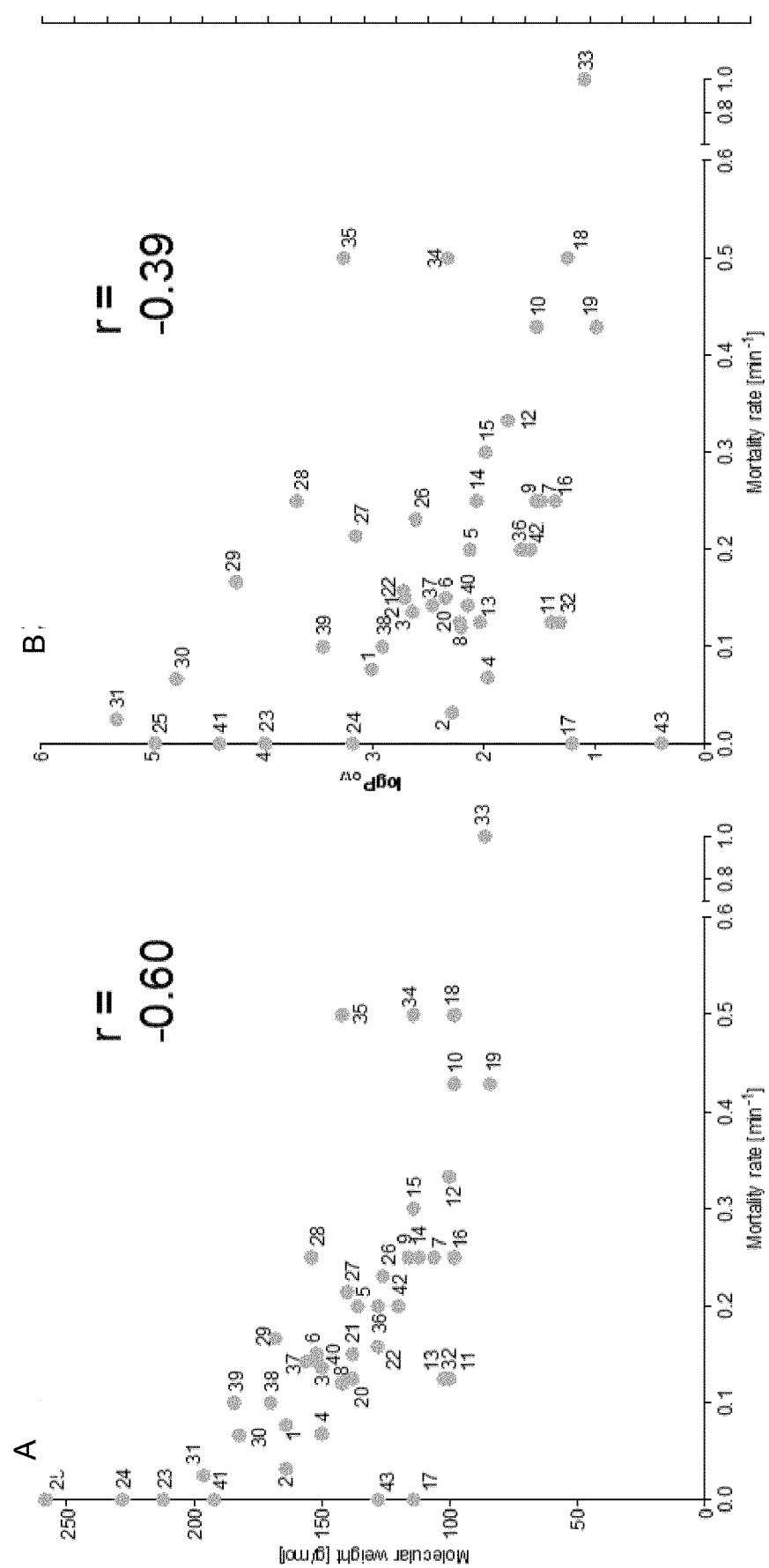
FIGS. 2A and 2B show an analysis of the physicochemical properties of pesticide compositions comprising volatile organic compounds of the invention as well as comparative examples.

The identity of the compounds listed in FIGS. 2A and 2B is provided in Table 0 below.

TABLE 0

| | |
|---|---|
| 1 | Propyl benzoate |
| 2 | Ethyl phenylacetate |
| 3 | Ethyl benzoate |
| 4 | Benzyl acetate |
| 5 | Methyl benzoate |
| 6 | Methyl saicylate |
| 7 | Benzaldehyde |
| 8 | Methyl cyclohxanoate |
| 9 | Methyl 2-methyl butyrate |
| 10 | E-2-hexenal |
| 11 | E-2-hexen-ol |
| 12 | Hexanal |
| 13 | 1-hexanol |
| 14 | E-2-heptenal |
| 15 | 2-heptanone |
| 16 | 2-methyl-2-pentenal |
| 17 | trans-3-Hexenoic acid |
| 18 | 4-hexen-3-one |
| 19 | E-2-pentenal |
| 20 | trans-2,cis-6-Nonadienal |
| 21 | trans,trans-2.4-Nonadieal |
| 22 | Octanal |
| 23 | Benzyl benzoate |
| 24 | Benzyl salicylate |
| 25 | Linalyl benzoate |
| 26 | E-2-octenal |
| 27 | E-2-nonenal |
| 28 | E-2-decenal |
| 29 | E-2-undercenal |
| 30 | E-2-dodecenal |
| 31 | E-2-tridecenal |
| 32 | E-3-hexenol |

TABLE 0-continued

| | |
|---|---|
| 33 | Pentanal |
| 34 | Heptanal |
| 35 | Nonanal |
| 36 | Methyl cyclopentanecarboxylate |
| 37 | Isopropyl cyclopentanecarboxylate |
| 38 | Butyl cyclopentanecarboxylate |
| 39 | Pentyl cyclopentanecarboxylate |
| 40 | Allyl 1-cyclopentene-1-carboxylate |
| 41 | Pentyl benzoate |
| 42 | Acetophenone |
| 43 | 4,5-Dimethyl-3-hydroxy-2,5-dihydrofuran-2-one |

FIG. 2A shows the molecular weight in g/mol of each of the compounds tested in FIG. 1B, as a function of the mortality rate (in $min^{-1}$) associated with the compound, obtained using the assay described above. The Pearson correlation coefficient between the mortality rate and the molecular weight was calculated as $-0.60$ ($p<10^{-4}$), indicating a significant negative correlation between the molecular weight of the compounds of the invention and their lethality to *D. suzukii*. This indicates that although all compounds according to the invention are expected to have some toxicity to *D. suzukii*, lighter compounds are expected to be more toxic than heavier compounds, at least at high concentration.

FIG. 2B shows the predicted hydrophobicity ($LogP_{OW}$, which is a measure for the permeability of compounds through lipid bilayers) of each of the compounds tested in FIG. 1B, as a function of the mortality rate (in $min^{-1}$) associated with the compound, obtained using the assay described above.

The hydrophobicity prediction was obtained using the XLogP3 algorithm for calculations of $LogP_{OW}$ values (Cheng et al. 2007) as provided in the publicly accessible ALOGPS 2.1 (Tetko et al. 2005) program from VCCLAB (http://www.vcclab.org), using molecular 3D structures obtained from PubChem (https://pubchem.ncbi.nlm.nih.gov).

The Pearson correlation coefficient between the mortality rate and the hydrophobicity was calculated as $-0.39$ ($p=0.01$), indicating a weak but significant negative correlation between the hydrophobicity of the compounds of the invention and their lethality to *D. suzukii*. This indicates that although all compounds according to the invention are expected to have some toxicity to *D. suzukii*, more hydrophilic compounds are expected to be more toxic than less hydrophilic compounds, at least at high concentration.

Conversely, compounds that did not cause mortality in *D. suzukii* were comparatively large, comparatively hydrophobic, or both (e.g. linalyl benzoate, benzyl benzoate and benzyl salicylate).

Example 2

Toxic Concentrations of Compounds According to the Invention

Having established that the VOCs of the invention are toxic to *Drosophila* spp., and in particular, *D. suzukii*, upon exposure to the vapours from a 10% vol. solution, the inventors set out to determine the range of concentrations at which the pesticide VOCs of the invention are expected to be lethal to *Drosphila* spp. Two species were chosen: the pest *D. suzukii* and the common *Drosophila* model *D. melanogaster*. Two exemplary compounds were chosen: (E)-2-hexenal and methyl benzoate, both of which were shown in Example 1 to be highly toxic to *D. suzukii*. The experimental set up used was as described in relation to FIG. 1A.

Figures 3A, 3B:
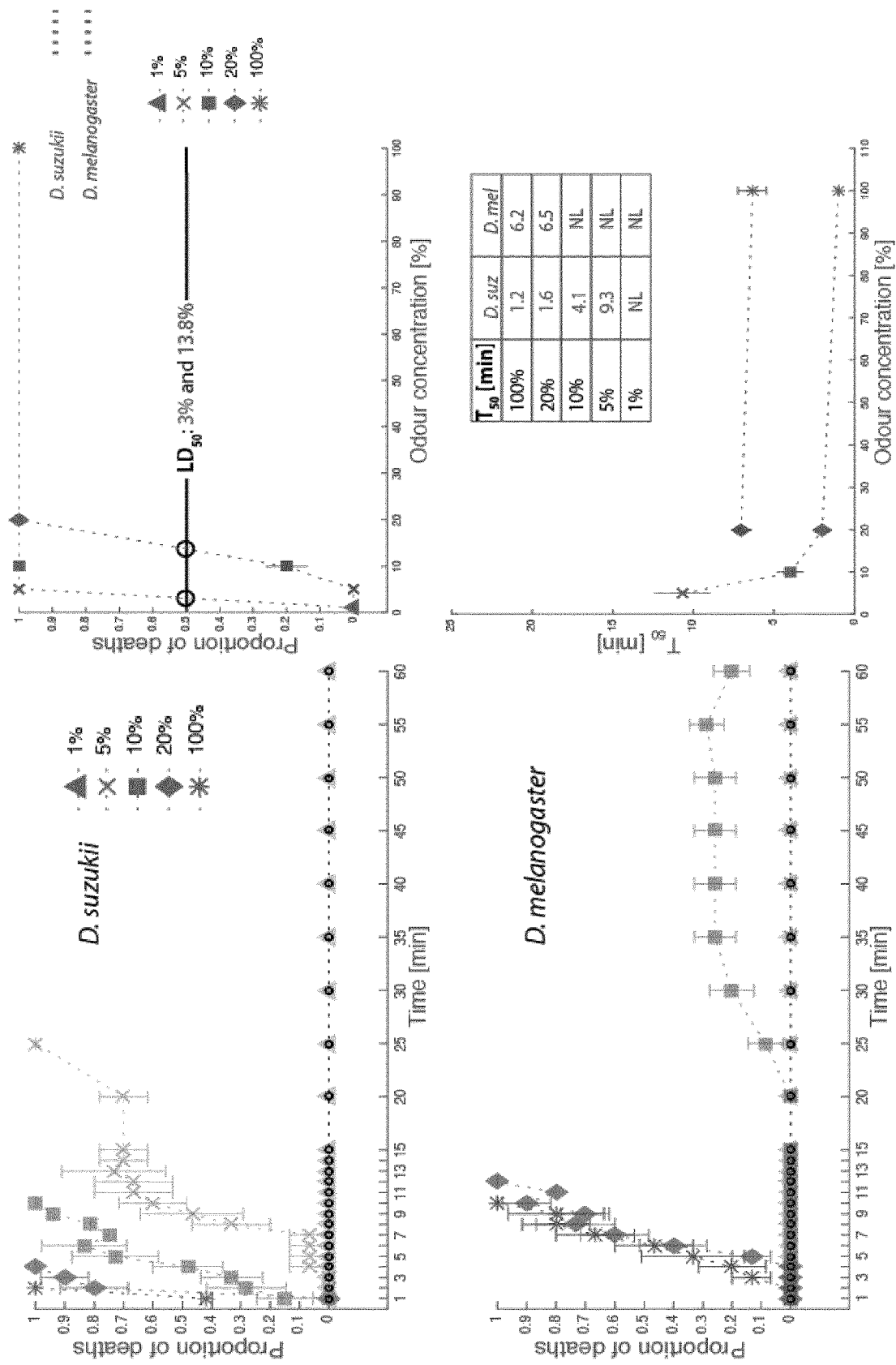
FIGS. 3A, 3B, 3C and 3D show mortality kinetic curves for adult *D. suzukii* and *D. melanogaster* exposed to compositions comprising different dilutions of two compounds according to the invention (E-2-hexenal (FIGS. 3A and 3B) and methyl benzoate (FIGS. 3C and 3D)
Figures 3C, 3D:
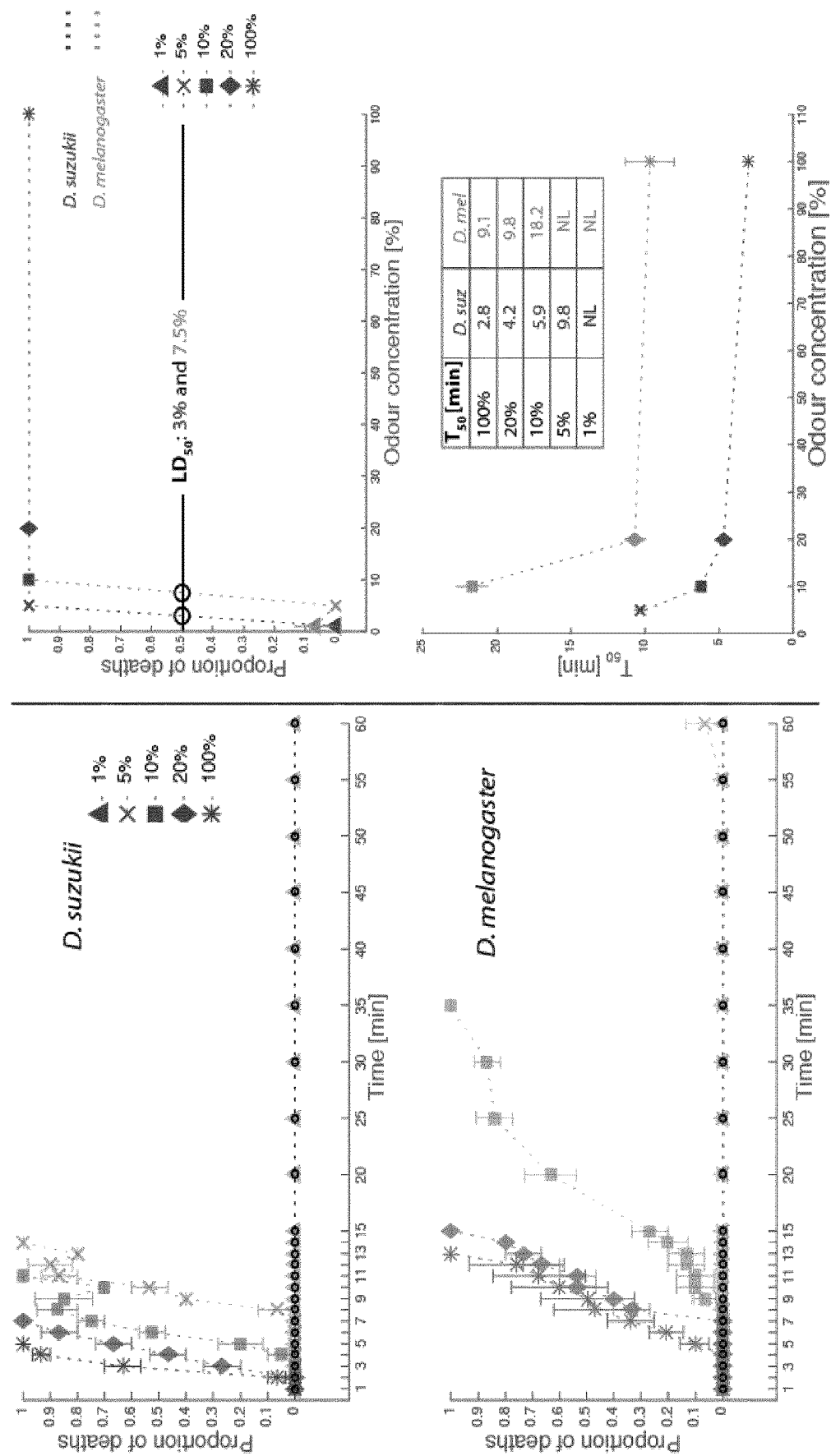

FIGS. 3A-3B and 3C-3D show mortality kinetic curves for adult *D. suzukii* and *D. melanogaster* exposed to compositions comprising different dilutions of two compounds according to the invention ((E)-2-hexenal on FIG. 3A-3B and methyl benzoate on FIG. 3C-3D).

FIGS. 3A and 3C show the proportion of dead flies as a function of time in minutes, when exposed to the vapours of (E)-2-hexenal (FIG. 3A) or methyl benzoate (FIG. 3C) from a 1%, 5%, 10%, or 20% solution in paraffin oil or from pure (E)-2-hexenal or methyl benzoate. The top panel in FIGS. 3A and 3C shows the data for *D. suzukii* and the bottom panel shows the data for *D. melanogaster*. The data is shown as averages±SEM based on 3 to 6 trials for each condition.

FIGS. 3B and 3D show the mortality indices $LD_{50}$ (top) and $T_{50}$ (bottom) derived from the data shown on FIGS. 3A and 3C, respectively. $LD_{50}$ is calculated as the expected concentration at which 50% of the flies die. For (E)-2-hexenal, the $LD_{50}$ was calculated as 3% vol for *D. suzukii* and 13.8% vol for *D. melanogaster*, indicating that at a concentration as low as 3% vol, (E)-2 hexenal is expected to kill 50% of a population of *D. suzukii* flies, whereas a concentration of 13.8% vol was necessary to achieve the same effect on *D. melanogaster* flies in this assay. For methyl benzoate, the $LD_{50}$ was calculated as 3% vol for *D. suzukii* and 7.5% vol for *D. melanogaster*, indicating that at a concentration as low as 3% vol, methyl benzoate is expected to kill 50% of a population of *D. suzukii* flies, whereas a concentration of 7.5% vol was necessary to achieve the same effect on *D. melanogaster* flies in this assay.

The $T_{50}$ was calculated as the time at which 50% of the flies were dead, for each concentration. For (E)-2-hexenal, the $T_{50}$ was calculated for *D. suzukii* at 1.2 minutes at a concentration of 100% vol, 1.6 minutes at a concentration of 20% vol, 4.1 minutes at a concentration of 10% vol, 9.3 minutes at a concentration of 5% vol. In this assay, (E)-2-hexenal was not lethal to *D. suzukii* at 1% concentration. For (E)-2-hexenal, the $T_{50}$ was calculated for *D. melanogaster* at 6.2 minutes at a concentration of 100% vol and 6.5 minutes at a concentration of 20% vol. In this assay, (E)-2-hexenal was not lethal to *D. melanogaster* at 10% vol, 5% vol or 1% vol concentration.

Therefore, this data indicates that (E)-2-hexenal is expected to be lethal to *D. suzukii* in a concentration as low as 3% vol, and to *D. melanogaster* in a concentration as low as 13.8% vol (where at least 50% of the flies in a population would be expected to die within an hour).

For methyl benzoate, the $T_{50}$ was calculated for *D. suzukii* at 2.8 minutes at a concentration of 100% vol, 4.2 minutes at a concentration of 20% vol, 5.9 minutes at a concentration of 10% vol, 9.8 minutes at a concentration of 5% vol. In this assay, methyl benzoate was not lethal to *D. suzukii* at 1% concentration. For methyl benzoate, the $T_{50}$ was calculated for *D. melanogaster* at 9.1 minutes at a concentration of 100% vol, 9.8 minutes at a concentration of 20% vol, and 18.2 minutes at a concentration of 10% vol. In this assay, methyl benzoate was non lethal (NL) to *D. melanogaster* at 5% vol or 1% vol concentration.

Therefore, this data indicates that methyl benzoate is expected to be lethal to *D. suzukii* in a concentration as low as 3% vol and to *D. melanogaster* in a concentration as low as 7.5% vol (where at least 50% of the flies in a population would be expected to die within an hour).

Further, the data also indicates that (E)-2-hexenal has specific toxicity towards *D. suzukii* at least at the 3, 5 and 10% vol concentrations, since compositions comprising (E)-2-hexenal at these concentrations are at least partially lethal to *D. suzukii* and non-lethal (NL) to *D. melanogaster*. Similarly, the data indicates that methyl benzoate has specific toxicity towards *D. suzukii* at least at the 3, 5 and 10% vol concentrations, since compositions comprising methyl benzoate at these concentrations are at least partially lethal to *D. suzukii* and non-lethal (NL) to *D. melanogaster*.

Further, compounds that showed toxicity in the initial screen with a high dose (see Example 1; FIG. 1B: propyl benzoate, ethyl phenyl acetate, ethyl benzoate, benzyl acetate, methyl benzoate, methyl salicylate, benzaldehyde, methyl cyclohexanoate, methyl 2-methyl butyrate, (E)-2-hexenal, (E)-2-hexen-1-ol, hexanal, 1-hexanol, (E)-2-heptenal, 2-heptanone, 2-methyl-2-pentenal, 4-hexen-3-one, (E)-2-pentenal, (E,E)-2,4-nonadienal, (E,Z)-2,6-nonadienal, octanal, E-2-decenal, E-2-undecenal, E-2-dodecenal, E-2-tridecenal, pentyl benzoate, methyl cyclopentane carboxylate, isopropyl cyclopentane carboxylate, butyl cyclopentane carboxylate, allyl 1-cyclopentene-1-carboxylate, E-2-octenal, E-2-nonenal, E-3-hexenol, pentanal, heptanal, nonanal, acetophenone, and 4,5-dimethyl-3-hydroxy-2,5-dihydro-furan-2-one), were further tested in a dose-range from 0.3 to 10% vol diluted in paraffin oil in the petri dish assay of FIG. 1A. Benzyl benzoate, benzyl salicylate and linalyl benzoate that were not toxic at 10 M (Example 1—FIG. 1B), were also included as controls. A population of 10 adults (mixed male/female) were used per trial, with n=3-5 trials for each concentration with 24 h exposure to the compounds.

The results of these analyses are shown in FIG. 3E. Data are represented as mean proportion of dead flies, with counts separated between male (as indicated by 'M') and female (as indicated by 'F') flies. The compounds on FIG. 3E are ranked based on the lowest concentration at which full lethality is observed, from top (most efficacious) to bottom (least or not efficacious). Data points marked NaN were not tested at the indicated concentration. The MEC column summarises the minimal effective concentration to induce 100% morbidity/mortality to adult *D. suzukii* flies.

As can be seen on FIG. 3E, all compounds, except E-2-heptanone, methyl 2-methylbutyrate, benzyl benzoate, benzyl salicylate and linalyl benzoate, displayed toxicity within the 0.3% to 10% range. Further, allyl 1-cyclopentene-1-carboxylate, (E,E)-2,4-nonadienal, E-2-nonenal, E-2-octenal and E-2-decenal, which are preferred compounds of the invention, were most potent and are already toxic at concentrations as low as 0.3% (allyl 1-cyclopentene-1-carboxylate) and 2% ((E,E)-2,4-nonadienal, E-2-nonenal, E-2-octenal and E-2-decenal).

In addition, the data of FIG. 3E indicates that male flies may be more susceptible to the majority of the toxic compounds than female flies.

Example 3

Specificity Towards Different Species of *Drosophila*

In this example, the inventors set out to investigate the sensitivity of different species of *Drosophila* to the pesticide compounds of the invention.

Figure 4A:
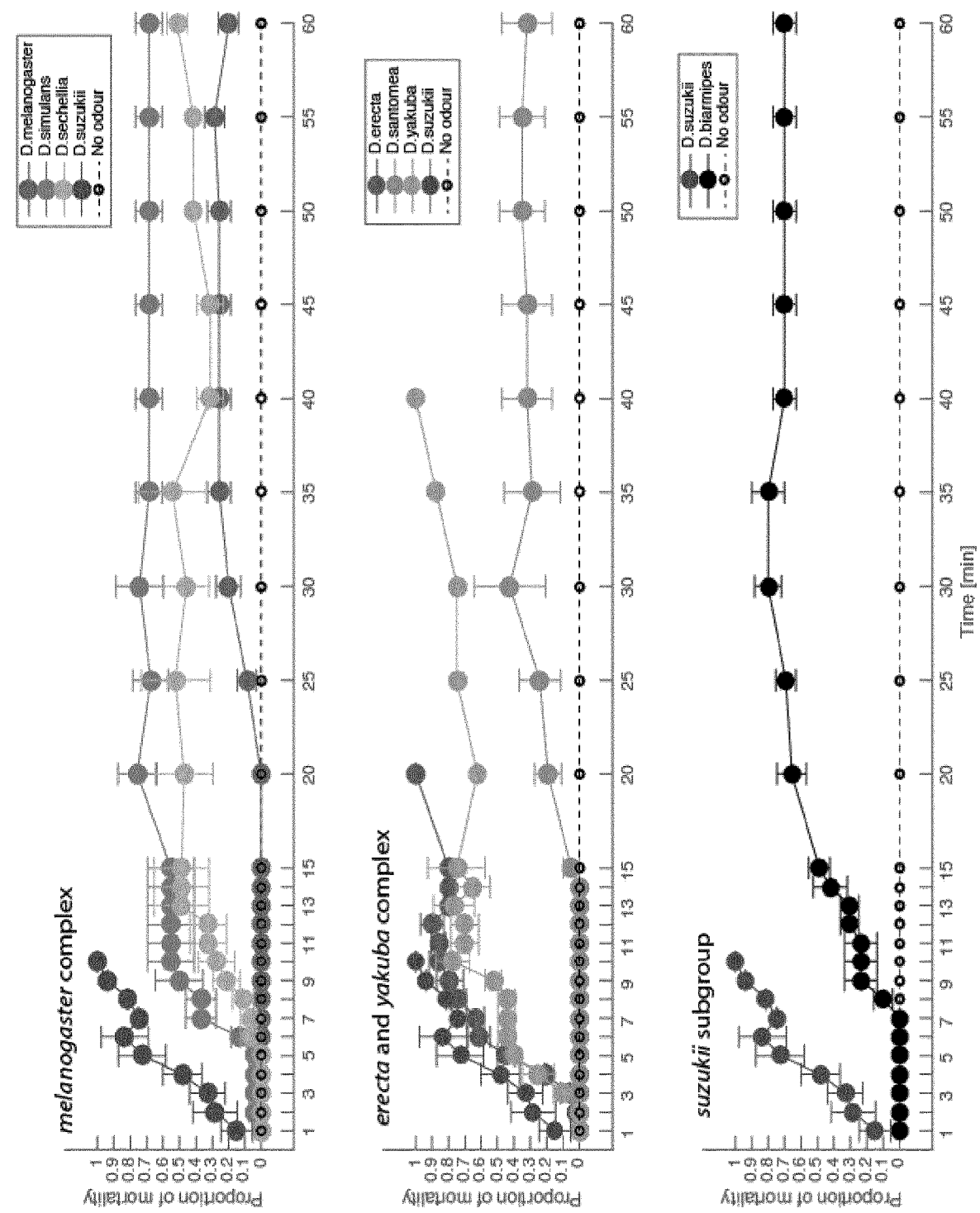
FIGS. 4A and 4B show an analysis of airborne toxicity of pesticide compositions according to the invention towards different *Drosophila* spp.
Figure 4B:
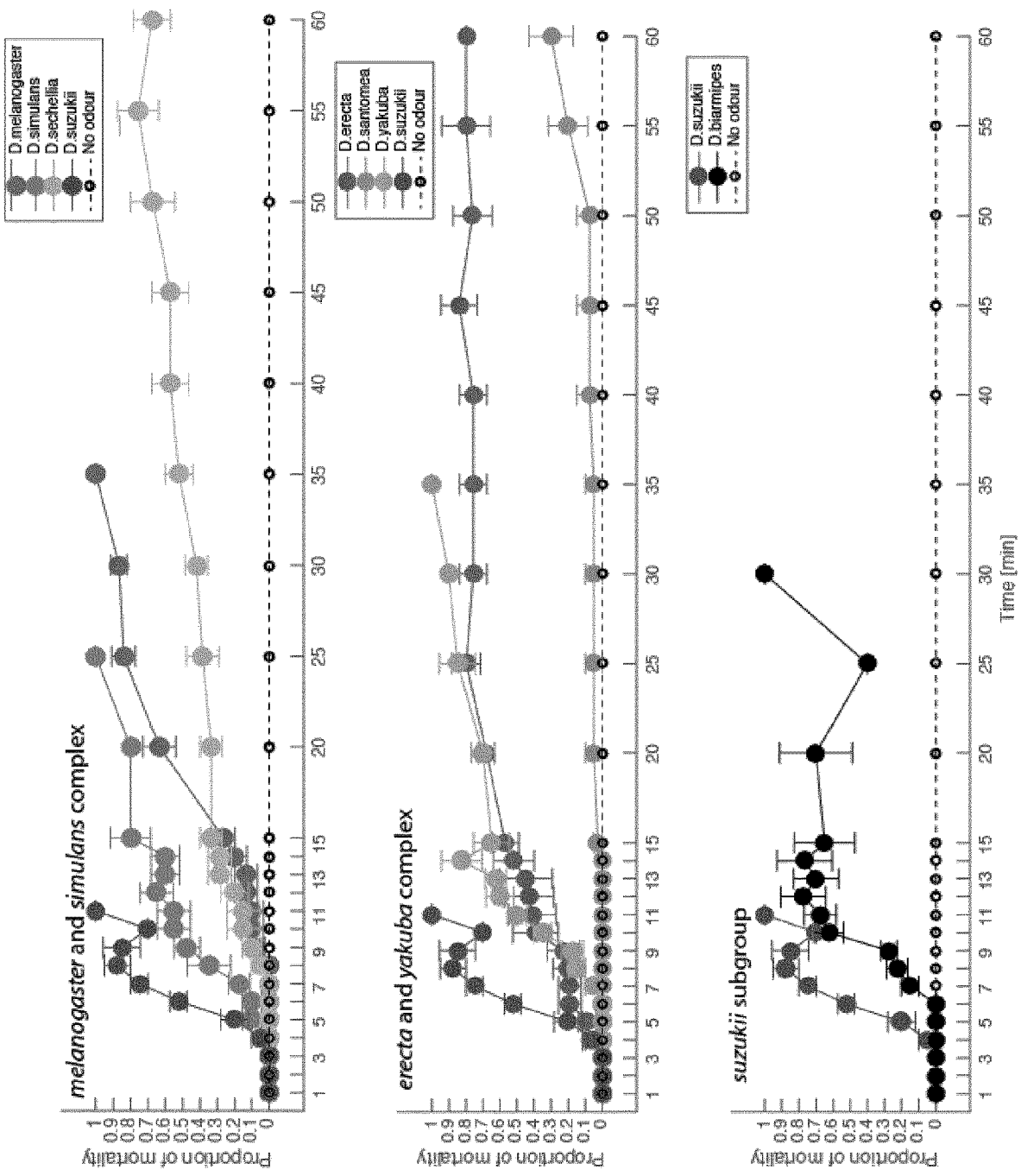

Adult flies of *Drosophila* species were exposed to a 10% vol solution of (E)-2-hexenal and 10% vol solution of methyl benzoate, in an experimental set up as explained in relation to FIG. 1A. For each VOC, species of the *suzukii* complex (*D. suzukii, D. biarmipes*), *melanogaster* complex (*D. melanogaster, D. simulans, D. sechellia*), and *erecta+* yakuba complex (*D. erecta, D. yakuba, D. santomea*) of the *melanogaster* species group were compared. 5-10 mixed female and male adults were used per trial. FIGS. 4A and B show the results of these experiments, respectively for (E)-2-hexenal (FIG. 4A) and methyl benzoate (FIG. 4B). The data shown represents the average±SEM of the proportion of dead flies as a function of time, over 3 to 6 assays per condition.

The $T_{150}$ was calculated as explained above for each condition, and the results are provided in Table 1 below.

TABLE 1

| $T_{50}$ (min) | (E)-2-hexenal (10% vol) | methyl benzoate (10% vol) |
|---|---|---|
| *Melanogaster* complex | | |
| D. melanogaster | NL | 18.2 |
| D. simulans | 9 | 9.4 |
| D. sechellia | 22.7 | 34 |
| *Erecta + Yakuba* complex | | |
| D. erecta | 5.3 | 13.8 |
| D. santomea | NL | NL |
| D. yakuba | 8.7 | 11 |
| *Suzukii* complex | | |
| D. suzukii | 4.1 | 5.9 |
| D. biarmipes | 15.4 | 9.6 |

As can be seen from the data in Table 1 and FIGS. 4A and 4B, in the *melanogaster* complex, *D. melanogaster* and *D. sechellia* were 2 to 4 times more resistant than *D. simulans*, and *D. melanogaster* never attained at 50% mortality when exposed to 10% vol (E)-2-hexenal. Within the *erecta* and *yakuba* complex, *D. erecta* and *D. yakuba* were about 2-fold more resistant than *D. suzukii*, but *D. erecta* displayed susceptibility similar to *D. suzukii* towards (E)-2-hexenal. *D. santomea* was the most resistant species in the *erecta+yakuba* complex, never attaining 50% mortality for either compound, and also generally displaying the highest overall resistance across all species. Interestingly, the closest relative of *D. suzukii*, *D. biarmipes*, was also 2 to 3 times more tolerant towards both odours compared to *D. suzukii*.

The data indicates that *D. suzukii* is most susceptible to both of the pesticide VOCs according to the invention.

Example 4

Expression of the Para Gene as a Predictor of Susceptibility to the VOCs of the Invention In this example, the Inventors investigated a possible cause for the differences in susceptibility to the VOCs of the invention that were observed in Example 4, between even closely related species.

The inventors postulated that the mode of action of at least some of the compounds of the invention may be related to the function of voltage-gated sodium channels (VGSCs). VGSCs are critical for the generation and propagation of action potentials in excitable cells and, thus, fundamental for cellular communication. VGSCs display a multitude of binding sites, and compounds that target them can have diverse electrophysiological effects. Some known insecticides such as DDT and pyrethroids target VGSCs. DDT, analogues and pyrethroids function by preventing the closure of VGSCs via a common receptor binding site, which leads to hyper-excitatory symptoms of poisoning that paralyse and kill the insects (Zlotkin 1999). Further, the local human anaesthetic Benzocaine and the sulfonated meta form Tricaine, commonly used as fish anaesthetic, are structurally very similar to methyl benzoate, and their mode of action has been attributed to the inhibition of VGSCs (Frazier and Narahashi 1975, Catterall 1987).

Figure 5A:
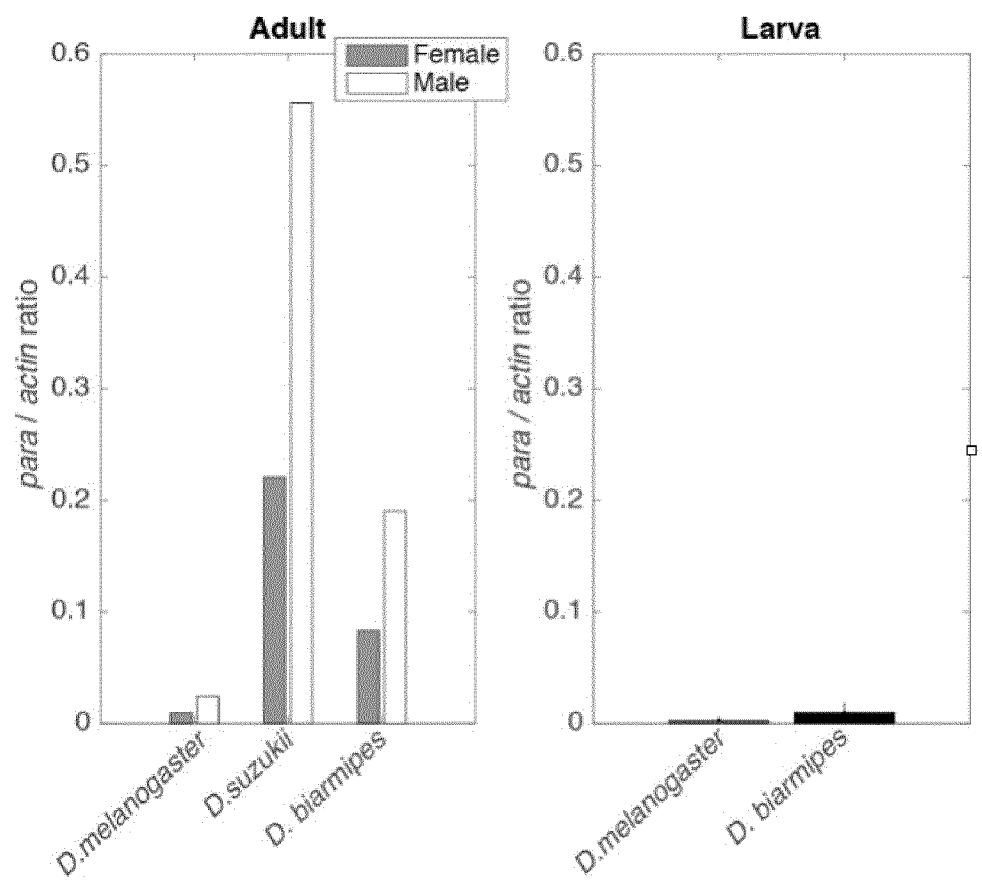
FIG. 5A shows an analysis of the expression level of the para gene in various *Drosophila* ssp. at the larval and adult stage.

Therefore, the inventors quantified the expression of the para gene. The para locus is the structural gene encoding the *Drosophila* VGSC. In particular, the expression levels of para were measured by qPCR and compared between the adults of *D. melanogaster*, *D. suzukii* and *D. biarmipes*, as well as between the larvae of *D. melanogaster* and *D. biarmipes*. The results of these experiments are shown on FIG. 5A. The data shows that the expression of para is highest in the most intoxication-prone *D. suzukii* adult fly, and lowest in *D. melanogaster* adult fly, one of the species with highest tolerance.

The data additionally shows that the levels of para are lower in the larvae than in the adult of the species tested. This low expression in the larvae of *D. melanogaster* and *D. biarmipes* may explain the lack of paralysis of the larvae in the chemotaxis experiments of Example 8 below in response to methyl benzoate.

This data indicates that expression of the para locus may be used as a predictor of sensitivity to the VOCs of the invention.

Figure 5B:
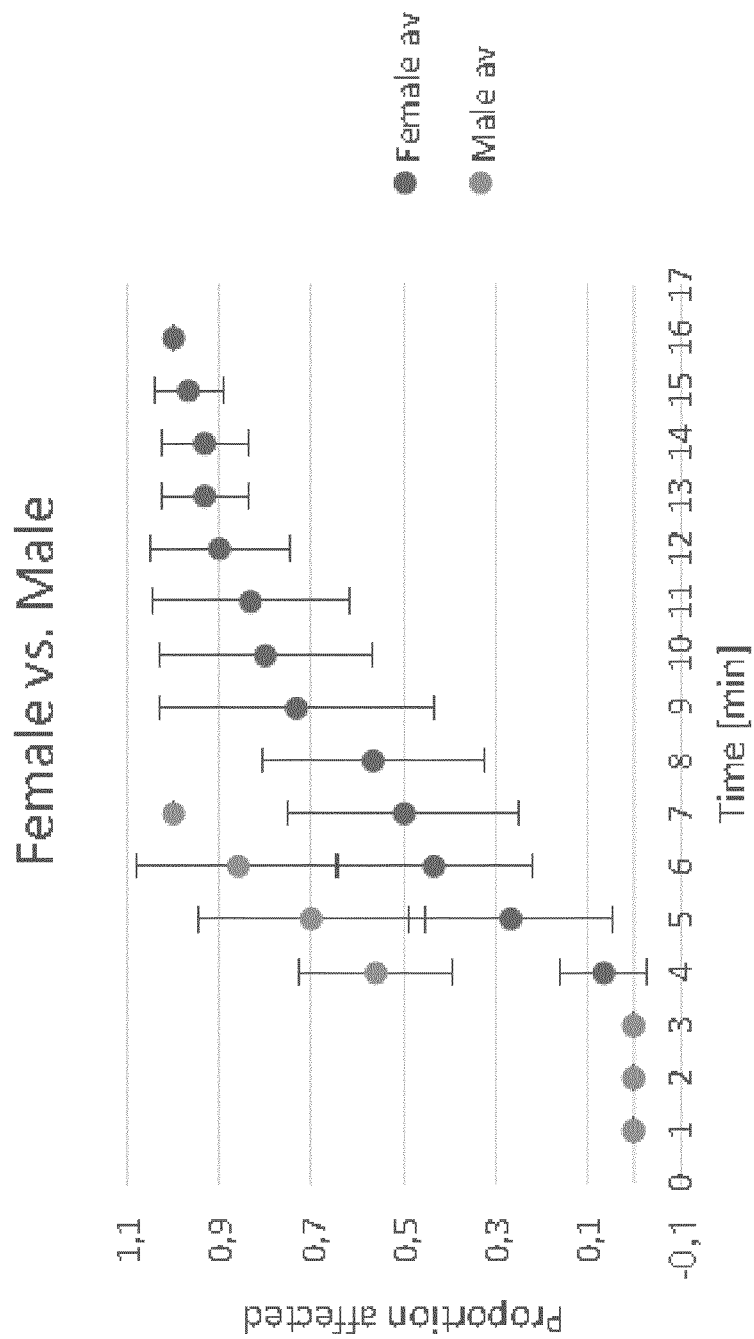
FIG. 5B shows an analysis of lethality of adult *D. suzukii* exposed to a composition according to the invention, as a function of the sex of the flies.

Additionally, the data showed that para expression level is consistently lower in the female than in the male, indicating a possible reduced sensitivity of the female insects. As shown in Example 2 (FIG. 3E), male flies were found to be generally more susceptible than female flies. This was additionally tested for E-2-hexenal using the petri dish test of FIG. 1A, and a 5% vol in paraffin solution. The results of these experiments are shown on FIG. 5B, in which 5 flies were used per test, with n=6 trials for the females and n=5 trials for the males. The data on FIG. 5B indicates that males displayed more sensitivity corresponding with higher para expression.

Example 5

Impact of (E)-2 Hexenal on the Development of *D. Suzukii* Larvae and Eggs

In this example, the Inventors set out to investigate whether the compounds of the invention may have a pesticide effect on the larval and egg stage of development of *Drosophila* spp., in particular *D. suzukii*.

Figure 6:
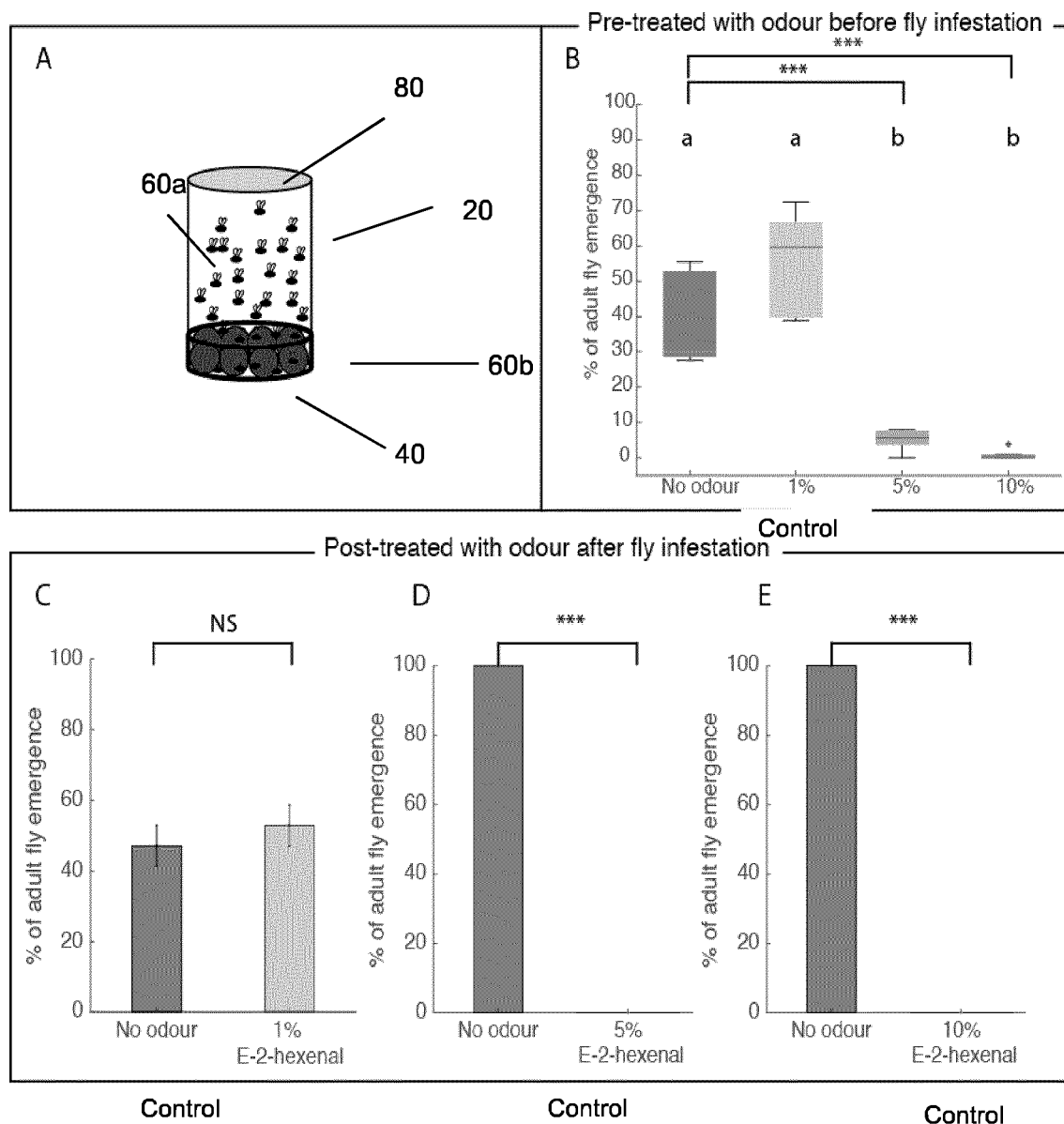
FIGS. 6A, 6B, 6C, 6D and 6E show an experimental setup (FIG. 6A) for and results of (FIG. 6B-E) an analysis of the impact of a composition comprising a volatile organic compound according to the invention on the development of *D. suzukii* larvae, when a substrate is treated with the compositions of the invention prior to fly infestation (FIG. 6B) or post fly infestation (FIG. 6C-E)

FIG. 6A shows an experimental set up for testing the effect of VOCs of the invention on egg-laying, survival and development of larvae. Adult mixed female and male flies 20 (in the experiments below, *D. suzukii* flies) are placed in a cylindrical cage 60a with mesh roofing 80 for ventilation. Fruits 40 (in the experiments below 8 blueberries were used) are placed into a petri dish bottom 60b at the bottom of the cage 60a.

The blueberries were treated with (E)-2-hexenal and then exposed to flies. The impact of 1% vol, 5% vol and 10% vol aqueous emulsions of (E)-2-hexenal (obtained by dissolving the VOC in deionized water (DI) containing 1% (v/v) Tween 20 hydrophilic emulsifier) on egg-laying and the survival and development of larvae in pre-treated blueberries were compared to water-treated controls. In particular, the number of flies emerging after 14 days at ambient temperature was counted, following 48 hours of incubation of the treated blueberries with adult flies. The results of this analysis are shown on FIG. 6B. Blueberries treated with 1% E-2-hexenal were not significantly different from untreated berries. Treatment with 5% and 10% E-2-hexenal resulted in significant reduction of fly emergence compared with no treatment.

Significance was assessed by one-way ANOVA followed by Bonferroni correction at p≤0.05 and post-hoc two-sample t-test.

To investigate the impact of (E)-2-hexenal on the emergence of *D. suzukii*, eight ripe, untreated blueberries were placed in the cage 60a together with adult *D. suzukii* flies for 4 days. All flies were then removed and discarded and half of the pre-infested blueberries was dipped into 10 mL of a 1%, 5% or 10% E-2-hexenal aqueous emulsion (as above), while the other half was dipped in 10 mL deionized water as a control. Survival of *D. suzukii* larvae was measured by counting the number of adult flies that emerged from the odour-treated blueberries versus the control condition after 12 days.

The percentage of adult fly emergence under the treated and untreated conditions relative to the sum of all flies that emerged under both conditions in each assay was calculated. The results of these experiments are shown on FIG. 6C (1% vol (E)-2-hexenal), FIG. 6D (5% vol. (E)-2-hexenal), and FIG. 6E (10% vol. (E)-2-hexenal). Treatment with 1% vol aqueous emulsion was not statistically significantly (NS) different from the control condition (p=0.51). Treatment with 5% vol and 10% vol aqueous emulsion does not result in any adult fly emergence compared to the control condition (two-sample t-test, *p≤0.05, p≤0.01, *p≤0.001) in which 100% of flies emerged.

This data indicates that at least at a concentration of 5% vol and 10% vol (E)-2-hexenal, the compositions of the invention have a negative impact on *D. suzukii* egg-laying and/or development, and completely prevent *D. suzukii* larvae development.

Therefore, the VOCs of the invention, and in particular (E)-2-hexenal, are toxic to at least the larvae and prevents egg laying or is lethal to the eggs of *Drosophila* spp., in particular *D. suzukii*.

Example 6

Impact of VOCs of the Invention on Positional and Ovipositional Preference of *D. suzukii*

In this example, the Inventors assessed the preference of *D. suzukii* to feed and lay eggs on a nutritional substrate, plated with the VOCs of the invention versus without odour.

Figure 7:
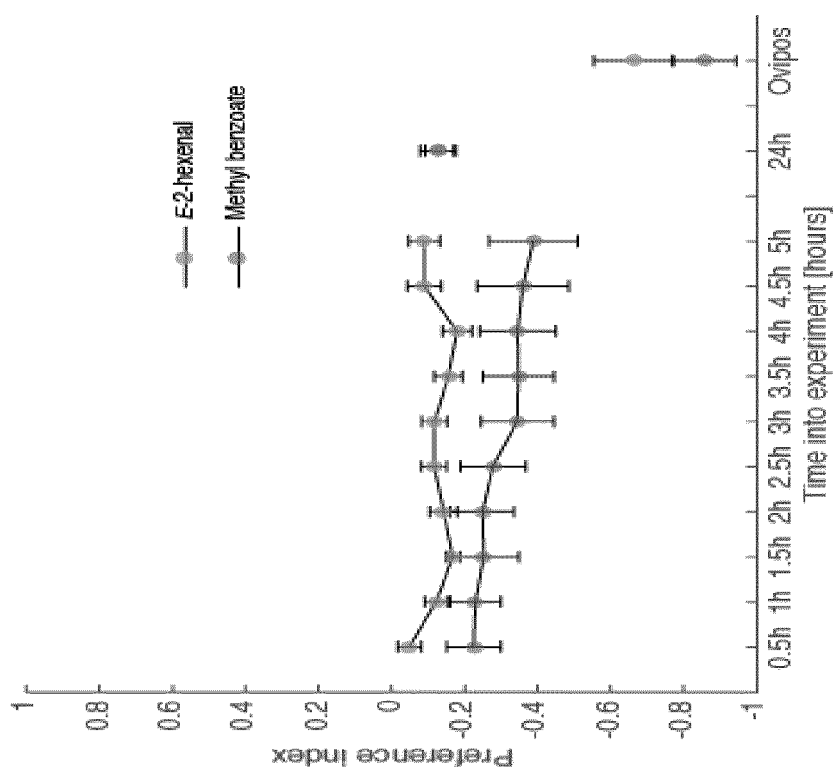
FIGS. 7A, 7B and 7C show an experimental setup for (FIG. 7A) and results of (FIGS. 7B and 7C) an analysis of the ovipositional preferences of *D. suzukii* exposed to compositions according to the invention.
Figure 7:
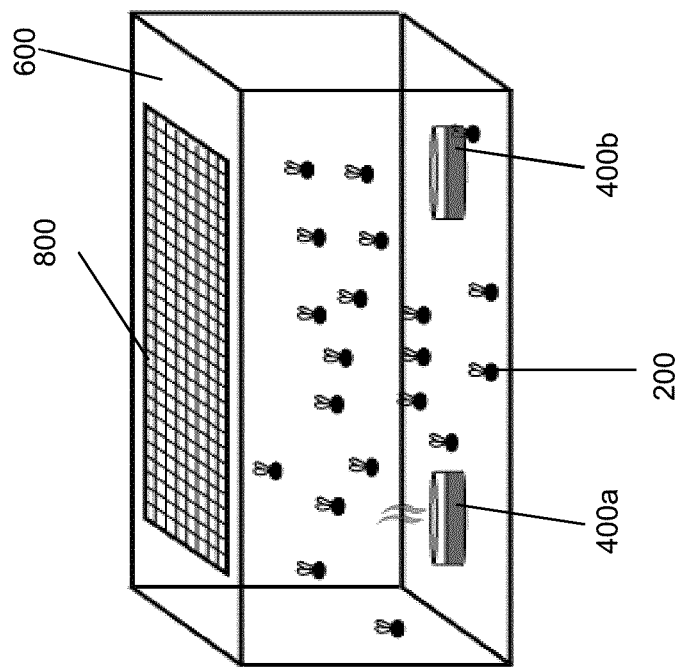
Figure 7:
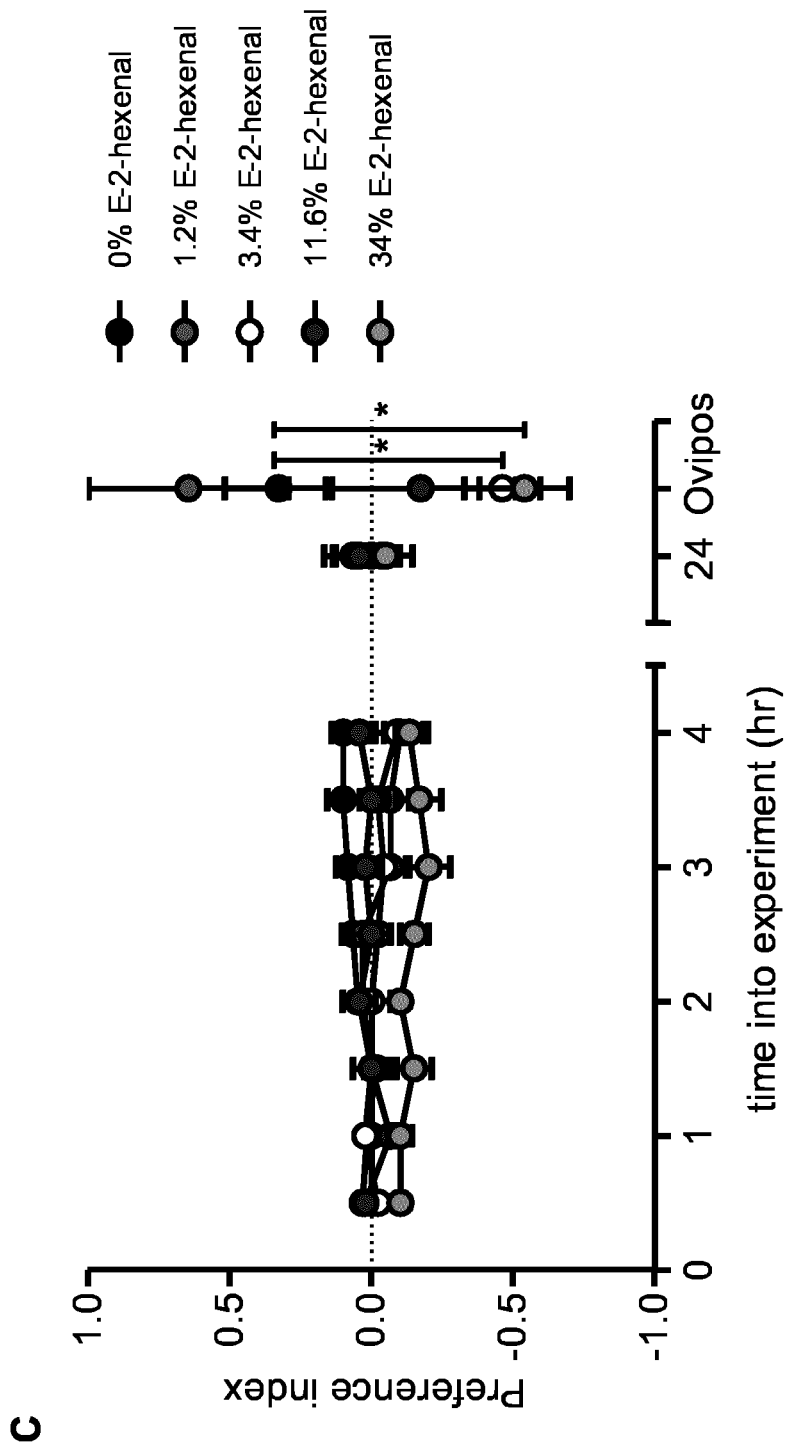

FIG. 7A shows an experimental set up for assessing positional and ovipositional preference. Adult flies 200 are placed in a plastic box 600 with mesh-netting 800 in the lid to allow aeration. Two food sources 400a and 400b (for example petri dishes containing molasses-apple juice agar substrates) are placed into the box 600, of which one 600a is plated with a compound to be tested, and the other 600b is left blank as a control.

Using this experimental set up and pure (E)-2-hexenal or methyl benzoate, the positional preference of the flies was monitored over 5 hours. The ovipositional preference was measured after 24 hours by counting the number of eggs laid on either plate. The results of these assays are shown on FIG. 7B which displays the $PI_{oviposition}$=(# eggs on food with compound−# of eggs on food without compound)/total # of eggs and $PI_{positional}$=(# of flies on food with compound−# of flies on food without compound)/total # of flies. The same experimental set up was used to test for positional and ovipositional preference using different concentrations of (E)-2-hexenal, i.e. 1.2% vol, 3.4% vol, 11.6% vol and 34% vol. The results of these assays are shown on FIG. 7C. All data shown represents the mean+S.E.M. over 2 to 6 trials per condition. In FIG. 7C, deviations marked by a star are associated with a unpaired t-test p-value below 0.05 following a one-way ANOVA test with $F_{(4,22)}$=3.987 (p=0.017).

The data indicates that the positional avoidance of *D. suzukii* to food plated with (E)-2-hexenal is relatively weak. However, adult *D. suzukii* flies avoid laying their eggs on the side plated with (E)-2-hexenal from 3.4% vol (E)-2-hexenal (see FIGS. 7B and 7C). Methyl benzoate-plated food results in a stronger avoidance response/positional preference in adult flies, and is also a strong egg-laying deterrent (see FIG. 7B).

Therefore, this data indicates that the VOCs of the invention can be used as an egg-laying deterrent for *Drosophila* spp., in particular *D. suzukii*.

Example 7

Airborne Toxicity of the VOCs of the Invention on Honeybees (*Apis mellifera*)

The toxicity of (E)-2-hexenal and methyl benzoate volatiles was tested at 100% (pure) and 10% vol. concentrations on honeybees (*Apis mellifera*) in the petri dish assay of FIG. 1A. Adult bees were exposed for one hour and the proportion of death across all trials (5 trials with each of the pure VOCs and 10 trials for each of the 10% vol VOC assays) was calculated. The results of these experiments are shown on FIG. 8.

Further, the toxicity of structurally related compounds, i.e. allyl 1-cyclopentene-1-carboxylate, E,E-2,4-nonadienal E-2-decenal, butyl cyclopentane carboxylate, 4-hexen-3-one, E-2,Z,-6-nonadienal, E-2-heptenal and nonanal (with E-2-hexenal as reference) was tested on honey bees in the petri dish assay of FIG. 1A. Adult honey bees were exposed for 24 hours to these compounds diluted in paraffin oil, and the proportion of deaths across all trials (two adults per trial, n=5 trials for each condition except the vehicle (control) condition where n=9 trials were used) was calculated. Each compound was tested at the minimal concentration that was found to induce 100% morbidity/mortality of *D. suzukii* in Example 2. The results of these experiments are shown in Table 2 below.

TABLE 2

| Compound | Minimal concentration (%) to induce 100% morbidity/mortality in *D. suzukii* adults | Applied concentration(s) (%) | Percentage of dead honey bee adults (%) |
|---|---|---|---|
| Vehicle | N/A | N/A | 6 |
| Allyl 1-cyclopentene-1-carboxylate | 0.5 | 1 | 0 |
| E,E-2,4-nonadienal | 2 | 2 | 0 |
|  |  | 5 | 0 |
|  |  | 10 | 0 |
| E-2-decenal | 2 | 2 | 0 |
| Butyl cyclopentane-carboxylate | 3 | 3 | 0 |
| 4-hexen-3-one | 3 | 3 | 0 |
| E-2,Z,-6-nonadienal | 3 | 3 | 10 |
| E-2-heptenal | 3 | 3 | 0 |
| nonanal | 3 | 3 | 0 |
| E-2-hexenal | 4 | 4 | 0 |

The results in Table 2 show that all compounds tested conferred zero or low levels of toxicity to honey bees at those concentrations that induce 100% morbidity/mortality in *D. suzukii* adults. Moreover, E,E-2,4-nonadienal conferred zero toxicity to honey bees even up to a concentration of 10%, i.e., a concentration 5 times higher than the minimal effective concentration that induces 100% morbidity/mortality in *D. suzukii* adults.

Figure 8:
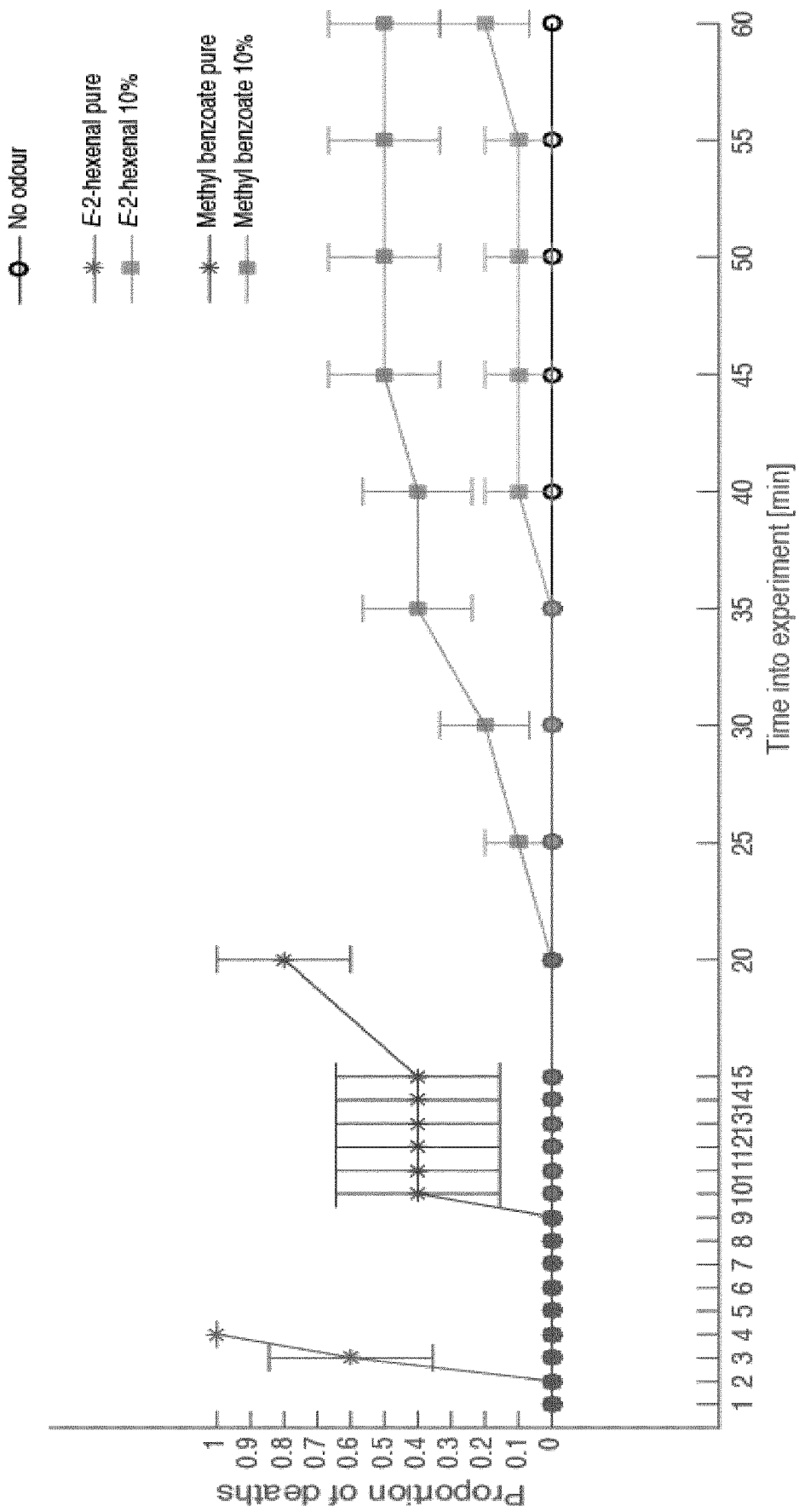
FIG. 8 shows an analysis of the toxicity of compositions of the invention to *Apis mellifera* (western honey bee)

The data in FIG. 8 shows that pure (E)-2-hexenal affected honey bees at a significantly faster rate than pure methyl benzoate. However, at 10% concentrations, both compounds conferred low levels of toxicity.

This data shows that the pesticide VOCs of the invention are non-lethal to honey bees at least at low concentrations, such as 10% vol. and below, which concentrations are sufficient to be effective against *Drosophila* spp and in particular *D. suzukii*. These results show that the compounds could be effectively used to control the *D. suzukii* and other *Drosophila* spp. pest without being lethal to honey bees.

Example 8

Chemotactic Behaviour of *Drosophila* Spp. Larvae Towards the VOCs of the Invention In this experiment, the Inventors set out to investigate whether the compounds of the invention have an effect on larval chemotaxis in various species of *Drosophila*.

Figure 9:
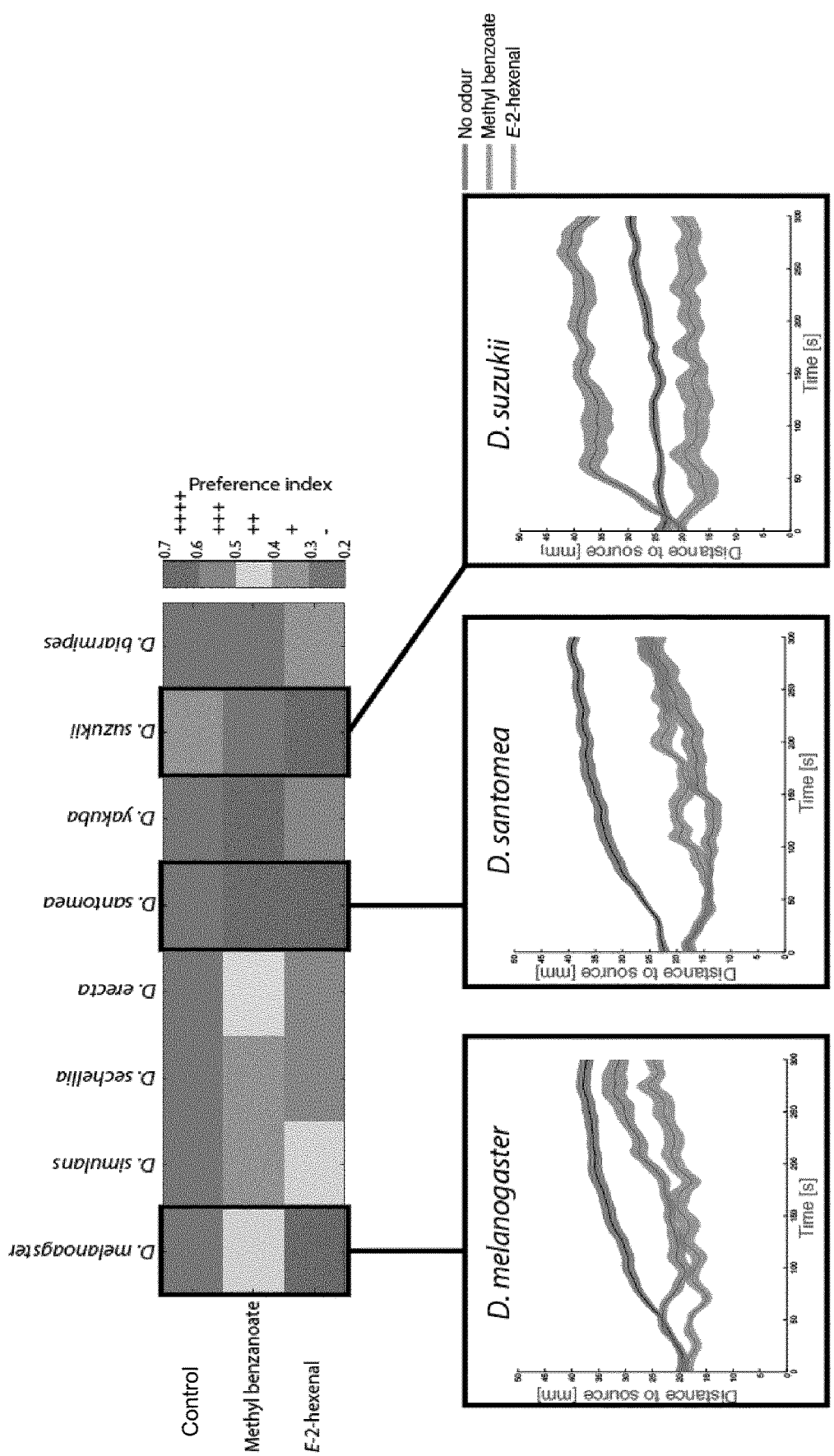
FIG. 9 shows the results of an analysis of the chemotaxis behaviour of the larvae of different *Drosophila* species to compositions according to the invention.

Larvae were exposed to 1% vol solution of (E)-2-hexenal or methyl benzoate in paraffin oil loaded onto the lid of a petri dish. Their movement was tracked for 5 minutes. A preference index was quantified as the fraction of time larvae spent in a zone around the odour sources. A population of 15 larvae were used per trial and they were placed in the centre of the petri dish at the start of the experiment. The average distance of the larvae to the odour sources was also quantified over time. The results of this analysis are shown on FIG. 9, for each of the conditions where a VOC of the invention was used. A total of 10 trials were performed for each condition, i.e. for each VOC and fly species, and 30 trials were performed for a control condition, for which only the solvent paraffin oil was applied.

The data shows that at a concentration of 1%, the larvae of eight species of the *Drosophila melanogaster* species group display different sensitivities to the vapours of (E)-2-hexenal and methyl benzoate. Methyl benzoate is strongly repulsive to *D. suzukii*, yet attractive to *D. melangaster* and strongly attractive to *D. santomea* larvae. In contrast, (E)-2-hexenal elicits attractive chemotactic responses in *D. suzukii* and the other species.

This data indicates that although the VOCs of the invention are toxic to many *Drosophila* ssp. Adults at concentrations of 3% and higher, and toxic to the larvae of *D. suzukii* at least at a concentration of 5% and higher, at a lower concentration some of the compounds of the invention may have an attractive effect to some *Drosophila* spp. larvae.

Example 9

Contact Toxicity of E-2-Hexenal and Methyl Benzoate on Adult Flies of *D. suzukii*

In this experiment, the inventors set out to investigate whether the compounds of the invention have a lethal effect on *D. suzukii* when exposed by contact.

Contact toxicity of E-2-hexenal and methyl benzoate volatiles was tested at different concentrations and in combination with thickeners in different concentration that make E-2-hexenal and methyl benzoate stick to the flies. Table 3 shows the results of this analysis. Flies (10-15 mixed males/females) were placed into a bugdorm and sprayed from a distance of 10 cm. Mortality was evaluated after 24 hrs, except for the condition indicated with a star in Table 3, where an exposure time of 50 minutes was used. Thickeners were diluted in aqueous emulsions of deionised water containing 1% vol. Tween 20.

TABLE 3

| Treatment | Proportion of dead flies by E-2-hexenal (%) | Proportion of dead flies by methyl benzoate (%) |
|---|---|---|
| 0.1% E-2-hexenal or methyl benzoate | 31% | 33% |
| *1% E-2-hexenal or methyl benzoate | 50 | 30% |
| 5% E-2-hexenal or methyl benzoate | 100% | 100% |
| 0.1% E-2-hexenal or methyl benzoate + 1% hydroxyethylcellulose | 80% | 10% |
| 1% E-2-hexenal or methyl benzoate + 1% hydroxyethylcellulose | 50% | 70% |
| 0.1% E-2-hexenal or methyl benzoate + 1% Arabic Gom | 80% | 30% |
| 1% E-2-hexenal or methyl benzoate + 1% Arabic Gom | 10% | 30% |

In general, the results in Table 3 show that the contact toxicity of E-2-hexenal and methyl benzoate is higher than the corresponding airborne toxicity, inducing mortality at concentrations as low as 0.1%. This indicates that the combination of the pesticide compounds of the invention with thickeners could improve the efficacy of the pesticide VOCs of the invention.

Materials and Methods

Fly Stocks

Fly stocks were raised on standard cornmeal-agar molasses medium at 22° C., 60%-70% relative humidity, and kept in a 12 h dark-light cycle unless indicated otherwise. Wild-type flies were used of all species for all behavioural. *D. melanogaster* (Canton-S) was from a private source, *D. simulans* was from a private source, *D. sechellia* (Tucson TSC #14021-0248-25, BPNG #97), *D. erecta* (188.1 BPNG #212), *D. santomea* (Sao Tome and Principe, STO.4 BPNG #96), *D. yakuba* (Liberia, Tucson TSC #14021-0261.01, BPNG #95), *D. suzukii* (France) was donated and *D. biarmipes* (Cambodia, Tucson TSC #14023-0361.01, BNPG #107).

Honeybee Stocks

Honeybee foragers were obtained from a large bee keeping company (Agroquímica Ollé, http://agroquimicaolle.com). Bees were held in an incubator at 22 degrees for a few days and provided with ad libitum sugar water.

Chemicals

The following compounds were used, all from Sigma-Aldrich: paraffin oil (CAS No. 8012-95-1): methyl benzoate (CAS No. 93-58-3); ethyl benzoate (CAS No. 93-89-0); propyl benzoate (CAS No. 2315-68-6); methyl salicylate (CAS No. 119-36-8); linalyl benzoate (CAS No. 126-64-7); benzaldehyde (CAS No. 100-52-7); ethyl phenylacetate (CAS No. 101-97-3); benzyl acetate (CAS No. 140-11-4); methyl 2-methyl butyrate (CAS No. 868-57-5); benzyl benzoate (CAS No. 120-51-4); benzyl salicylate (CAS No. 118-58-1); (E)-2-hexenal (CAS No. 6728-26-3); (E)-2-heptenal (CAS No. 18829-55-5); (E)-2-pentenal (CAS No. 1576-87-0); 2-methyl-2-pentenal (CAS No. 623-36-9); (E)-2-hexen-1-ol (CAS No. 928-95-0); hexanal (CAS No. 66-25-1); 1-hexanol (CAS No. 111-27-3); 2-heptanone (CAS No. 110-43-0); (E,Z)-2,6-nonadienal (CAS No. 557-48-2); (E,E)-2,4-nonadienal (CAS No. 5910-87-2); E-3-hexenoic acid (CAS No. 1577-18-0), 4-hexen-3-one (CAS No. 2497-21-4), octanal (CAS No. 124-13-0), 4-hexen-3-one (CAS No. 2497-21-4); octanal (CAS No. 124-13-0); (2E)-2-decenal (CAS No. 3913-81-3); E-2-undecenal (CAS No. 53448-07-0); (2E)-2-dodecenal (CAS No. 20407-84-5); tridec-2-enal (CAS No. 7774-82-5); pentyl benzoate (CAS No. 2049-96-9), pentanal (CAS No. 110-62-3), heptanal (CAS No. 111-71-7), nonanal (CAS No. 124-19-6); E-3-hexenol (CAS No. 544-12-7), E-2-octenal (CAS No. 2363-89-5); E-2-nonenal (CAS No. 2463-53-8); 4,5-dimethyl-3-hydroxy-2,5-dihydrofuran-2-one (CAS No. 28664-35-9), acetophenone (CAS No. 98-86-2), isopropyl cyclopentanecarboxylate (CAS No. 106083-73-2); butyl cyclopentane carboxylate (CAS No. 99978-03-7), pentyl benzoate (CAS No. 2049-96-9) and Tween 20 hydrophilic emulsifier (CAS No. 9005-64-5). Allyl 1-cyclopentene-1-carboxylate was sourced from Chemspace (CAS No. 59253-91-7). Methyl cyclopentanecarboxylate was sourced from Molport (CAS No. 4630-80-2); and pentyl cyclopentenecarboxylate was sourced from Chemtik (CAS No. 136-60-7.

2-butenal (CAS No. 123-73-9) and butyl benzoate (CAS No. 136-60-7) may be sourced from Sigma-Aldrich, 3-butenal may be sourced from Merck Millipore (CAS No. 123-38-6), and (Z)-1,3-butadienol (CAS No. 70415-58-6) and (E)-1,3-butadienol (CAS No. 70411-98-2) may be sourced from 1717 CheMall Corporation, methyl 2,4-cyclopentadiene-1-carboxylate may be sourced from Chemspace (CAS No. 45657-86-1), methyl 1,3-cyclopentadiene-1-carboxylate may be sourced from Chemspace (CAS No. 35730-27-9), ethyl 1,3-cyclopentadiene-1-carboxylate may be sourced from Chemspace (CAS No. 16179-27-4).

Fly Larva Chemotaxis Assay and Tracking

Behavioural experiments were performed with third instar foraging larvae. A group of approximately 15 larvae per trial was placed in a Petri dish and monitored during 5 minutes for their chemotactic behaviour, as larvae were exposed to an odour gradient in gas phase emanating from the two odour sources on the lid of the Petri dish. The starting zone of the larvae was centred on the dish and the individual larva's initial orientation was random. Larval behaviour was tracked using a video camera and the data derived was then analysed in Matlab (MathWorks) using custom-made programs to calculate additional time-series variables, and to determine the preference index and the distance of larvae to the source.

Positional and Ovipositional Preference of *D. suzukii* Exposed to Food Substrate Plated with (E)-2-Hexenal and Methyl Benzoate.

Petri dishes (⌀ 6 cm) filled with 10 ml of a molasses-apple juice-agar medium acted as food substrate. These were plated with methyl benzoate or (E)-2-hexenal. Two Petri dishes were placed inside a plastic box (32×22×12 cm) with a mesh netting in the lid. One dish was plated with a thin layer of pure odour (1.8 µl (E)-2-hexenal or 0.9 µl methyl benzoate when used pure, or 50 µl of (E)-2-hexenal when used in diluted solutions), and the other was left blank as a control. More (E)-2-hexenal was used because its vapour pressure is 4 times lower than that of methyl benzoate and, thus, is prone to dissipate faster. 20 mixed sex adult flies were placed inside the plastic box and monitored every 0.5 hours, over a period of 5 hours, to assess their positional preference by counting the number of flies positioned on either plate. After 24 hours, their ovipositional preference was monitored by counting the number of eggs laid on either dish. Flies were cooled on ice for handling and discarded after each trial.

Impact of (E)-2-Hexenal on the Infestation of Blueberries by *D. suzukii* on Pre-Odour-Treated Blueberries Eight ripe blueberries were dipped into 10 mL of a 1%, 5% or 10% aqueous emulsion of (E)-2-hexenal or deionised water as a control and left to air dry. They were then placed in a Petri dish at the bottom of a cylindrical plastic fly cage (⌀=5.5 cm, h=7.5 cm), together with 20 mixed (10 females, 10 males) adult *D. suzukii* flies. The flies were exposed to the odour-treated blueberries during 48 hours at ambient room temperature conditions, after which they were removed and discarded. The blueberries were then transferred into an empty fly vial with cotton lids, and after 14 days at ambient room temperature conditions, the emergence of adult *D. suzukii* was examined by counting the number of flies. The assay was repeated 5 times.

Impact of E-2-Hexenal on the Survival and Development of *D. suzukii* Larvae in Pre-Infested Blueberries Eight ripe, untreated blueberries were placed in a Petri dish at the bottom of a cylindrical plastic fly cage together with 20 mixed (10 females, 10 males) adult *D. suzukii* flies for 4 days. All flies were then removed and discarded and half of the pre-infested blueberries was dipped into 10 mL of a 1%, 5% or 10% (E)-2-hexenal aqueous emulsion, while the other half was dipped in 10 mL deionised water as a control. The blueberries were then left to air dry, then placed in empty fly vials with cotton lids and left at ambient room temperature conditions. Survival of *D. suzukii* larvae was measured by counting the number of adult flies that emerged from the odour-treated blueberries versus the control condition after 12 days. The assay was repeated 5 times.

qPCR

RNA was extracted from the adult and larval stage of the fly using the RNeasy Micro kit from Qiagen®. The RNA was then converted to cDNA using the SuperScript® III Reverse Transcriptase from Invitrogen. The obtained cDNA was then used for quantification of the expression levels of para. The reaction mixture for SYBR Green I-based real-time PCR was prepared and the LightCycler® 480 Instrument was used.

| | Sequences | |
|---|---|---|
| SEQ ID NO: | Sequence Type | Sequence |
| 1 | Para_F_5738 | GTGAAGGAGAAGAGCGGCAT |
| 2 | Para_R_5893 | TTTGTCGTTGTCGGGTGGAT |
| 3 | Act42a_F_547 | CAGGCGGTGCTTTCTCTCTA |
| 4 | Act42a_R_736 | AGCTGTAACCGCGCTCAGTA |
| 5 | Para_F_5559 | GCACGTAAAGGAGAAGAGCG |
| 6 | Para_R_5674 | CGTCCAGTACACCATCCCAA |
| 7 | Act_F_82 | GTGTGCGGAGCGGATAACT |
| 8 | Act_R_175 | GCAACCTCTTCGTCACACAT |
| 9 | Para_F_5518 | GACCTTTGGGCAGAGCATGA |
| 10 | Para_R_5646 | TTGCCCGGATAGCCTTTGTC |

-continued

| SEQ ID NO: | Sequence Type | Sequence |
|---|---|---|
| 11 | Act_F_8 | ACGAAAAAGTAGGCGTCGGT |
| 12 | Act_R_157 | AAGCTGCAACCTCTTCGTCA |

Alternative expressions of the inventive concept will now be described by reference to the following numbered clauses:

1. A pesticide composition comprising one or more pesticide volatile organic compounds (VOCs), wherein the pesticide is for *Drosophila* spp. and the one or more pesticide VOCs have the molecular formula $C_aH_bO_c$ wherein: a is between 4 and 13; b is 6, 8, 10, 12, 14, 16, 18, 20, 22 or 24; c is 1 or 2; and the VOCs are linear, branched or cyclic alkanes or alkenes, and comprise a single ketone, aldehyde, alcohol or ester functionality, and wherein any cyclic alkane or alkene is selected from the group consisting of cyclohexane, cyclopentane, cyclopentene and cyclopentadiene; optionally wherein a is between 5 and 13 and b is 8, 10, 12, 14, 16, 18, 20, 22 or 24.

2. The pesticide composition of clause 1, wherein a is between 4 and 10, and b is 6, 8, 10, 12, 14, 16 or 18.

3. The pesticide composition of clause 1 or clause 2, wherein: a is between 5 and 10; b is 8, 10, 12, 14, 16 or 18; and wherein any cyclic alkane is cyclohexane and any cyclic alkene is cyclopentene.

4. The pesticide composition of clause 3, wherein: a is between 5 and 9; and b is 8, 10, 12, 14, or 16.

5. The pesticide composition of clause 4, wherein the pesticide VOCs are selected from: (E)-2-hexenal, 4-hexen-3-one, (E)-2-pentenal, hexanal, 2-heptanone, (E)-2-heptenal, 2-methyl-2-pentenal, octanal, 1-hexanol, (E)-2-hexen-ol, (E,E)-2,4-nonadienal, (E)-2,(Z)-6-nonadienal, methyl 2-methylbutyrate, pentanal, E-2-nonenal, E-2-octenal, nonanal, heptanal, E-3-hexenol, allyl 1-cyclopentene, butylcyclopentane carboxylate, and methyl cyclohexanoate.

6. The pesticide composition of any of clauses 1 to 5, wherein the pesticide VOCs are linear or branched alkanes or alkenes.

7. The pesticide composition of clause 6, wherein the pesticide VOCs comprise a single ketone, aldehyde or ester functionality.

8. The pesticide composition of clause 6, wherein the pesticide VOCs comprise a single alcohol functionality.

9. The pesticide composition of clause 8, wherein the alcohol functionality is terminal.

10. The pesticide composition of any of clauses 1 to 9, wherein a is between 4 and 7.

11. The pesticide composition of clause 10, wherein the pesticide VOCs are selected from (E)-2-hexenal, 4-hexen-3-one, (E)-2-pentenal, hexanal, 2-heptanone, (E)-2-heptenal, 2-methyl-2-pentenal, petanal, heptanal, E-2-hexenol, 1-hexanol, E-3-hexenol, and methyl 2-methylbutyrate.

11. The pesticide composition of any of clauses 1 to 10, wherein a is 5 or 6, b is 8 or 10, c is 1, and the pesticide VOC is a linear alkene with a single ketone or aldehyde functionality.

12. The pesticide composition of clause 11, wherein the pesticide VOCs are selected from (E)-2-hexenal, 4-hexen-3-one and (E)-2-pentenal.

13. The pesticide composition of any of clauses 1 to 3, wherein the pesticide VOCs are selected from the compound with formula

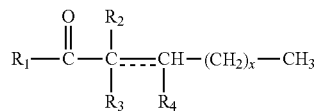

(formula I)

wherein:
$R_1$ is selected from H, $CH_3$ or $C_2H_5$;
$R_2$ is selected from H, $CH_3$ or $C_2H_5$;
$R_3$ is selected from H or $CH_3$, and $R_4$ is selected from H or $CH_3$, or $R_3$ and $R_4$ are both absent; and X is 0, 1, 2, 3, 4, 5, 6, 7, 8 or 9.

14. The pesticide composition of clause 13, wherein X is 0, 1, 2, 3 or 4.

15. The pesticide composition of clause 13 or 14, wherein $R_2$ is H or $CH_3$; and $R_3$ and $R_4$ are both absent or H.

16. The pesticide composition of any of clauses 13 to 15, wherein x is 0, 1 or 2.

17. The pesticide composition of any of clauses 13 to 16, wherein $R_1$ is H or $C_2H_5$.

18. The pesticide composition of any of clause 13 to 17, wherein $R_2$ is H.

19. The pesticide composition of clause 1, wherein the pesticide VOCs are selected from the compound with the formula:

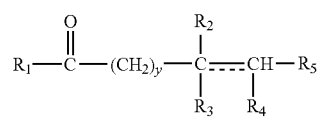

(formula III)

wherein: $R_1$ is selected from H, $CH_3$ or $C_2H_5$; $R_2$ is selected from H, $CH_3$ or $C_2H_5$; $R_3$ is selected from H or $CH_3$, and $R_4$ is selected from H or $CH_3$, or $R_3$ and $R_4$ are both absent; $R_5$ is selected from H, $CH_3$ or $(CH_2)_xCH_3$; and X+Y is 0, 1, 2, 3, 4, 5, 6, 7, 8 or 9.

20. The pesticide composition of clause 19, wherein X+Y is 0, 1, 2, 3 or 4.

21. The pesticide composition of clause 19 or clause 20, wherein $R_2$ is H or $CH_3$; and $R_3$ and $R_4$ are both absent or H, optionally wherein x is 0, 1 or 2.

22. The pesticide composition of any of clauses 19 to 21, wherein $R_1$ is H or $C_2H_5$, optionally wherein $R_2$ is H.

23. The pesticide composition of any of clauses 19 to 22, wherein y is 0, or, wherein y is 1 and $R_5$ is H.

24. The pesticide composition of any of clauses 1 to 23, wherein the pesticide composition is lethal to larval *Drosophila* spp. flies.

25. The pesticide composition of any of clauses 1 to 24, wherein the pesticide composition is lethal to eggs of *Drosophila* spp. flies.

26. The pesticide composition of any of clauses 1 to 25, wherein the pesticide composition is adapted for release of the one or more pesticide VOCs in vapour or gas form.

27. The pesticide composition of any of clauses 1 to 26, wherein the pesticide composition is lethal to adult *Drosophila* spp. flies.

28. The pesticide composition of any of clauses 1 to 27, wherein the pesticide composition is repellent to *Drosophila* spp, optionally wherein the pesticide composition it repellent to adult *Drosophila* spp. flies.

29. The pesticide composition of clause 28, wherein the pesticide composition is an ovipositional repellent.

30. The pesticide composition of any of clauses 1 to 27, wherein the pesticide composition is an attractant to at least one *Drosophila* spp, optionally wherein the pesticide composition is an attractant to larvae of at least one *Drosophila* spp.

31. The pesticide composition of any of clauses 1 to 30, further comprising a solvent.

32. The pesticide composition of any of clauses 1 to 31, wherein each of the one or more pesticide VOCs is present in the composition at a concentration of at least 0.1%, at least 0.3%, at least 0.5%, at least 1%, at least 2%, at least 3%, or at least 5% by volume of the composition.

33. The pesticide composition of any of clauses 1 to 32, wherein each of the one or more pesticide VOCs is present in the composition at a concentration of at most 50%, at most 40%, at most 30%, or at most 20% by volume of the composition.

34. The pesticide composition of any of clauses 1 to 33, wherein each of the one or more pesticide VOCs is present in the composition at a concentration of between about 0.1 and about 50% w/w, about 0.3 and about 45%, about 0.5 and about 40%, about 1 and about 30%, about 2 and 25%, about 3 and 20%, about 4 and 15% or about 5 and 10% by volume of the composition.

35. The pesticide composition of any of clauses 1 to 34, wherein each of the one or more pesticide VOCs is present in the composition at a concentration of about 5% or about 10% by volume of the composition.

36. The pesticide composition of any of clauses 1 to 35, wherein the pesticide composition is not effective on *Drosophila melanogaster* and/or *Drosophila santomea*.

37. The pesticide composition of any of clauses 1 to 36, wherein the pesticide composition is effective on one or more of *Drosophila* species selected from *D. suzukii, D. simulans, D. schellia, D. erecta, D. yakuba* or *D. biarmipes*.

38. The pesticide composition of any of clauses 1 to 37, wherein the pesticide composition is effective for *D. suzukii*.

39. The pesticide composition of any of clauses 1 to 38 wherein the pesticide composition is effective for *Drosophila* spp. with a higher level of para gene expression in comparison to *Drosophila melanogaster*.

40. The pesticide composition of clause 3539 wherein the pesticide composition is effective for *Drosophila* spp. with a higher level of para gene expression in comparison to *Drosophila melanogaster* as measured by quantitative polymerase chain reaction (qPCR).

41. The pesticide composition of clauses 39 or 40, wherein the pesticide composition is effective against *Drosophila* spp. where the male and female adults have a higher level of para gene expression in comparison to the male and female adults *Drosophila melanogaster*, respectively.

42. The pesticide composition of any of clauses 1 to 41, wherein the pesticide composition is not lethal to *Apis mellifera*.

43. The pesticide composition of any of clauses 1 to 42, wherein the pesticide composition is adapted for application as an aerosol.

44. The pesticide composition of any of clauses 1 to 43, wherein the pesticide composition is for use on fruit cultures.

45. A pesticide composition comprising one or more pesticide volatile organic compounds (VOCs), wherein the pesticide is for *Drosophila* spp. and the one or more pesticide VOCs have the formula:

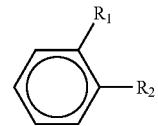

wherein $R_1$ is OH or absent, and $R_2$ is an aldehyde functional group or a linear or branched alkane or alkene with 1 to 5 carbons and a single ester or ketone functional group.

46. The pesticide composition according to clause 45, wherein $R_2$ is an aldehyde functional group or a linear or branched alkane or alkene with 1 to 3 carbons and a single ester or ketone functional group.

47. The pesticide composition of clause 46, wherein the one or more pesticide VOCs are selected from: benzaldehyde, methyl benzoate, methyl salicylate, ethyl benzoate, propyl benzoate, benzyl acetate, ethyl phenyl acetate and acetophenone.

48. The pesticide composition of any of clauses 45 to 47, wherein the one or more pesticide VOCs is not methyl benzoate.

49. The pesticide composition of any of clauses 45 to 48, wherein $R_2$ is an aldehyde functional group or a linear alkane with 1 to 3 carbons and a single ester or ketone functional group.

50. The pesticide composition of clause 49, wherein $R_2$ is an aldehyde functional group or —$COOR_3$ where $R_3$ is a methyl, ethyl or propyl group.

51. The pesticide composition of clause 50, wherein the one or more pesticide VOCs are selected from: benzaldehyde, methyl benzoate, methyl salicylate, ethyl benzoate, propyl benzoate.

51. The pesticide composition of any of clauses 45 to 50, wherein the pesticide composition has the features of any of clauses 24 to 44.

52. The pesticide composition of clause 1, wherein the one or more pesticide VOCs are selected from: allyl 1-cyclopentene-1-carboxylate, (E,E)-2,4-nonadienal, E-2-nonenal, E-2-octenal, E-2-decenal, butyl cyclopentane carboxylate, 4-hexen-3one, E)-2,(Z)-6-nonadienal, E-2-heptenal, pentyl cyclopentane carboxylate, nonanal, E-2-undecenal, E-2-hexenal, E-2-pentenal, methyl cyclopentane carboxylate, 2-methyl-2-pentenal, acetophenone, isopropyl cyclopentane carboxylate, E-2-dodecenal, methyl cyclohexanoate, and heptanal.

53. The pesticide composition of clause 53, wherein the pesticide VOCs are each present at a concentration of between 0.3% vol and 10% vol.

54. The pesticide composition of clause 1, wherein the one or more pesticide VOCs are selected from: allyl 1-cyclopentene-1-carboxylate, (E,E)-2,4-nonadienal, E-2-nonenal, E-2-octenal, E-2-decenal, butyl cyclopentane carboxylate, 4-hexen-3one, E)-2,(Z)-6-nonadienal, E-2-heptenal, pentyl cyclopentane carboxylate, nonanal, E-2-undecenal, E-2-hexenal, E-2-pentenal, and methyl cyclopentane carboxylate.

55. The pesticide composition of clause 54, wherein the one or more pesticide VOCs are each present at a concentration below 10% vol, below 9% vol, below 8% vol, below 7% vol or below 6% vol, or between 0.3% vol and 5% vol.

56. The pesticide composition of clause 1, wherein the one or more pesticide VOCs are selected from: allyl 1-cyclopentene-1-carboxylate, (E,E)-2,4-nonadienal, E-2-nonenal, E-2-octenal, E-2-decenal, butyl cyclopentane carboxylate, 4-hexen-3one, E)-2,(Z)-6-nonadienal, E-2-heptenal, pentyl cyclopentane carboxylate, nonanal, E-2-undecenal, and E-2-hexenal.

57. The pesticide composition of clause 56, wherein the one or more pesticide VOCs are each present at a concentration below 5% vol, or between 0.3% vol and 4% vol.

58. The pesticide composition of clause 1, wherein the one or more pesticide VOCs are selected from: allyl 1-cyclopentene-1-carboxylate, (E,E)-2,4-nonadienal, E-2-nonenal, E-2-octenal, E-2-decenal, butyl cyclopentane carboxylate, 4-hexen-3one, E)-2,(Z)-6-nonadienal, E-2-heptenal, pentyl cyclopentane carboxylate, nonanal.

59. The pesticide composition of clause 59, wherein the one or more pesticide VOCs are each present at a concentration below 4% vol, or between 0.3% vol and 3% vol.

60. The pesticide composition of clause 1, wherein the pesticide one or more pesticide VOCs are selected from: allyl 1-cyclopentene-1-carboxylate, (E,E)-2,4-nonadienal, E-2-nonenal, E-2-octenal.

61. The pesticide composition of clause 60, wherein the pesticide VOCs are each present at a concentration below 3% vol, or between 0.3% vol and 2% vol.

62. The pesticide composition of clause 1, wherein the pesticide VOCs is: allyl 1-cyclopentene-1-carboxylate.

63. The pesticide composition of clause 62, wherein the pesticide VOCs is at a concentration below 2% vol, or between 0.3% vol and 1% vol.

64. The pesticide composition of clause 45, wherein the one or more pesticide VOCs are selected from: benzaldehyde, ethyl phenylacetate, methyl benzoate, ethyl benzoate, methyl salicylate, propyl benzoate, acetophenone and benzyl acetate.

65. The pesticide composition of clause 64, wherein the one or more pesticide VOCs are each present at a concentration of between 0.3% vol and 10% vol.

66. The pesticide composition of clause 45, wherein the one or more pesticide VOCs are selected from: benzaldehyde, ethyl phenylacetate, and methyl benzoate.

67. The pesticide composition of clause 66, wherein the one or more pesticide VOCs are each present at a concentration below 10% vol, below 9% vol, below 8% vol, below 7% vol or below 6% vol, or between 0.3% vol and 5% vol.

68. The pesticide composition of clause 45, wherein the pesticide VOCs is: benzaldehyde.

69. The pesticide composition of clause 68, wherein the pesticide VOCs is present at a concentration below 5% vol, or between 0.3% vol and 4% vol.

70. Use of a pesticide composition according to any of clauses 1 to 69 to prevent, reduce or eliminate a *D. suzukii* infestation.

71. Use of a pesticide composition according to any of clauses 1 to 69 to prevent, reduce or eliminate a *D. suzukii, D. simulans, D. schellia, D. erecta, D. yakuba* or *D. biarmipes* infestation.

72. Use according to clause 70 or 71, wherein the use is for a fruit culture or crop.

73. Use according to clause 72, wherein the use is to reduce, prevent or eliminate an infestation post harvest of the fruit culture or crop.

74. Use according to clause 73, wherein the use comprises applying the pesticide composition in crop storage containers or chambers prior to filling the containers or chambers with the harvested fruit.

75. Use according to clause 72 or 73, wherein the use comprises applying the pesticide composition around areas where air can enter crop storage containers or chambers.

76. Use according to clause 73, wherein the use comprises applying the pesticide composition around areas selected from: fans, aeration ducts or any other components of an air circulation system, doors and lid openings.

77. Use according to clause 72, wherein the use comprises applying the pesticide composition onto the harvested fruit prior to or during storage.

78. A method of preventing, reducing or eliminating a *D. suzukii, D. simulans, D. schellia, D. erecta, D. yakuba* or *D. biarmipes* infestation, the method comprising applying a pesticide composition according to any of clauses 1 to 69 to a crop, a crop storage chamber or a crop storage container.

79. The method of clause 78, wherein the method has any of the features of clauses 72 to 77.

The invention claimed is:

1. A pesticide composition effective in preventing, reducing, or eliminating a *Drosophila* spp. infestation in a crop, a crop storage container, or a crop storage chamber after application to said crop, crop storage container, or crop storage chamber, the pesticide composition comprising one or more pesticide volatile organic compounds (VOCs) having the molecular formula $C_aH_bO_c$,
wherein:
a is between 4 and 13;
b is 6, 8, 10, 12, 14, 16, 18, 20, 22 or 24;
c is 1 or 2; wherein each of the one or more pesticide VOCs is a cyclic alkane or alkene, and comprises a single ketone, aldehyde, alcohol or ester functionality, and wherein each of said cyclic alkane or alkene is selected from the group consisting of cyclohexane, cyclopentane, cyclopentene and cyclopentadiene;
wherein when a is 10, b is 18, and c is 1, the one or more pesticide VOCs are cyclic alkenes; and
wherein the one or more pesticide VOCs are effective against the *Drosophila* spp. selected from the group consisting of *D. suzukii*, *D. simulans*, *D. schellia*, *D. erecta*, *D. yakuba*, and *D. biarmipes*.

2. The pesticide composition of claim 1, wherein:
a is between 5 and 13 and b is 8, 10, 12, 14, 16, 18, 20, 22 or 24, and wherein said cyclic alkane is cyclohexane and said cyclic alkene is cyclopentene; or
a is between 5 and 10; b is 8, 10, 12, 14, or 16 and wherein said cyclic alkane is cyclohexane and said cyclic alkene is cyclopentene.

3. The pesticide composition of claim 1, wherein the one or more pesticide VOCs are selected from: allyl 1-cyclopentene-1-carboxylate, butyl cyclopentane carboxylate, and pentyl cyclopentane carboxylate.

4. The pesticide composition of claim 1, wherein the one or more pesticide VOCs is allyl 1-cyclopentene-1-carboxylate.

5. The pesticide composition of claim 1, wherein the one or more pesticide VOCs are each present at a concentration below 3% vol.

6. The pesticide composition of claim 1, wherein the one or more pesticide VOCs are each present at a concentration between 0.3% vol and 2% vol.

7. A method of preventing, reducing or eliminating a *Drosophila suzukii*, *Drosophila simulans*, *Drosophila schellia*, *Drosophila erecta*, *Drosophila yakuba* or *Drosophila biarmipes* infestation, comprising administering to a crop, a crop storage container, or a crop storage chamber the pesticide composition according to claim 1.

8. The method according to claim 7, wherein
a is between 4 and 10, and b is 6, 8, 10, 12, 14, 16 or 18; and wherein each of said cyclic alkanes is cyclohexane and each of said cyclic alkenes is cyclopentene.

9. The method according to claim 7, wherein the one or more pesticide VOCs are selected from: allyl 1-cyclopentene-1-carboxylate, butyl cyclopentane carboxylate, and pentyl cyclopentane carboxylate.

10. The method according to claim 7, wherein a is between 7 and 12; b is 12, 14 or 16 and said cyclic alkane is cyclohexane or cyclopentane and said cycloalkene is cyclopentene.

11. The method according to claim 7, wherein the pesticide composition is lethal to larval *D. suzukii, D. simulans, D. schellia, D. erecta, D. yakuba* or *D. biarmipes* flies, to eggs of *D. suzukii, D. simulans, D. schellia, D. erecta, D. yakuba* or *D. biarmipes* flies, to adult *D. suzukii, D. simulans, D. schellia, D. erecta, D. yakuba* or *D. biarmipes* flies, or any combination thereof.

12. The method according to claim 7, wherein the pesticide composition is repellent to *D. suzukii, D. simulans, D. schellia, D. erecta, D. yakuba* or *D. biarmipes* flies.

13. The method according to claim 7, wherein each of the one or more pesticide VOCs is used in a composition at a concentration of:
  (i) at least 0.1%, at least 0.3%, at least 0.5%, at least 1%, at least 2%, at least 3%, or at least 5% by volume of the composition;
  (ii) at most 50%, at most 30%, or at most 20% by volume of the composition; and/or
  (iii) between about 0.1 and about 50% w/w, about 0.3 and 45%, about 0.5 and 40%, about 1 and about 30%, about 2 and 25%, about 3 and 20%, about 4 and 15% or about 5 and 10% by volume of the composition.

14. The method according to claim 7, wherein the pesticide composition is effective against *D. suzukii*.

15. The method according to claim 7, wherein the method is for preventing, reducing or eliminating a *Drosophila* spp. infestation wherein the *Drosophila* spp. has a higher level of para gene expression in comparison to *Drosophila melanogaster*.

16. The method according to claim 7, wherein the pesticide composition is not lethal to *Apis mellifera*.

17. The method according to claim 7, wherein the method is for preventing, reducing or eliminating a *D. suzukii, D. simulans, D. schellia, D. erecta, D. yakuba* and/or *D. biarmipes* infestation of a fruit culture or crop.

18. The method according to claim 7, wherein the method is for preventing, reducing or eliminating a *D. suzukii, D. simulans, D. schellia, D. erecta, D. yakuba* and/or *D. biarmipes* infestation of a fruit culture or crop, the method comprising applying the one or more pesticide volatile organic compound (VOC) to a fruit culture or the crop post-harvest.

19. A pesticide composition effective in preventing, reducing, or eliminating a *Drosophila* spp. infestation in a crop, a crop storage container, or a crop storage chamber after application to said crop, crop storage container, or crop storage chamber, the pesticide composition comprising one or more pesticide volatile organic compounds (VOCs), having the molecular formula $C_aH_bO_c$,
  wherein:
  a is between 4 and 13;
  b is 6, 8, 10, 12, 14, 16, 18, 20, 22 or 24;
  c is 1 or 2;
  wherein each of the one or more pesticide VOCs is a linear or cyclic alkane or alkene, and comprises a single ketone, aldehyde, alcohol or ester functionality, and wherein each of said cyclic alkane or alkene is selected from the group consisting of cyclohexane, cyclopentane, cyclopentene and cyclopentadiene;
  wherein the one or more pesticide VOCs are each present at a concentration between 2% vol and 5% vol;
  wherein the pesticide composition is formulated to release the one or more pesticide VOCs as a vapor or gas; and
  wherein the one or more pesticide VOCs are effective against the *Drosophila* spp. selected from the group consisting of *D. suzukii, D. simulans, D. schellia, D. erecta, D. yakuba*, and *D. biarmipes*.

20. The pesticide composition of claim 19, wherein:
  a is between 5 and 13 and b is 8, 10, 12, 14, 16, 18, 20, 22 or 24, and wherein said cyclic alkane is cyclohexane and said cyclic alkene is cyclopentene; or
  a is between 5 and 10; b is 8, 10, 12, 14, or 16, and wherein said cyclic alkane is cyclohexane and said cyclic alkene is cyclopentene.

21. The pesticide composition of claim 19, wherein the one or more pesticide VOCs are selected from: allyl 1-cyclopentene-1-carboxylate, (E,E)-2,4-nonadienal, E-2-nonenal, E-2-octenal, E-2-decenal, butyl cyclopentane carboxylate, 4-hexen-3-one, E-2,(Z)-6-nonadienal, E-2-heptenal, pentyl cyclopentane carboxylate, nonanal, E-2-undecenal, and E-2-hexenal.

22. The pesticide composition of claim 19, wherein the one or more pesticide VOCs are selected from: allyl 1-cyclopentene-1-carboxylate, (E,E)-2,4-nonadienal, E-2-nonenal, and E-2-octenal.

23. The pesticide composition of claim 19, wherein the one or more pesticide VOCs are each present at a concentration between 2% vol and 4% vol.

24. The pesticide composition of claim 19, wherein the one or more pesticide VOCs are each present at a concentration between 2% vol and 3% vol.

* * * * *

SEQUENCE LISTING

```
<160> NUMBER OF SEQ ID NOS: 12

<210> SEQ ID NO 1
<211> LENGTH: 20
<212> TYPE: DNA
<213> ORGANISM: Artificial Sequence
<220> FEATURE:
<223> OTHER INFORMATION: qPCR primer - Para_F_5738

<400> SEQUENCE: 1
gtgaaggaga agagcggcat                                              20

<210> SEQ ID NO 2
<211> LENGTH: 20
<212> TYPE: DNA
<213> ORGANISM: Artificial Sequence
<220> FEATURE:
<223> OTHER INFORMATION: qPCR primer - Para_R_5893

<400> SEQUENCE: 2
tttgtcgttg tcgggtggat                                              20
```

```
<210> SEQ ID NO 3
<211> LENGTH: 20
<212> TYPE: DNA
<213> ORGANISM: Artificial Sequence
<220> FEATURE:
<223> OTHER INFORMATION: qPCR primer - Act42a_F_547

<400> SEQUENCE: 3
caggcggtgc tttctctcta                                               20

<210> SEQ ID NO 4
<211> LENGTH: 20
<212> TYPE: DNA
<213> ORGANISM: Artificial Sequence
<220> FEATURE:
<223> OTHER INFORMATION: qPCR primer - Act42a_R_736

<400> SEQUENCE: 4
agctgtaacc gcgctcagta                                               20

<210> SEQ ID NO 5
<211> LENGTH: 20
<212> TYPE: DNA
<213> ORGANISM: Artificial Sequence
<220> FEATURE:
<223> OTHER INFORMATION: qPCR primer - Para_F_5559

<400> SEQUENCE: 5
gcacgtaaag gagaagagcg                                               20

<210> SEQ ID NO 6
<211> LENGTH: 20
<212> TYPE: DNA
<213> ORGANISM: Artificial Sequence
<220> FEATURE:
<223> OTHER INFORMATION: qPCR primer - Para_R_5674

<400> SEQUENCE: 6
cgtccagtac accatcccaa                                               20

<210> SEQ ID NO 7
<211> LENGTH: 19
<212> TYPE: DNA
<213> ORGANISM: Artificial Sequence
<220> FEATURE:
<223> OTHER INFORMATION: qPCR primer - Act_F_82

<400> SEQUENCE: 7
gtgtgcggag cggataact                                                19

<210> SEQ ID NO 8
<211> LENGTH: 20
<212> TYPE: DNA
<213> ORGANISM: Artificial Sequence
<220> FEATURE:
<223> OTHER INFORMATION: qPCR primer - Act_R_175

<400> SEQUENCE: 8
gcaacctctt cgtcacacat                                               20

<210> SEQ ID NO 9
<211> LENGTH: 20
<212> TYPE: DNA
<213> ORGANISM: Artificial Sequence
<220> FEATURE:
<223> OTHER INFORMATION: qPCR primer - Para_F_5518
```

```
<400> SEQUENCE: 9
gacctttggg cagagcatga                                                 20

<210> SEQ ID NO 10
<211> LENGTH: 20
<212> TYPE: DNA
<213> ORGANISM: Artificial Sequence
<220> FEATURE:
<223> OTHER INFORMATION: qPCR primer - Para_R_5646

<400> SEQUENCE: 10
ttgcccggat agcctttgtc                                                 20

<210> SEQ ID NO 11
<211> LENGTH: 20
<212> TYPE: DNA
<213> ORGANISM: Artificial Sequence
<220> FEATURE:
<223> OTHER INFORMATION: qPCR primer - Act_F_8

<400> SEQUENCE: 11
acgaaaaagt aggcgtcggt                                                 20

<210> SEQ ID NO 12
<211> LENGTH: 20
<212> TYPE: DNA
<213> ORGANISM: Artificial Sequence
<220> FEATURE:
<223> OTHER INFORMATION: qPCR primer - Act_R_157

<400> SEQUENCE: 12
aagctgcaac ctcttcgtca                                                 20
```